US012612821B2

(12) United States Patent
Thomsen et al.

(10) Patent No.: US 12,612,821 B2
(45) Date of Patent: Apr. 28, 2026

(54) VACUUM INSULATED PANEL WITH IMPROVED THERMAL PERFORMANCE PROXIMATE EDGE OF GLASS DURING ASYMMETRIC THERMAL CONDITIONS

(71) Applicant: LuxWall, Inc., Ypsilanti, MI (US)

(72) Inventors: Scott V. Thomsen, Glen Arbor, MI (US); Christian Bischoff, Maumee, OH (US)

(73) Assignee: LuxWall, Inc., Ypsilanti, MI (US)

( * ) Notice: Subject to any disclaimer, the term of this patent is extended or adjusted under 35 U.S.C. 154(b) by 225 days.

(21) Appl. No.: 18/636,472

(22) Filed: Apr. 16, 2024

(65) Prior Publication Data

US 2025/0320767 A1     Oct. 16, 2025

(51) Int. Cl.
| | |
|---|---|
| E06B 3/663 | (2006.01) |
| E06B 3/66 | (2006.01) |
| E06B 3/67 | (2006.01) |
| G01J 5/48 | (2022.01) |

(52) U.S. Cl.
CPC ........ E06B 3/66323 (2013.01); E06B 3/6612 (2013.01); E06B 3/66333 (2013.01); G01J 5/485 (2022.01); E06B 3/6715 (2013.01)

(58) Field of Classification Search
CPC ............... E06B 3/6612; E06B 3/66323; E06B 3/66333; E06B 3/6715; B32B 17/00; B32B 17/10005; B32B 17/10036; B32B 17/06; B32B 2309/68
See application file for complete search history.

(56) References Cited

U.S. PATENT DOCUMENTS

| | | | |
|---|---|---|---|
| 3,433,611 | A | 3/1969 | Saunders et al. |
| 4,040,808 | A | 8/1977 | Kahn et al. |
| 4,892,847 | A | 1/1990 | Reinherz |
| 5,124,185 | A | 6/1992 | Kerr et al. |
| 5,489,321 | A | 2/1996 | Tracy et al. |
| 5,657,607 | A | 8/1997 | Collins |
| 5,664,395 | A | 9/1997 | Collins |
| 5,935,702 | A | 8/1999 | Macquart et al. |
| 6,042,934 | A | 3/2000 | Guiselin et al. |

(Continued)

FOREIGN PATENT DOCUMENTS

EP          1 563 952 B1     6/2013

OTHER PUBLICATIONS

Wang et al. (Tellurite Glass and its Applications in Lasers, published Apr. 8, 2020).*

(Continued)

*Primary Examiner* — Alicia J Weydemeyer
(74) *Attorney, Agent, or Firm* — Nixon & Vanderhye P.C.

(57) ABSTRACT

A vacuum insulating panel may include: a first substrate; a second substrate; a plurality of spacers provided in a gap between at least the first and second substrates, wherein the gap is at pressure less than atmospheric pressure; and a seal (e.g., edge seal) provided at least partially between at least the first and second glass substrates. Components such as edge seal material(s) and/or dimension(s) thereof are configured in a vacuum insulating panel to improve thermal performance to provide for higher glass temperatures on the warm side of the panel during asymmetric thermal conditions, proximate the edge seal and/or at other locations, so as to improve thermal performance.

65 Claims, 22 Drawing Sheets

(56) References Cited

U.S. PATENT DOCUMENTS

| | | | |
|---|---|---|---|
| 6,106,798 | A | 8/2000 | Kambe et al. |
| 6,322,881 | B1 | 11/2001 | Boire et al. |
| 6,352,749 | B1 | 3/2002 | Aggas |
| 6,444,281 | B1 | 9/2002 | Wang et al. |
| 6,533,632 | B1 | 3/2003 | Dynka |
| 6,558,494 | B1 | 5/2003 | Wang et al. |
| 6,641,689 | B1 | 11/2003 | Aggas |
| 6,946,171 | B1 | 9/2005 | Aggas |
| 7,045,181 | B2 | 5/2006 | Yoshizawa et al. |
| 7,115,308 | B2 | 10/2006 | Amari et al. |
| 7,314,668 | B2 | 1/2008 | Lingle et al. |
| 7,342,716 | B2 | 3/2008 | Hartig |
| 7,407,423 | B2 | 8/2008 | Aitken et al. |
| 7,425,166 | B2 | 9/2008 | Burt et al. |
| 7,560,402 | B2 | 7/2009 | Thomsen |
| 7,632,571 | B2 | 12/2009 | Hartig et al. |
| 7,858,193 | B2 | 12/2010 | Ihlo et al. |
| 7,910,229 | B2 | 3/2011 | Medwick et al. |
| 7,919,157 | B2 | 4/2011 | Cooper |
| 8,490,434 | B2 | 7/2013 | Watanabe et al. |
| 8,500,933 | B2 | 8/2013 | Cooper |
| 8,590,343 | B2 | 11/2013 | Wang |
| 8,821,999 | B2 | 9/2014 | Grzybowski et al. |
| 8,833,105 | B2 | 9/2014 | Dennis et al. |
| 8,951,617 | B2 | 2/2015 | Reymond et al. |
| 9,169,155 | B2 | 10/2015 | Dennis et al. |
| 9,215,760 | B2 | 12/2015 | Fischer et al. |
| 9,290,984 | B2 | 3/2016 | Hogan et al. |
| 9,388,628 | B2 | 7/2016 | Petrmichl et al. |
| 9,428,952 | B2 | 8/2016 | Dennis et al. |
| 9,441,416 | B2 | 9/2016 | Veerasamy et al. |
| 9,458,052 | B2 | 10/2016 | Dennis |
| 9,593,527 | B2 | 3/2017 | Hogan et al. |
| 9,752,375 | B2 | 9/2017 | Jones |
| 9,776,910 | B2 | 10/2017 | Dennis |
| 9,822,580 | B2 | 11/2017 | Cooper et al. |
| 9,908,811 | B2 | 3/2018 | Gross et al. |
| 10,011,525 | B2 | 7/2018 | Logunov et al. |
| 10,017,417 | B2 | 7/2018 | Dejneka et al. |
| 10,077,204 | B2 | 9/2018 | Maschmeyer et al. |
| 10,087,676 | B2 | 10/2018 | Dennis |
| 10,107,028 | B2 | 10/2018 | Dennis |
| 10,125,045 | B2 | 11/2018 | Dennis |
| 10,153,389 | B2 | 12/2018 | Godeke et al. |
| 10,267,085 | B2 | 4/2019 | Dennis et al. |
| 10,280,680 | B2 | 5/2019 | Veerasamy et al. |
| 10,421,684 | B2 | 9/2019 | Hogan et al. |
| 10,435,938 | B2 | 10/2019 | Dennis et al. |
| 10,465,433 | B2 | 11/2019 | Hogan et al. |
| 10,611,664 | B2 | 4/2020 | Lezzi et al. |
| 10,731,403 | B2 | 8/2020 | Krisko et al. |
| 10,745,317 | B2 | 8/2020 | Godeke et al. |
| 10,752,535 | B2 | 8/2020 | Dennis |
| 10,759,693 | B2 | 9/2020 | Xu et al. |
| 10,829,984 | B2 | 11/2020 | Dennis et al. |
| 10,858,880 | B2 | 12/2020 | Dennis |
| 10,954,160 | B2 | 3/2021 | Streltsov et al. |
| 11,014,847 | B2 | 5/2021 | Dennis |
| 11,028,009 | B2 | 6/2021 | Dennis |
| 11,028,637 | B2 | 6/2021 | Abe et al. |
| 11,124,450 | B2 | 9/2021 | Miki et al. |
| 11,285,703 | B2 | 3/2022 | Jorgensen et al. |
| 12,338,677 | B2 | 6/2025 | Thomsen et al. |
| 12,365,164 | B2 | 7/2025 | Thomsen et al. |
| 12,377,639 | B2 | 8/2025 | Thomsen |
| 12,377,640 | B2 | 8/2025 | Thomsen et al. |
| 12,391,026 | B2 | 8/2025 | Thomsen |
| 12,409,634 | B2 | 9/2025 | Thomsen |
| 12,410,654 | B2 | 9/2025 | Thomsen et al. |
| 12,434,994 | B2 | 10/2025 | Thomsen |
| 12,442,243 | B2 | 10/2025 | Thomsen |
| 12,442,244 | B2 | 10/2025 | Thomsen et al. |
| 12,460,467 | B2 | 11/2025 | Thomsen et al. |
| 12,460,468 | B2 | 11/2025 | Thomsen |
| 12,460,469 | B2 | 11/2025 | Thomsen |
| 12,467,308 | B2 | 11/2025 | Thomsen |
| 12,529,257 | B2 | 1/2026 | Thomsen et al. |
| 2009/0142669 | A1 | 6/2009 | Shinohara et al. |
| 2009/0155500 | A1 | 6/2009 | Cooper et al. |
| 2009/0155555 | A1 | 6/2009 | Botelho et al. |
| 2009/0266015 | A1* | 10/2009 | Schield ............ B32B 17/10045 |
| | | | 428/34 |
| 2009/0324858 | A1 | 12/2009 | Jaeger |
| 2010/0139195 | A1* | 6/2010 | Tinianov ............. E06B 3/66333 |
| | | | 52/786.13 |
| 2010/0330308 | A1 | 12/2010 | Cooper et al. |
| 2010/0330309 | A1* | 12/2010 | Cooper .................... C03C 8/02 |
| | | | 156/107 |
| 2012/0055553 | A1 | 3/2012 | Logunov et al. |
| 2012/0131959 | A1 | 5/2012 | No et al. |
| 2012/0202049 | A1 | 8/2012 | Valladeau et al. |
| 2013/0101759 | A1 | 4/2013 | Jones |
| 2013/0111953 | A1* | 5/2013 | Maloney ............... H10W 95/00 |
| | | | 427/58 |
| 2014/0037870 | A1* | 2/2014 | Petrmichl ............. E06B 3/6612 |
| | | | 417/51 |
| 2014/0196502 | A1 | 7/2014 | Masuda et al. |
| 2015/0218042 | A1* | 8/2015 | Hogan .................. E06B 3/6775 |
| | | | 501/15 |
| 2015/0357489 | A1 | 12/2015 | Konig et al. |
| 2015/0380330 | A1 | 12/2015 | Mitsui et al. |
| 2016/0008919 | A1 | 1/2016 | Bostanjoglo et al. |
| 2016/0297706 | A1 | 10/2016 | Naito et al. |
| 2017/0016270 | A1 | 1/2017 | Kayaba et al. |
| 2017/0138115 | A1 | 5/2017 | Hogan et al. |
| 2017/0218042 | A1 | 8/2017 | Tran et al. |
| 2018/0094475 | A1 | 4/2018 | Naito et al. |
| 2018/0238104 | A1 | 8/2018 | Mikkelsen et al. |
| 2019/0035951 | A1 | 1/2019 | Lee et al. |
| 2019/0106931 | A1 | 4/2019 | Krisko et al. |
| 2019/0177208 | A1* | 6/2019 | Gödeke .................... C03C 8/24 |
| 2019/0367405 | A1 | 12/2019 | Naito et al. |
| 2020/0325723 | A1 | 10/2020 | Caliaro et al. |
| 2020/0392036 | A1 | 12/2020 | Naito et al. |
| 2021/0199367 | A1 | 7/2021 | Kim et al. |
| 2021/0254395 | A1 | 8/2021 | Nielsen et al. |
| 2021/0262279 | A1 | 8/2021 | Hedeby et al. |
| 2021/0270084 | A1 | 9/2021 | Abe et al. |
| 2022/0025697 | A1 | 1/2022 | Nielsen |
| 2022/0074258 | A1 | 3/2022 | Andersen et al. |
| 2022/0235601 | A1 | 7/2022 | Krisko et al. |
| 2023/0038053 | A1 | 2/2023 | Fei et al. |
| 2024/0026729 | A1* | 1/2024 | Gong .................. E06B 3/6775 |

OTHER PUBLICATIONS

PCT International Search Report and Written Opinion dated Dec. 5, 2024 for PCT/US2024/029919.
"AAMA 1503-09, Voluntary Test Method for Thermal Transmittance and Condensation Resistance of Windows, Doors and Glazed Wall Sections (Mar. 2009)."
Modeling of Vacuum Insulating Glazing, Published by Ashrae; by Hart et al.; 7pgs. (Dec. 2013).
Glass forming region and bonding mechanism of low-melting V2O5—TeO2—Bi2O3 glass applied in vacuum glazing sealing, Journal of American Ceramic Society (May 2021).
Laser Assisted Frit Sealing for High Thermal Expansion Glasses; *JLMN-Journal of Laser Micro/Nanoengineering* vol. 7, No. 3, 2012, by Logunov et al.; 8 pgs (Dec. 2012).
Vacuum Insulated Glazing under the Influence of a Thermal Load; 2 pgs; by Aronen et al. (Jul. 2020).
Edge Conduction in Vacuum Glazing; Presented at Thermal Performance of the Exterior Envelopes of Buildings VI, Clearwater Beach, FL, Dec. 4-8, 1995, by Simko et al.; 14pgs (Dec. 1995).
U.S. Appl. No. 18/376,897, filed Oct. 5, 2023.
U.S. Appl. No. 18/376,473, filed Oct. 4, 2023.
U.S. Appl. No. 18/376,900, filed Oct. 5, 2023.
U.S. Appl. No. 18/376,907, filed Oct. 5, 2023.
U.S. Appl. No. 18/376,479, filed Oct. 4, 2023.
U.S. Appl. No. 18/376,483, filed Oct. 4, 2023.
U.S. Appl. No. 18/376,490, filed Oct. 4, 2023.

(56) References Cited

OTHER PUBLICATIONS

U.S. Appl. No. 18/376,495, filed Oct. 4, 2023.
U.S. Appl. No. 18/376,926, filed Oct. 5, 2023.
U.S. Appl. No. 18/376,914, filed Oct. 5, 2023.
U.S. Appl. No. 18/376,503, filed Oct. 4, 2023.
U.S. Appl. No. 18/379,275, filed Oct. 12, 2023.
U.S. Appl. No. 18/379,285, filed Oct. 12, 2023.
U.S. Appl. No. 18/376,932, filed Oct. 5, 2023.
U.S. Appl. No. 18/377,328, filed Oct. 6, 2023.
U.S. Appl. No. 18/377,335, filed Oct. 6, 2023.
U.S. Appl. No. 18/517,044, filed Nov. 22, 2023.
U.S. Appl. No. 18/513,944, filed Nov. 20, 2023.
U.S. Appl. No. 18/510,777, filed Nov. 16, 2023.
U.S. Appl. No. 18/616,420, filed Mar. 26, 2024.
U.S. Appl. No. 18/636,472, filed Apr. 16, 2024.
U.S. Appl. No. 18/632,364, filed Apr. 11, 2024.
U.S. Appl. No. 18/617,736, filed Mar. 27, 2024.
U.S. Appl. No. 18/619,266, filed Mar. 28, 2024.
U.S. Appl. No. 18/623,109, filed Apr. 1, 2024.
U.S. Appl. No. 18/626,359, filed Apr. 4, 2024.
U.S. Appl. No. 18/633,733, filed Apr. 12, 2024.
U.S. Appl. No. 18/629,996, filed Apr. 9, 2024.
U.S. Appl. No. 18/650,204, filed Apr. 30, 2024.
U.S. Appl. No. 18/654,040, filed May 3, 2024.
U.S. Appl. No. 18/664,462, filed May 15, 2024.
U.S. Appl. No. 18/668,374, filed May 20, 2024.
Thomas M. Simko, "Heat Transfer Processes and Stresses in Vacuum Glazing: (Jul. 1996)".
Moawad et al. "Electrical Conductivity of Silver Vanadium Tellurite Glasses", J. Am. Ceram. Soc., 85 [11] 2655-59 (2002), 5 pages.
Marple et al., "Structure of TeO2 Glass: Results from 2D Te NMR Spectroscopy", Dept. of Materials Science & Engineering, Univ. of Calif. at Davis (2019).

* cited by examiner

Building Interior

Building Exterior

Example Main Seal Material (Weight % and Mol %)
(non-carbon detecting XRF)

| Oxide | Mol % (Avg) | Wt % (Avg) |
|-------|-------------|------------|
| Te oxide | 35.84% | 46.65% |
| V oxide | 17.83% | 26.45% |
| Al oxide | 14.37% | 11.95% |
| SiO2 | 19.23% | 9.43% |
| MgO | 9.45% | 3.11% |
| MnO | 2.06% | 1.19% |
| BaO | 0.46% | 0.57% |
| ZrO2 | 8.05% | 0.08% |
| K2O | 0.06% | 0.05% |
| Na2O | 0.17% | 0.09% |
| CaO | 0.18% | 0.08% |
| Fe2O3 | 0.07% | 0.09% |
| P2O5 | 0.02% | 0.05% |
| Bi2O3 | 0.01% | 0.06% |
| SO3 | 0.05% | 0.03% |
| PbO | 0.01% | 0.03% |
| CuO | 0.01% | 0.01% |
| ZnO | 0.02% | 0.01% |
| SnO2 | 0.05% | 0.07% |

Fig. 11

Example Main Seal Material (Weight % and Mol %)

(carbon detecting XRF)

|          | Main Powder (wt%) | Main Post Laser (wt%) |          | Main Powder (Mol%) | Main Post Laser (Mol%) |
|----------|------|------|----------|------|------|
| $TeO_4$   | 28.10 | 8.50  | $TeO_4$   | 21.23 | 7.95  |
| $TeO_3$   | 20.30 | 47.26 | $TeO_3$   | 15.39 | 44.57 |
| $TeO_{3+1}$ | 0.70 | 2.81 | $TeO_{3+1}$ | 0.54 | 2.65 |
| $V_2O_5$  | 17.57 | 3.40  | $V_2O_5$  | 12.40 | 5.82  |
| $VO_2$    | 4.40  | 23.80 | $VO_2$    | 2.20  | 14.67 |
| $V_2O_3$  | 0.35  | 0.95  | $V_2O_3$  | 0.24  | 2.80  |
| $Al_2O_3$ | 13.93 | 7.18  | $Al_2O_3$ | 16.51 | 10.59 |
| $SiO_2$   | 9.73  | 2.39  | $SiO_2$   | 19.57 | 5.99  |
| $MgO$     | 3.22  | 0.33  | $MgO$     | 9.65  | 1.25  |
| $BaO$     | 0.57  | -     | $BaO$     | 0.45  | -     |
| $MnO$     | 1.03  | 1.32  | $MnO$     | 1.75  | 2.81  |
| $Fe_2O_3$ | 0.10  | -     | $Fe_2O_3$ | 0.08  | -     |
| $ZrO_2$   | -     | 0.28  | $ZrO_2$   | -     | 0.35  |
| $Bi_2O_3$ | -     | 1.77  | $Bi_2O_3$ | -     | 0.57  |

Fig. 12

Example Primer Material (Weight % and Mol %)
(carbon detecting XRF)

|  | Primer As-Received (wt%) | Primer Post-Laser (wt%) | Primer As-Received (Mol%) | Primer Post-Laser (Mol%) |
|---|---|---|---|---|
| $Bi_2O_3$ | 20.00 | 34.50 | 3.08 | 6.52 |
| $SiO_2$ | 17.76 | 18.81 | 21.20 | 27.56 |
| $B_2O_3$ | 27.74 | 17.80 | 28.59 | 22.51 |
| $TiO_2$ | 5.42 | 8.32 | 4.87 | 9.17 |
| $ZnO$ | 1.59 | 2.43 | 1.40 | 2.63 |
| $Na_2O$ | 4.21 | 2.54 | 4.88 | 3.61 |
| $Al_2O_3$ | 0.34 | 0.18 | 0.24 | 0.16 |
| $ZrO_2$ | 0.69 | 1.16 | 0.40 | 0.83 |
| $Cr_2O_3$ | 0.17 | 0.33 | 0.08 | 0.19 |
| $MnO$ | 0.09 | 0.13 | 0.09 | 0.17 |
| $Fe_2O_3$ | 0.32 | 0.44 | 0.14 | 0.24 |
| $NiO$ | 0.20 | 0.30 | 0.19 | 0.35 |
| $SO_3$ | 0.21 | - | 0.19 | - |
| $CO_2$ | 21.26 | 13.05 | 34.65 | 26.10 |

Fig. 13a

Example Primer Material for Layer(s) 31 and/or 32 (Wt.% & Mol.%) [Measured via Fused Bead XRF]

|  | PRIMER As-Received (Normalized) Weight % | PRIMER As-Received Mole % | PRIMER Post-Laser (Normalized) Weight% | PRIMER Post - Laser Mole % |
|---|---|---|---|---|
| $B_2O_3$ | 37.55 | 48.20% | 37.47 | 48.07% |
| $Bi_2O_3$ | 27.25 | 5.226% | 27.19 | 5.21% |
| $SiO_2$ | 18.50 | 27.52% | 18.75 | 27.88% |
| $TiO_2$ | 7.75 | 8.67% | 7.69 | 8.60% |
| $Na_2O$ | 4.11 | 5.921% | 4.01 | 5.77% |
| $ZnO$ | 1.84 | 2.02% | 1.83 | 2.01% |
| $ZrO_2$ | 1.19 | 0.86% | 1.19 | 0.87% |
| $Al_2O_3$ | 0.31 | 0.27% | 0.31 | 0.27% |
| $P_2O_5$ | 0.03 | 0.02% | 0.03 | 0.02% |
| $SO_3$ | 0.14 | 0.15% | 0.16 | 0.17% |
| $K_2O$ | 0.04 | 0.04% | 0.05 | 0.04% |
| $CaO$ | 0.06 | 0.10% | 0.06 | 0.10% |
| $Cr_2O_3$ | 0.26 | 0.15% | 0.26 | 0.15% |
| $MnO$ | 0.14 | 0.18% | 0.14 | 0.17% |
| $Fe_2O_3$ | 0.40 | 0.22% | 0.41 | 0.23% |
| $Co_2O_3$ | 0.09 | 0.05% | 0.10 | 0.05% |
| $NiO$ | 0.31 | 0.37% | 0.31 | 0.37% |
| $CuO$ | 0.01 | 0.01% | 0.00 | 0.00% |
| $Nb_2O_5$ | 0.00 | 0.00% | 0.02 | 0.01% |
| $HfO_2$ | 0.03 | 0.01% | 0.02 | 0.01% |
|  | 100.00 | 100% | 100.00 | 100% |

Fig. 13b

Main Seal

| | Main Powder Weight % | Main Powder Mol% | Main Post-Laser Weight % | Main Post-Laser Mol % |
|---|---|---|---|---|
| Te | 44.90 | 13.05 | 60.30 | 27.30 |
| V | 14.30 | 10.41 | 20.30 | 23.02 |
| O | 23.20 | 53.77 | 9.28 | 33.51 |
| Al | 8.43 | 11.58 | 4.89 | 10.47 |
| Si | 5.20 | 6.87 | 1.44 | 2.96 |
| Mg | 2.22 | 3.40 | 0.26 | 0.62 |
| Ba | 0.58 | 0.16 | - | - |
| Na | 0.03 | 0.05 | - | - |
| P | 0.00 | 0.00 | - | - |
| S | 0.01 | 0.01 | - | - |
| Cl | - | - | - | - |
| K | - | - | - | - |
| Ca | 0.04 | 0.04 | - | - |
| Mn | 0.91 | 0.61 | 1.32 | 1.39 |
| Fe | 0.08 | 0.05 | - | - |
| Ni | 0.01 | 0.00 | - | - |
| Cu | 0.01 | 0.00 | - | - |
| Zn | - | - | 0.04 | 0.04 |
| Zr | 0.01 | 0.00 | - | - |
| Ge | - | - | - | - |
| Sr | - | - | - | - |
| Mo | - | - | - | - |
| Pb | 0.01 | 0.00 | - | - |
| Bi | 0.01 | 0.00 | 1.91 | 0.53 |

Pump-out Tube Seal

| | Preform Weight % | Preform Mol % | Preform Post-Laser (Weight %) | Preform Post Laser (Mol%) |
|---|---|---|---|---|
| Te | 52.20 | 16.78 | 51.10 | 16.64 |
| V | 11.60 | 9.34 | 9.35 | 7.63 |
| O | 18.90 | 48.45 | 18.70 | 48.56 |
| Al | 7.29 | 11.08 | 4.63 | 7.13 |
| Si | 4.93 | 7.20 | 7.22 | 10.68 |
| Mg | 2.38 | 4.03 | 0.77 | 1.32 |
| Ba | 0.56 | 0.17 | 2.25 | 0.68 |
| Na | 0.57 | 1.02 | 1.55 | 2.80 |
| P | 0.06 | 0.08 | 0.11 | 0.15 |
| S | 1.32 | 1.69 | 1.73 | 2.24 |
| Cl | 0.04 | 0.05 | 0.14 | 0.16 |
| K | - | - | 0.52 | 0.55 |
| Ca | 0.07 | 0.07 | 0.16 | 0.17 |
| Mn | - | 0.04 | - | - |
| Fe | 0.06 | 0.04 | 1.69 | 1.26 |
| Ni | - | - | - | - |
| Cu | - | - | - | - |
| Zn | - | - | - | - |
| Ge | - | - | 0.06 | 0.04 |
| Sr | 0.01 | 0.00 | 0.03 | 0.01 |
| Zr | 0.01 | 0.00 | - | - |
| Mo | - | - | - | - |
| Pb | - | - | - | - |
| Bi | - | - | - | - |

Primer

| | Primer Powder (Weight %) | Primer Powder (Mol%) | Primer Tempered (Weight %) | Primer Tempered (Mol%) |
|---|---|---|---|---|
| Bi | 19.70 | 1.92 | 33.30 | 4.15 |
| Si | 9.73 | 7.06 | 10.10 | 9.37 |
| B | 10.10 | 19.03 | 6.35 | 15.30 |
| Ti | 3.81 | 1.62 | 5.73 | 3.12 |
| Zn | 1.50 | 0.47 | 2.24 | 0.89 |
| C | 6.80 | 11.53 | 4.09 | 8.87 |
| O | 42.80 | 54.48 | 33.80 | 55.02 |
| Na | 3.66 | 3.24 | 2.16 | 2.45 |
| Al | 0.21 | 0.16 | 0.11 | 0.11 |
| Zr | 0.60 | 0.13 | 0.99 | 0.28 |
| Cr | 0.14 | 0.05 | 0.26 | 0.13 |
| Mn | 0.08 | 0.03 | 0.12 | 0.06 |
| Fe | 0.26 | 0.09 | 0.35 | 0.16 |
| Co | 0.04 | 0.01 | 0.06 | 0.03 |
| Ni | 0.18 | 0.06 | 0.27 | 0.12 |
| P | 0.02 | 0.01 | - | - |
| S | 0.10 | 0.06 | - | - |
| Cl | 0.03 | 0.02 | - | - |
| K | 0.04 | 0.02 | - | - |
| Ca | 0.01 | 0.01 | - | - |
| Nb | 0.01 | 0.00 | - | - |
| Cu | 0.003 | 0.00 | 0.01 | 0.00 |
| Y | 0.001 | 0.00 | - | - |

Example Materials for Main Seal, Primer(s), and Pump-out Tube Seal (Wt. % & Mol %) Based on Elemental Analysis (non-oxide analysis) [WDXRF]

Fig. 14

Example Pump-Out Tube Seal Material Pre and Post Sintered (Weight % and Mol %) (carbon detecting XRF)

| | Preform Pre-Laser (wt%) | Preform Post-Laser (wt%) | | Pre-Laser (Mol%) | Preform Post-Laser (Mol%) |
|---|---|---|---|---|---|
| $TeO_4$ | 6.00 | 8.30 | $TeO_4$ | 4.60 | 6.17 |
| $TeO_3$ | 46.20 | 43.10 | $TeO_3$ | 34.80 | 32.07 |
| $TeO_{3+1}$ | 2.50 | 2.50 | $TeO_{3+1}$ | 1.86 | 1.83 |
| $V_2O_5$ | 5.90 | 2.92 | $V_2O_5$ | 5.05 | 2.48 |
| $VO_2$ | 11.00 | 10.04 | $VO_2$ | 5.85 | 5.97 |
| $V_2O_3$ | 0.50 | 1.08 | $V_2O_3$ | 0.57 | 0.74 |
| $Al_2O_3$ | 11.55 | 7.38 | $Al_2O_3$ | 13.62 | 8.59 |
| $SiO_2$ | 8.85 | 13.02 | $SiO_2$ | 17.70 | 25.75 |
| $MgO$ | 3.31 | 1.08 | $MgO$ | 9.88 | 3.17 |
| $BaO$ | 0.52 | 2.12 | $BaO$ | 0.41 | 1.64 |
| $Na_2O$ | 0.64 | 1.76 | $Na_2O$ | 1.25 | 3.38 |
| $P_2O_5$ | 0.12 | 0.21 | $P_2O_5$ | 0.05 | 0.09 |
| SO3 | 2.76 | 3.64 | SO3 | 4.15 | 5.41 |
| Cl | - | - | Cl | - | - |
| $K_2O$ | - | 0.54 | $K_2O$ | - | 0.69 |
| $CaO$ | 0.08 | 0.19 | $CaO$ | 0.18 | 0.40 |
| $Fe_2O_3$ | 0.07 | 2.04 | $Fe_2O_3$ | 0.05 | 1.52 |
| $GeO_2$ | - | 0.08 | $GeO_2$ | - | 0.09 |

Fig. 15

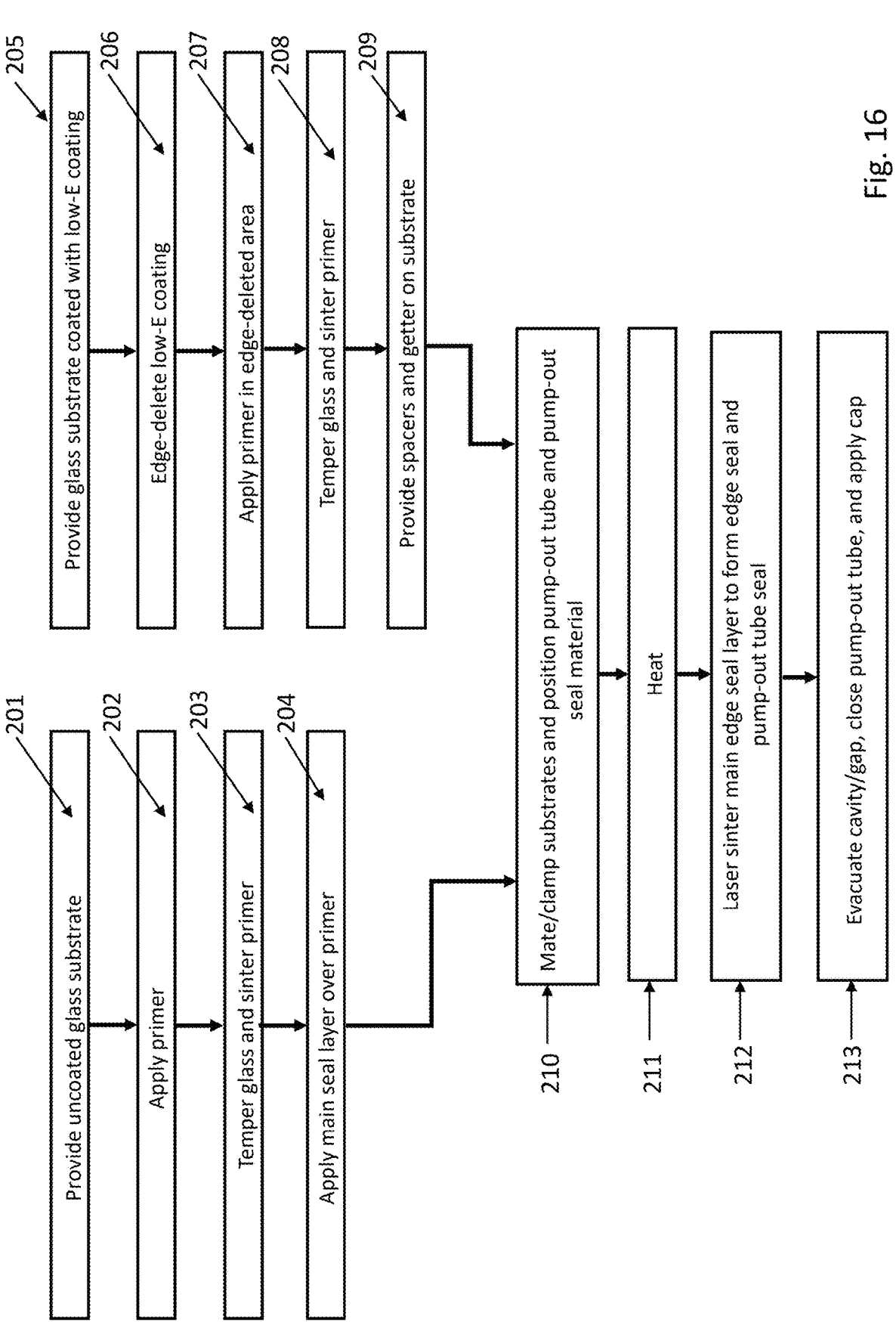

205 Provide glass substrate coated with low-E coating

206 Edge-delete low-E coating

207 Apply primer in edge-deleted area

208 Temper glass and sinter primer

209 Provide spacers and getter on substrate

201 Provide uncoated glass substrate

202 Apply primer

203 Temper glass and sinter primer

204 Apply main seal layer over primer

210 Mate/clamp substrates and position pump-out tube and pump-out seal material

211 Heat

212 Laser sinter main edge seal layer to form edge seal and pump-out tube seal

213 Evacuate cavity/gap, close pump-out tube, and apply cap

Fig. 16

VACUUM INSULATED PANEL WITH IMPROVED THERMAL PERFORMANCE PROXIMATE EDGE OF GLASS DURING ASYMMETRIC THERMAL CONDITIONS

FIELD

Certain example embodiments are generally related to vacuum insulated devices such as vacuum insulating panels that may be used for windows or the like, and/or methods of making same.

BACKGROUND AND SUMMARY

Vacuum insulated panels are known in the art. For example, and without limitation, vacuum insulating panels are disclosed in U.S. Pat. Nos. 5,124,185, 5,657,607, 5,664, 395, 7,045,181, 7,115,308, 8,821,999, 10,153,389, and 11,124,450, the disclosures of which are all hereby incorporated herein by reference in their entireties.

As discussed and/or shown in one or more of the above patent documents, a vacuum insulating panel typically includes an outboard substrate, an inboard substrate, a hermetic edge seal, a sorption getter, a pump-out port, and spacers (e.g., pillars) sandwiched between at least the two substrates. The gap between the substrates may be at a pressure less than atmospheric pressure to provide insulating properties. Providing a vacuum in the space between the substrates reduces conduction and convection heat transport, and thus provides insulating properties. For example, a vacuum insulating panel provides thermal insulation resistance by reducing convective energy between the two substrates, reducing conductive energy between the two transparent substrates, and reducing radiative energy with a low-emissivity (low-E) coating provided on one of the substrates. Vacuum insulating panels may be used in window applications (e.g., for commercial and/or residential windows), and/or for other applications such as commercial refrigeration and consumer appliance applications.

Conventional non-vacuum insulating glass (IG) units and conventional vacuum insulating panels have suffered from less than desirable thermal performance.

In certain example embodiments, components such as edge seal material(s) and/or dimension(s) thereof are configured in a vacuum insulating panel to improve thermal performance to provide for higher glass temperatures on the warm side of the panel during asymmetric thermal conditions, proximate the edge seal and/or at other locations, so as to improve thermal performance such as by creating a thermal shunt, path of greater resistance, between the first and second glass substrates.

In certain example embodiments, there may be provided a vacuum insulating panel comprising: a first glass substrate; a second glass substrate; a plurality of spacers provided in a gap between at least the first and second glass substrates, wherein the gap is at pressure less than atmospheric pressure; a seal provided at least partially between at least the first and second glass substrates; wherein no more than two glass substrates are provided in the vacuum insulating panel; and wherein material(s) and/or dimension(s) of the seal are configured so that, under reference testing conditions where the panel is positioned between warm (about 21 degrees C., about 8-10% relative humidity) and cold (about minus 18 degrees C.) areas and a wind speed (about 6 mph) applied in the cold area, until steady-state conditions have been met for temperature on both sides, and an infrared camera is used to measure glass temperature on the warm side at different locations moving laterally inward from the edge of the panel, the panel has at least two of: (i) a warm side glass temperature rise rate (TRR) of at least about 0.14 degrees C./mm from a location 12.5 mm laterally inward from the edge of the panel to a location 62.5 mm laterally inward from the edge of the panel, where $TRR=(T_{62.5}-T_{12.5})/(62.5-12.5)$, where $T_{62.5}$ is glass temperature in degrees C. on the warm side measured at a location 62.5 mm laterally inward from the edge of the panel and $T_{12.5}$ is glass temperature in degrees C. on the warm side measured at a location 12.5 mm laterally inward from the edge of the panel; (ii) a warm side glass temperature of at least 19.7 degrees C. at a location 62.5 mm laterally inward from the edge of the panel; and (iii) a warm side glass temperature of at least 12.4 degrees C. at a location 12.5 mm laterally inward from the edge of the panel.

Example technical advantages may include a vacuum insulating panel with one or more of: improved thermal performance during asymmetric thermal conditions, higher glass temperatures on the warm side of the panel during asymmetric thermal conditions proximate the edge seal and/or at other locations; lower edge-of-glass (EOG) and/or center-of-glass (COG) u-factor; improved thermal shunt resistance; improved moisture resistance; and/or improved thermal stability during asymmetric thermal conditions.

BRIEF DESCRIPTION OF THE DRAWINGS

These and/or other aspects, features, and/or advantages will become apparent and more readily appreciated from the following description of various example embodiments, taken in conjunction with the accompanying drawings. Thicknesses of layers/elements, and sizes of components/elements, are not necessarily drawn to scale or in actual proportion to one another, but rather are shown as example representations. Like reference numerals may refer to like parts throughout the several views. Each embodiment herein may be used in combination with any other embodiment(s) described herein.

FIG. 8b is a cross-sectional view of a ceramic preform seal of FIG. 8a, surrounding a pump-out tube, according to an example embodiment, which may be used in combination with any embodiment herein including those of FIGS. 1-16.

Figure 7:
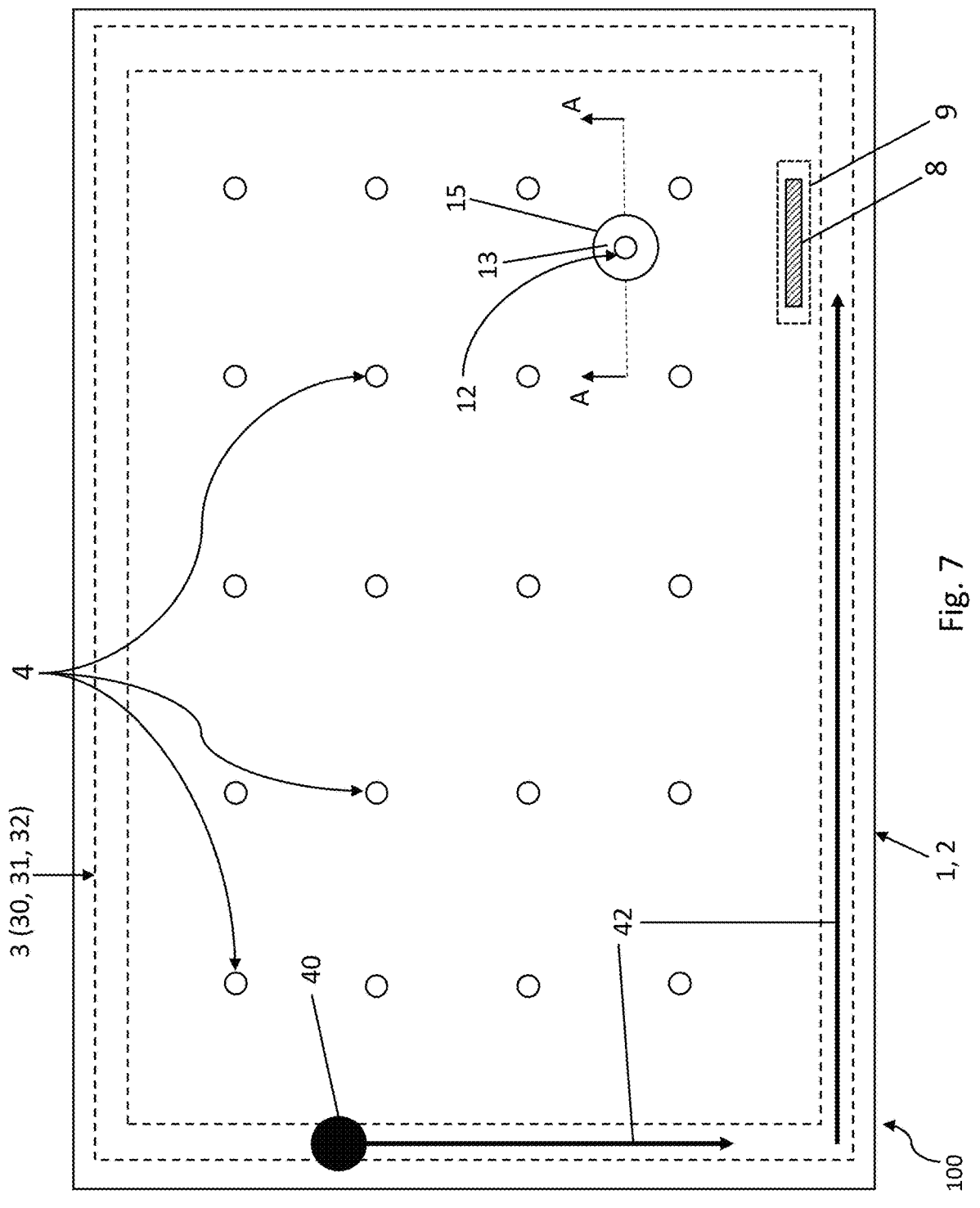
FIG. 7 is a schematic top view of a vacuum insulating unit/panel according to an example embodiment, showing a laser used in forming the edge seal during manufacturing, which may be used in combination with any embodiment herein including those of FIGS. 1-16.
Figure 8A:
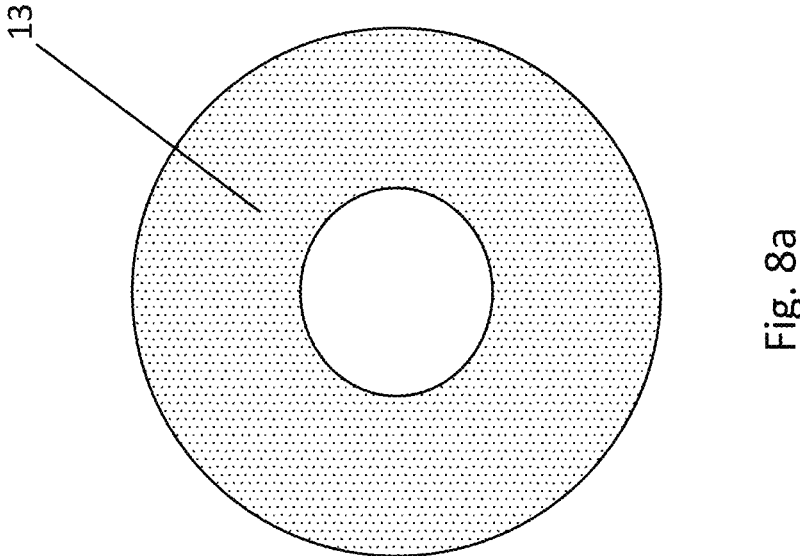
FIG. 8a is a top view of a ceramic preform to be used for a pump-out tube seal according to an example embodiment, which may be used in combination with any embodiment herein including those of FIGS. 1-16.
Figures 8B, 8C:
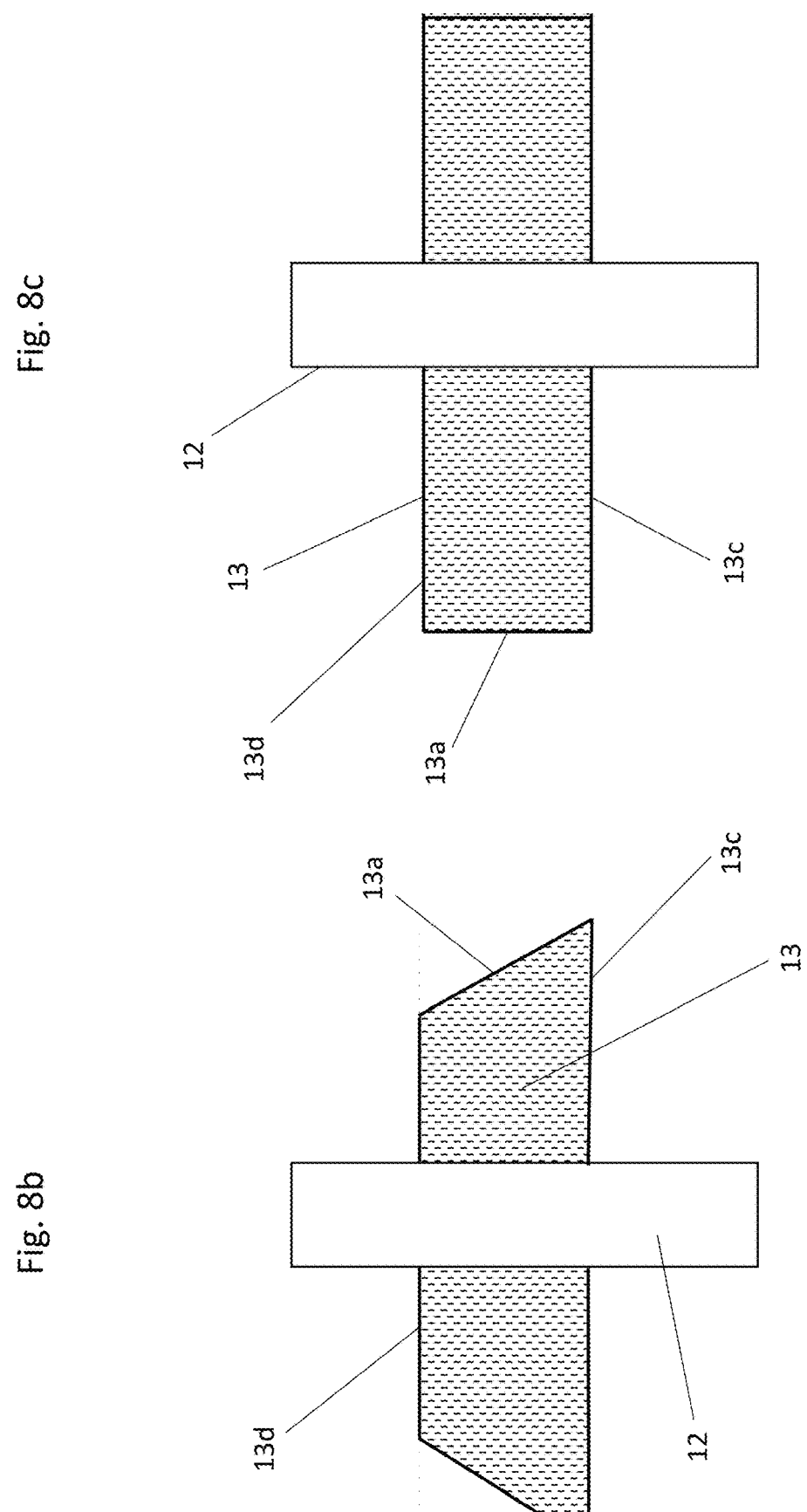

FIG. 8c is a cross-sectional view of a ceramic preform seal of FIG. 8a, surrounding a pump-out tube, according to another example embodiment, which may be used in combination with any embodiment herein including those of FIGS. 1-16.

Figure 8D:
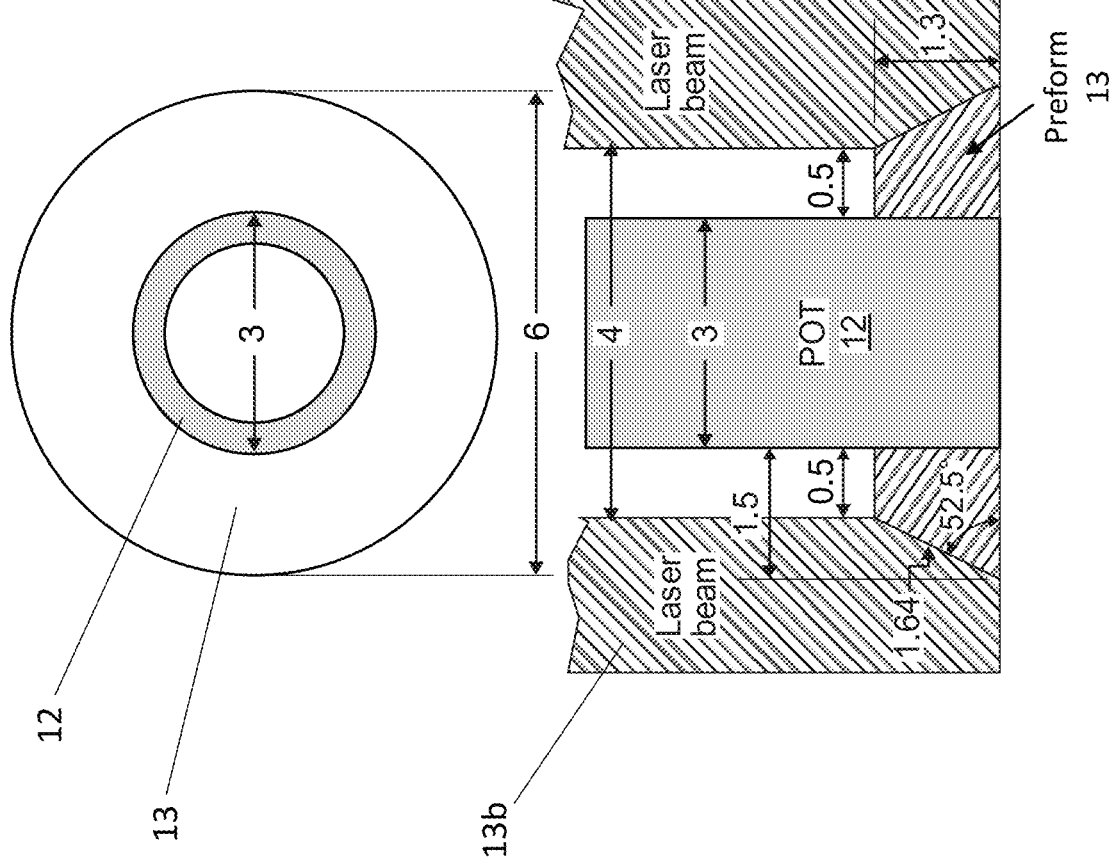

FIG. 8d is a schematic cross-sectional diagram of the seal preform of any of FIGS. 8a-8c being laser sintered/sealed, according to an example embodiment, which may be used in combination with any embodiment herein including those of FIGS. 1-16.

Figure 9:
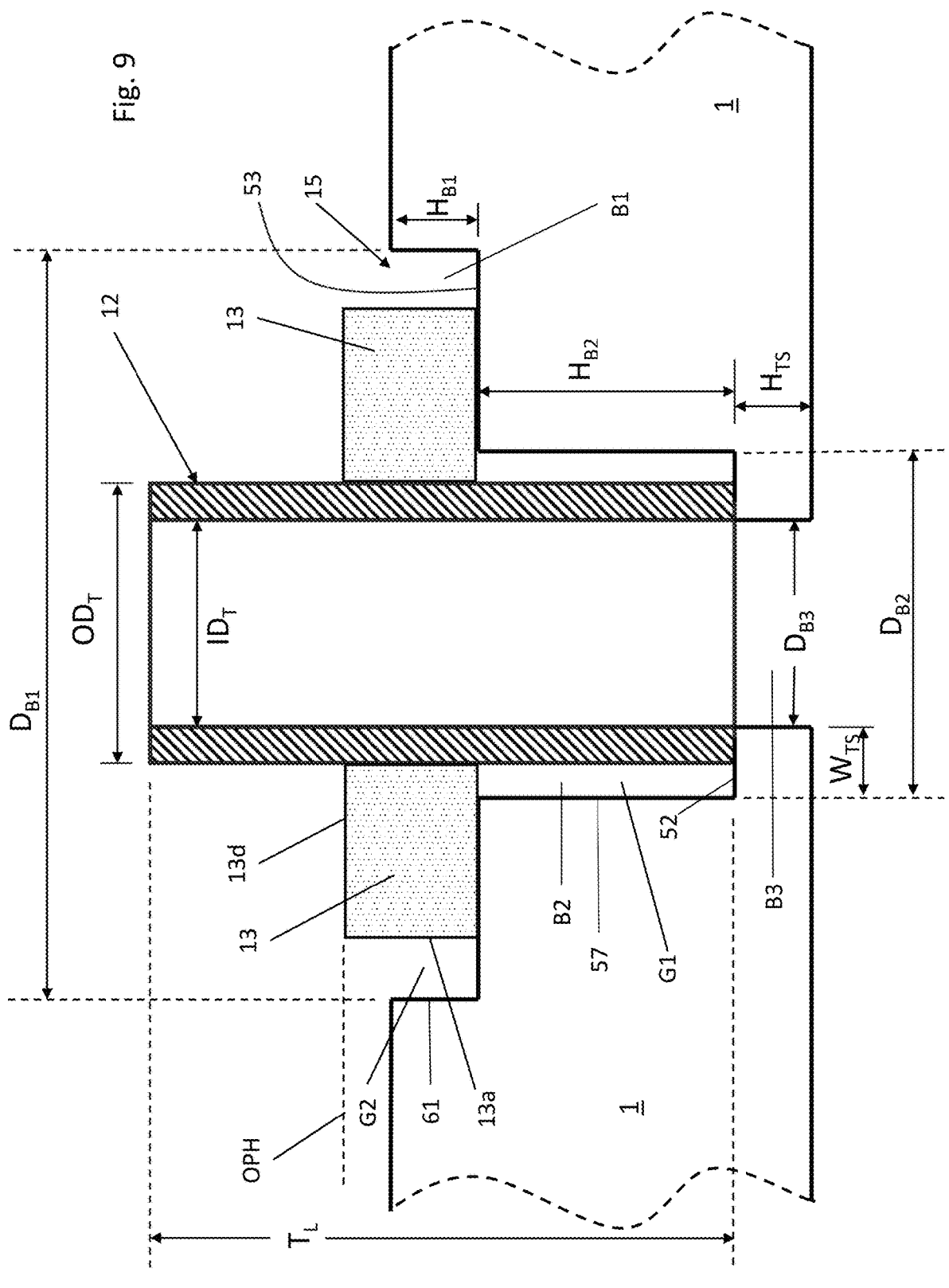

FIG. 9 is a side cross-sectional view, e.g., taken along section line A-A in FIG. 7, of an evacuation tube structure according to an example embodiment, prior to laser sintering/sealing of the tube seal preform, which may be used in combination with any embodiment herein including those of FIGS. 1-16.

Figure 10A:
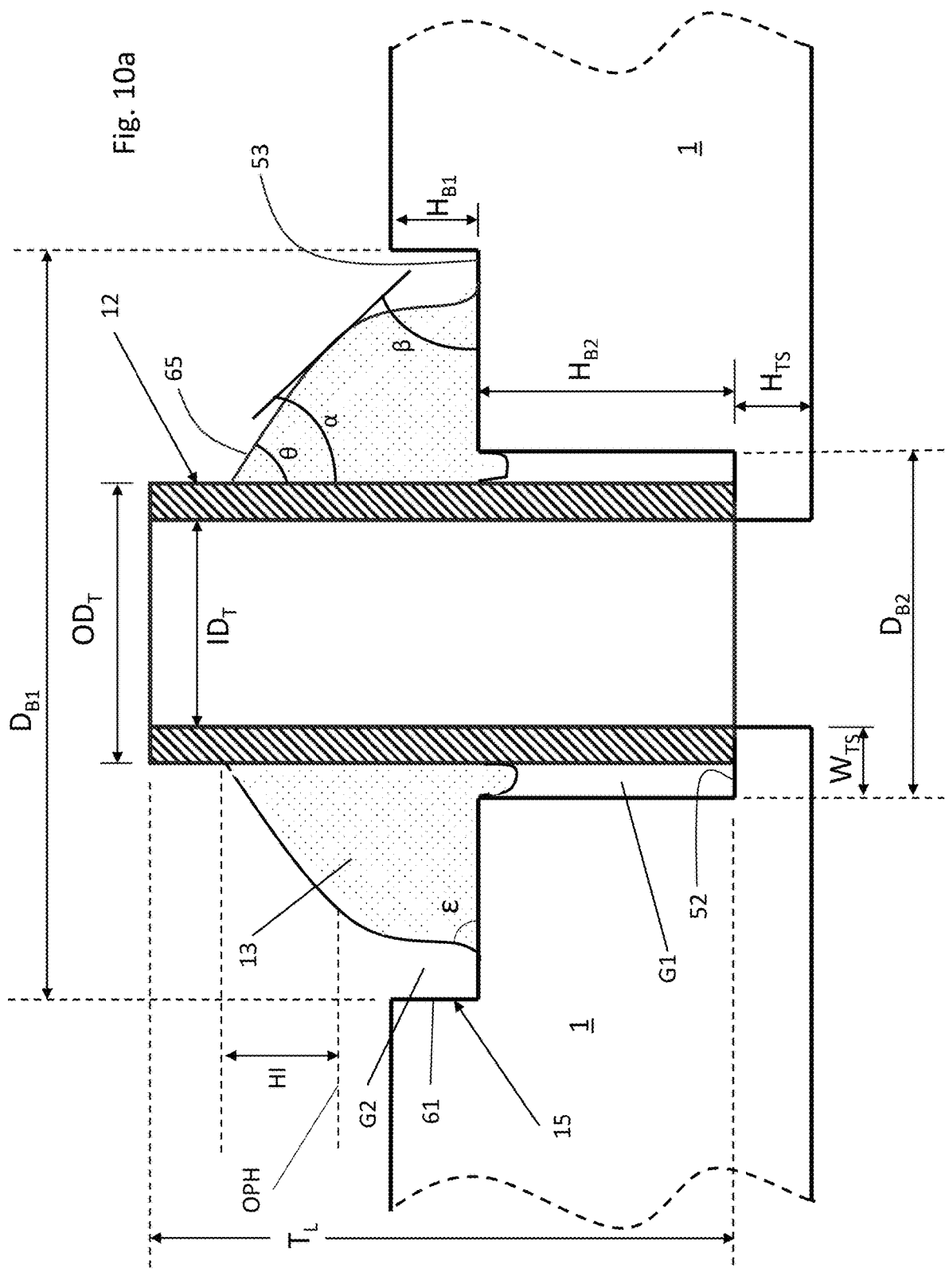

FIG. 10a is a side cross-sectional view, e.g., taken along section line A-A in FIG. 7, of an evacuation tube structure according to an example embodiment, after laser sintering/sealing of the tube seal preform, which may be used in combination with any embodiment herein including those of FIGS. 1-16.

Figure 10B:
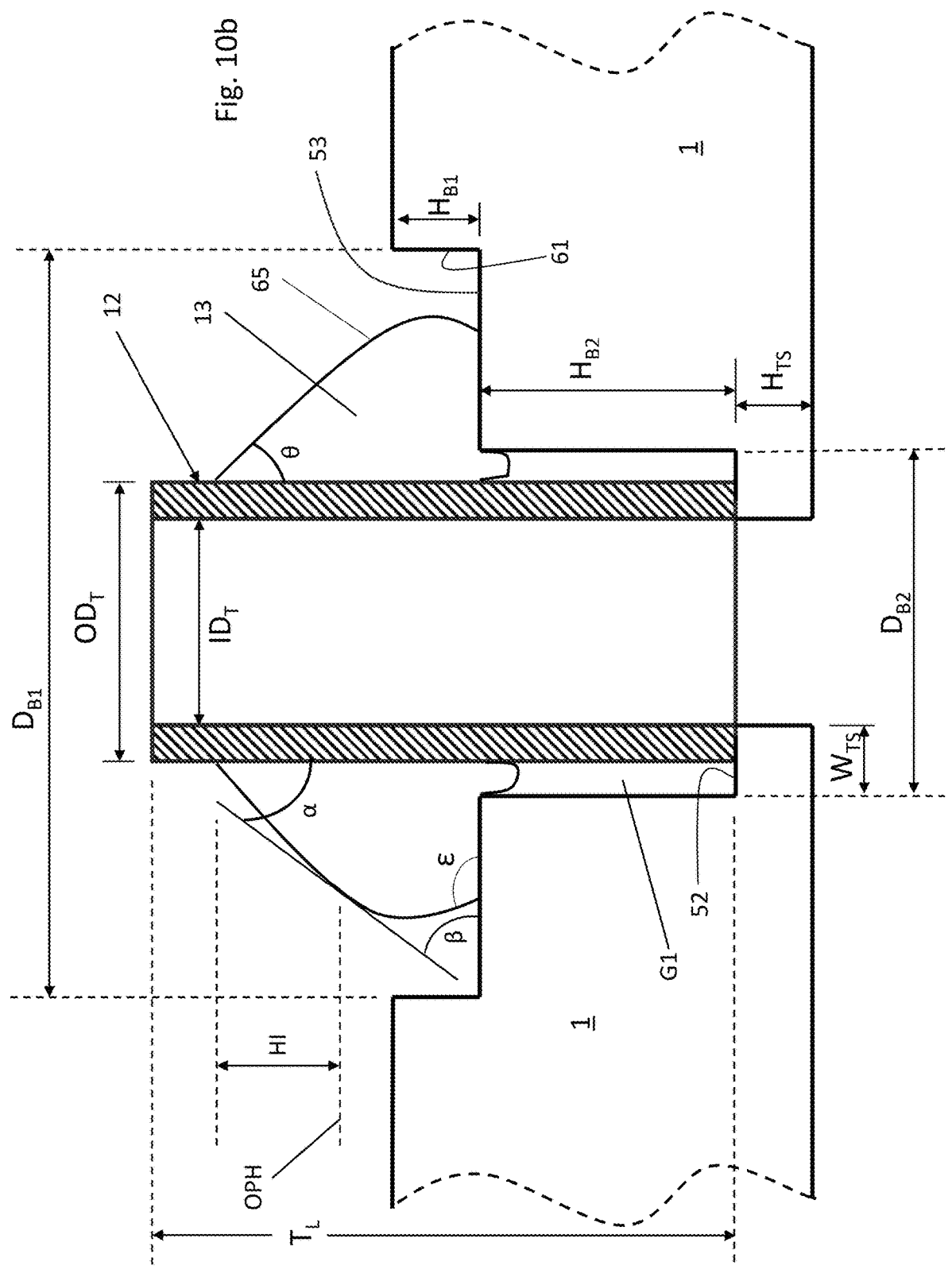

FIG. 10b is a side cross-sectional view, e.g., taken along section line A-A in FIG. 7, of an evacuation tube structure according to another example embodiment, after laser sintering/sealing of the tube seal preform, which may be used in combination with any embodiment herein including those of FIGS. 1-16.

Figure 10C:
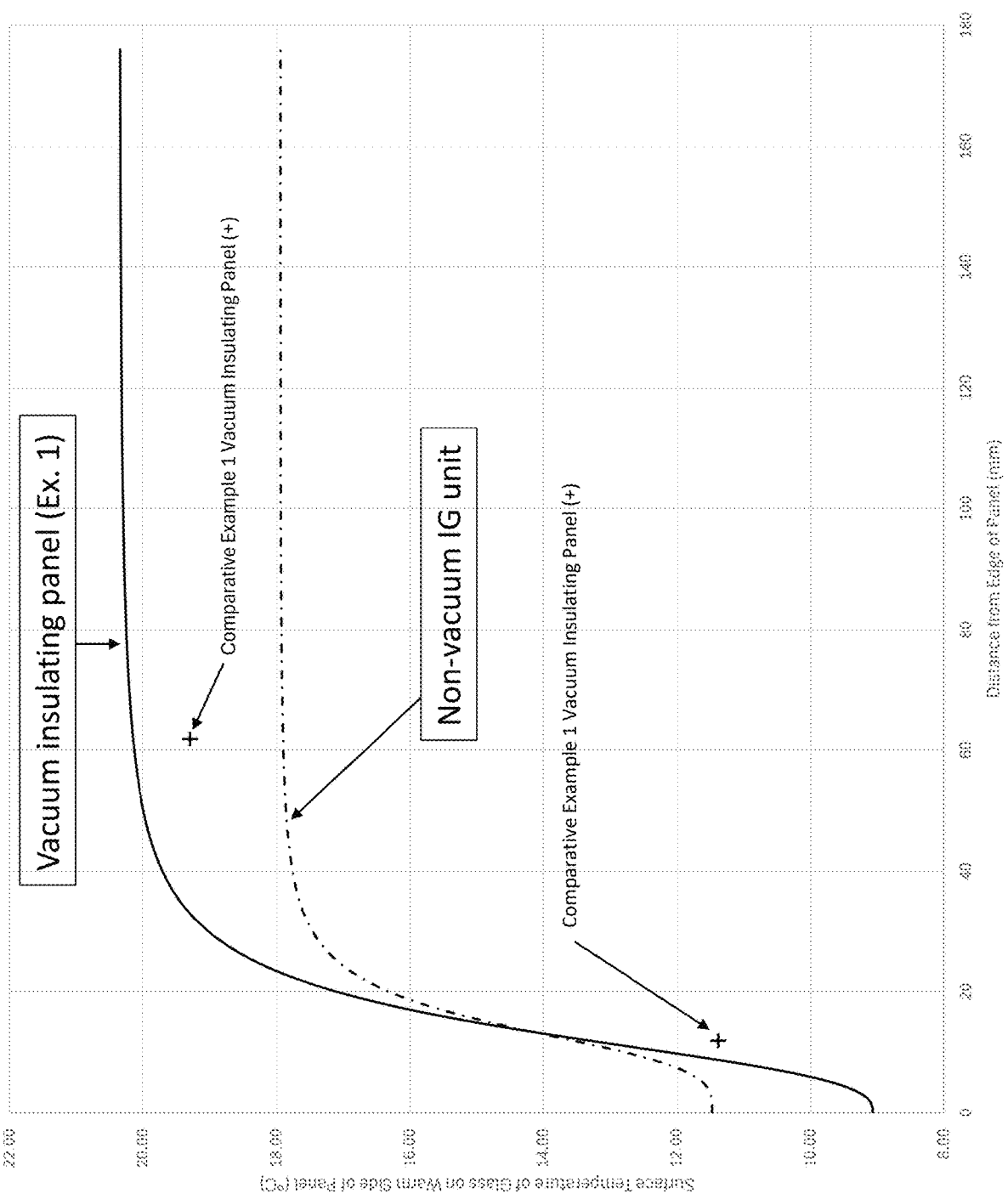

FIG. 10c is a surface temperature (degrees C.) vs. distance in from edge of panel (mm) graph illustrating data from testing of a vacuum insulating panel according to an example embodiment (solid line in FIG. 10c; e.g., see also panel in FIGS. 2, 7 and materials in FIGS. 11-15) compared to a conventional non-vacuum IG unit (dotted line in FIG. 10c).

Figure 10D:
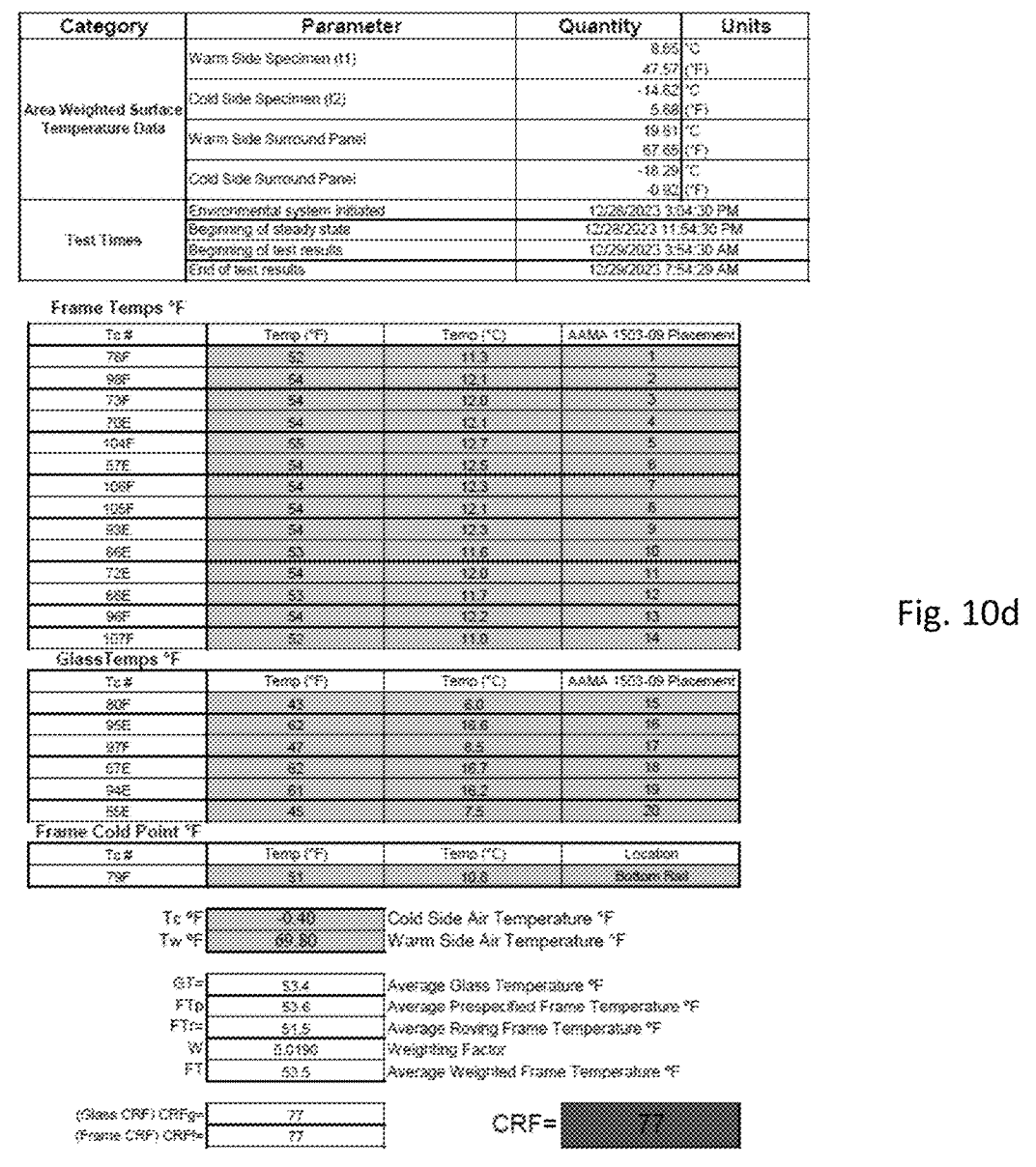

FIG. 10d is a table setting forth data/measurements from an example vacuum insulating panel (e.g., see FIGS. 2 and 11-15) tested and found to have a CRF$_G$ value of 77.

FIG. 11 is a table/graph showing weight % and mol % of various compounds/elements in a main seal material according to an example embodiment (measured via non-carbon detecting XRF), which main seal material may be used in combination with any embodiment herein including those of FIGS. 1-16.

FIG. 12 is a table/graph showing weight % and mol % of various compounds/elements in a main seal material according to an example embodiment (measured via carbon detecting XRF), before and after laser treatment using an 808 or 810 nm continuous wave laser for edge seal formation, which main seal material may be used in combination with any embodiment herein including those of FIGS. 1-16.

FIG. 13a is a table/graph showing weight % and mol % of various compounds/elements in a primer seal material according to an example embodiment (measured via carbon detecting XRF), before and after substrate tempering, which primer material may be used in combination with any embodiment herein (e.g., for one or both primer layers, and/or for a primer for an evacuation tube seal) including those of FIGS. 1-16.

FIG. 13b is a table/graph showing weight % and mol % of various compounds/elements in a primer seal material according to an example embodiment (measured via fused bead XRF), before and after substrate tempering and laser sealing, which primer material may be used in combination with any embodiment herein (e.g., for one or both primer layers, and/or for a primer for an evacuation tube seal) including those of FIGS. 1-16.

FIG. 14 is a table/graph showing an elemental analysis (non-oxide analysis) of weight % and mol % of various elements in each of a main seal material (left side in the figure), a pump-out tube seal material (center in the figure), and a primer seal material (right side in the figure), according to an example embodiment(s) (measured via WDXRF), before and after laser treatment using an 808 or 810 nm continuous wave laser to fire/sinter the main seal layer for seal formation, which various seal materials may be used in combination with any embodiment herein including those of FIGS. 1-16.

FIG. 15 is a table/graph showing weight % and mol % of various compounds/elements in a pump-out tube seal material according to an example embodiment (measured via carbon detecting XRF), before and after laser sintering/firing, which pump-out tube seal material may be used in combination with any embodiment herein including those of FIGS. 1-16.

FIG. 16 is a flowchart illustrating example steps in making a vacuum insulating panel according to various example embodiments, which may be used in combination with any embodiment herein including those of FIGS. 1-16.

DETAILED DESCRIPTION

The following detailed structural and/or functional description(s) is/are provided as examples only, and various alterations and modifications may be made. The example embodiments herein do not limit the disclosure and should be understood to include all changes, equivalents, and replacements within ideas and the technical scope herein. Hereinafter, certain examples will be described in detail with reference to the accompanying drawings. When describing various example embodiments with reference to the accompanying drawings, like reference numerals may refer to like components and a repeated description related thereto may be omitted.

Figure 4:
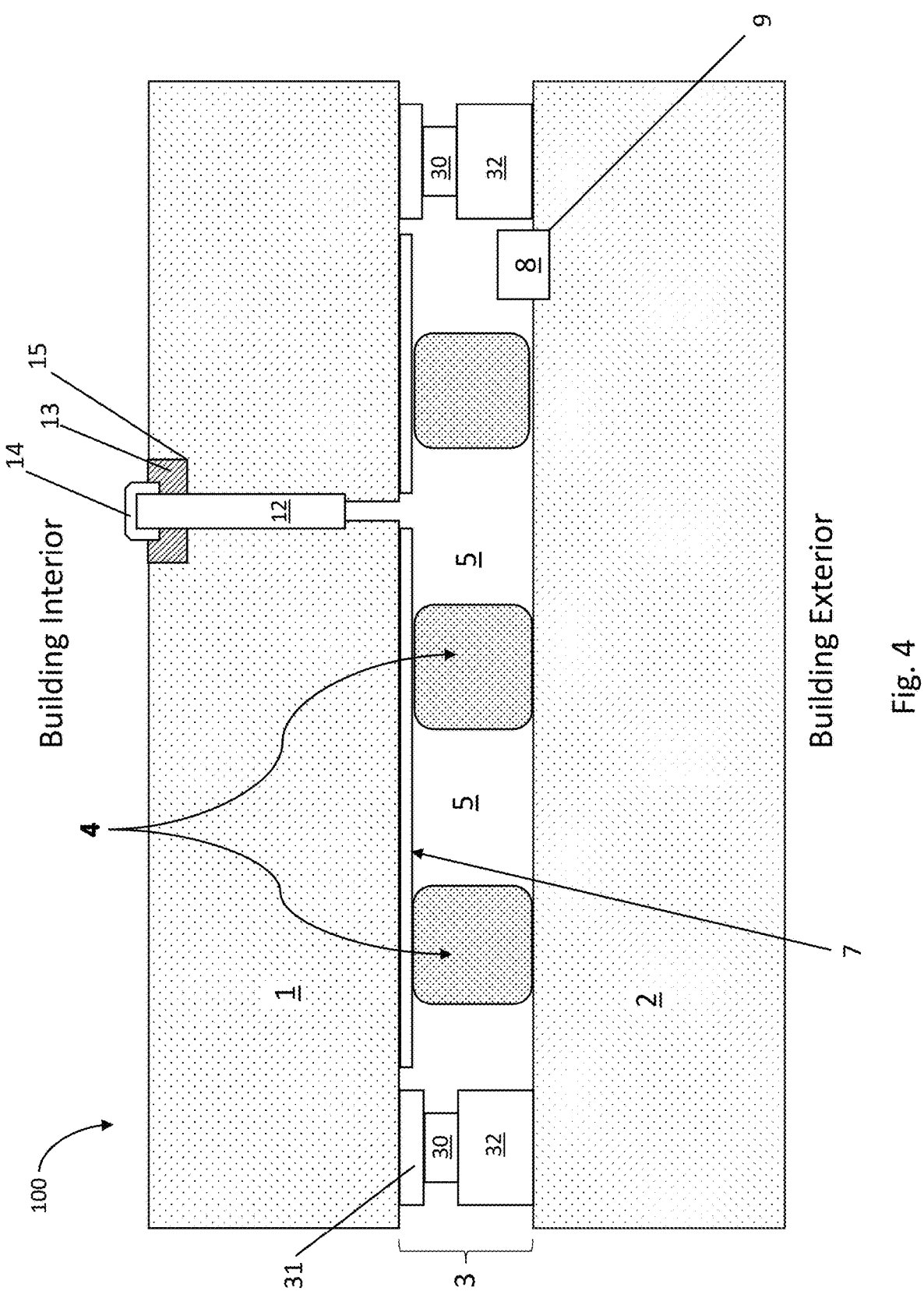
FIG. 4 is a side cross sectional view of a vacuum insulating unit/panel according to an example embodiment.
Figure 5:
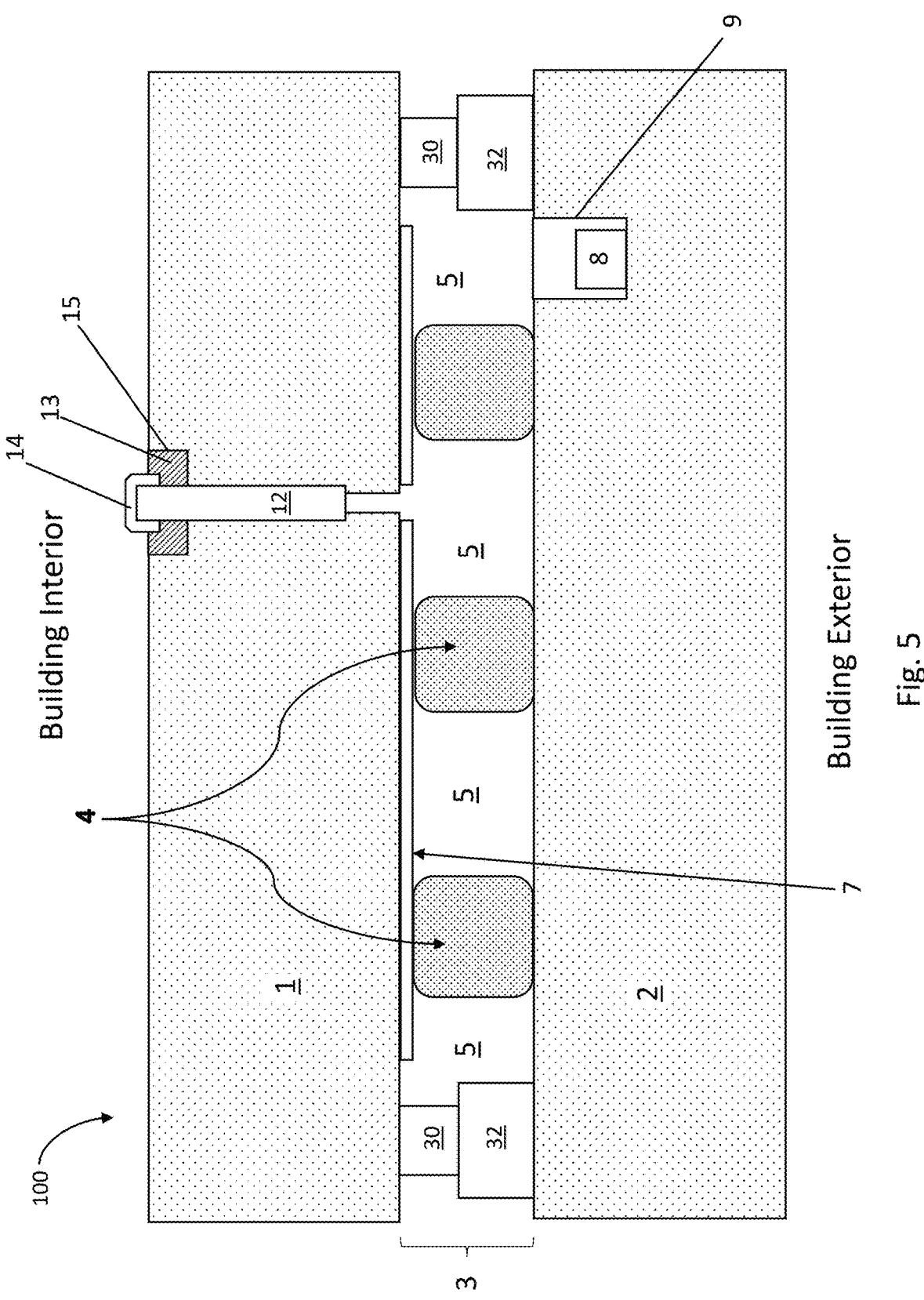
FIG. 5 is a side cross sectional view of a vacuum insulating unit/panel according to an example embodiment.
Figure 6:
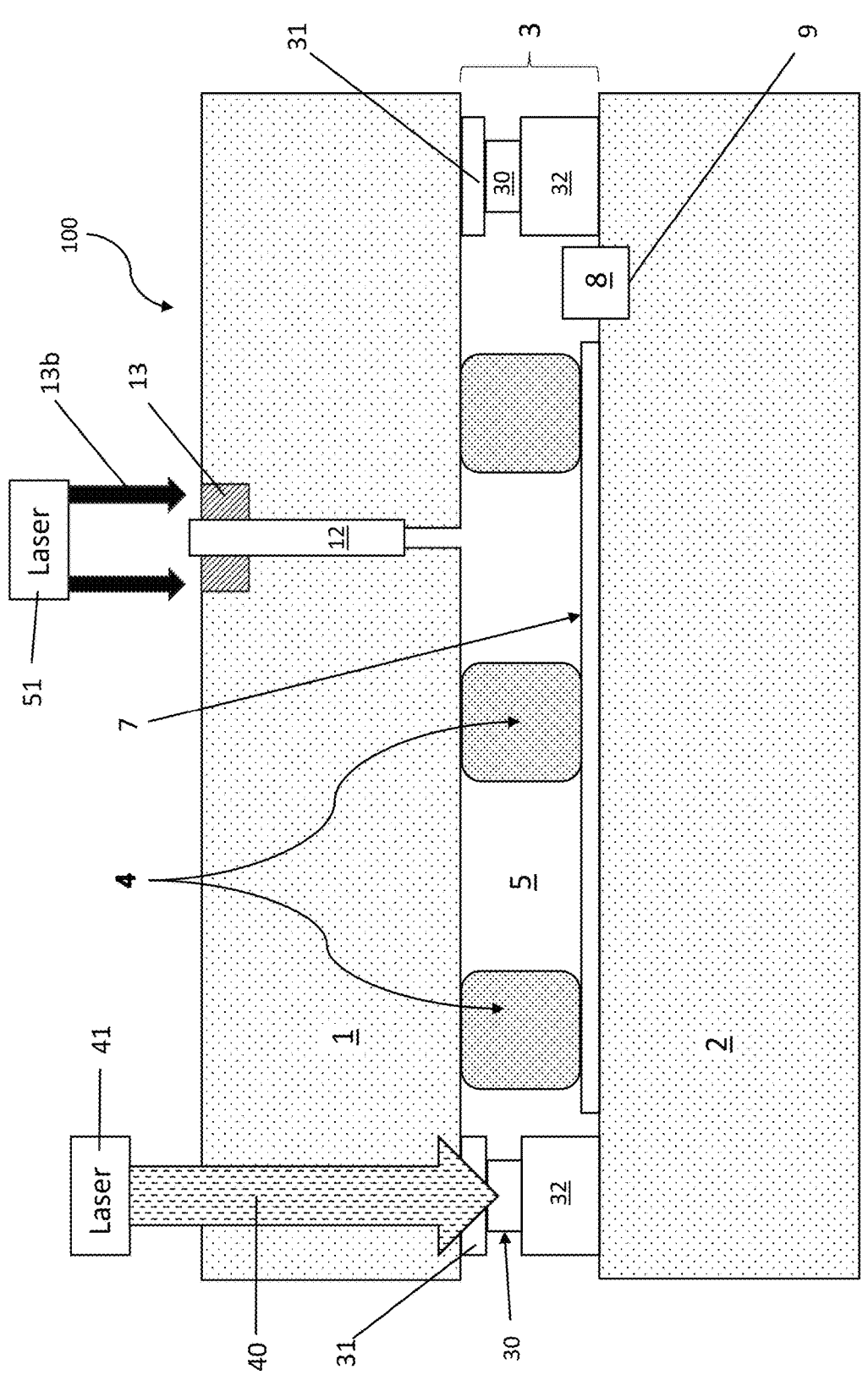
FIG. 6 is a side cross sectional schematic view of a vacuum insulating unit/panel according to an example embodiment, showing a laser being used in forming the edge seal during manufacturing, which may be used in combination with any embodiment herein including those of FIGS. 1-16.

FIGS. 1-5 are side cross sectional views each illustrating a vacuum insulating panel 100 according to various example embodiments, FIG. 6 is a side cross sectional view of an example vacuum insulating unit/panel 100 showing a laser 41 used in sintering/firing the main seal layer 30 when forming the edge seal 3 during manufacturing (which may be used in combination with any embodiment herein, and laser 51 which generates a donut-shaped (or ring-shaped) laser beam 13b to fire/sinter the evacuation tube seal 13, and FIG. 7 is a schematic top view of an example vacuum insulating unit/panel 100 showing a laser 41 used in sintering/firing the main seal layer 30 when forming the edge seal 3 during manufacturing (which may be used in combination with any embodiment herein). It should be noted that, in practice, such vacuum insulating panels/units may be oriented upside down or sideways from the orientations illustrated in FIGS. 1-7. Vacuum insulating panel 100 may be used in window applications (e.g., for commercial and/or residential windows), and/or for other applications such as commercial refrigeration and consumer appliance applications.

Figure 2:
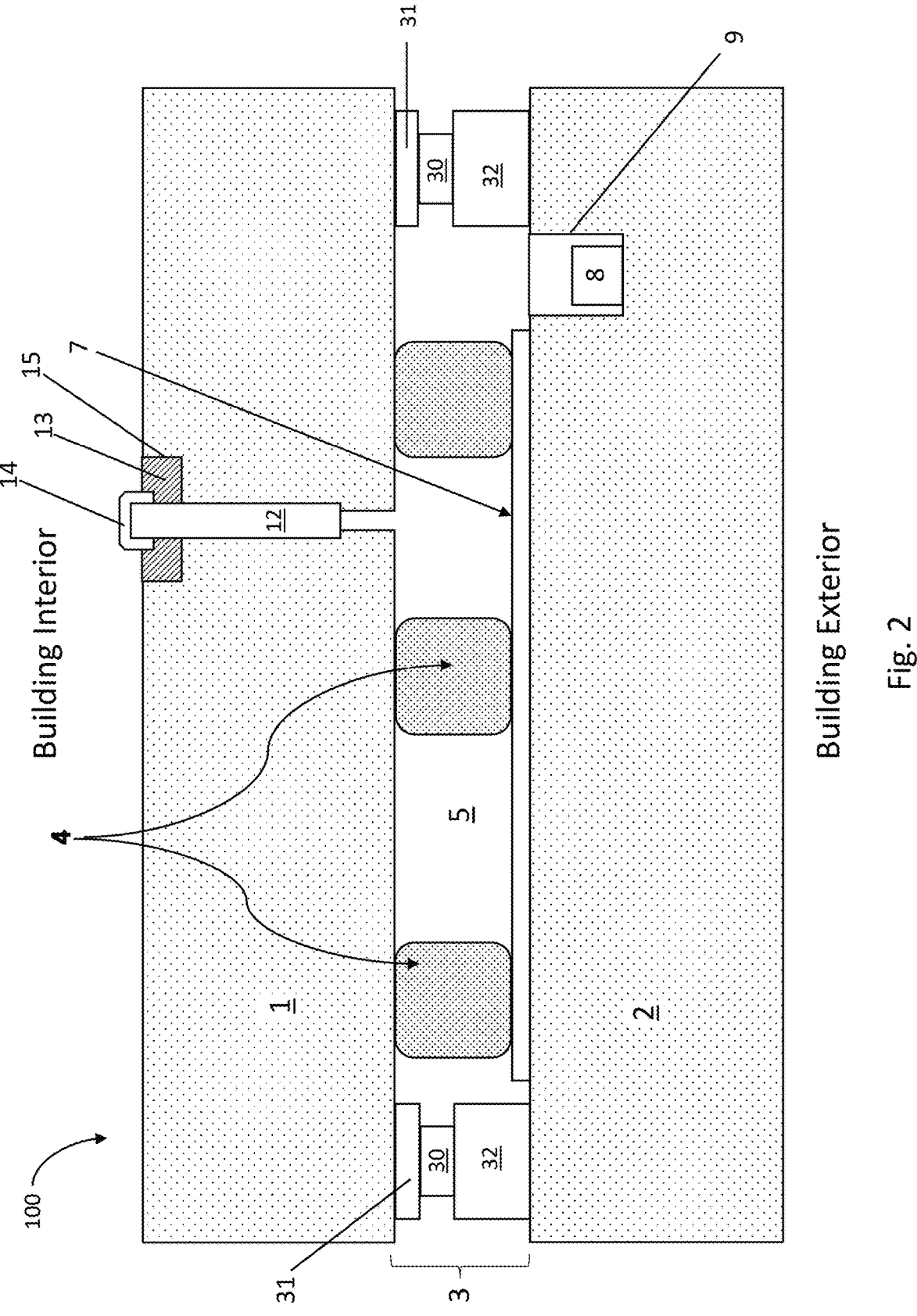
FIG. 2 is a side cross sectional view of a vacuum insulating unit/panel according to an example embodiment.
Figure 3:
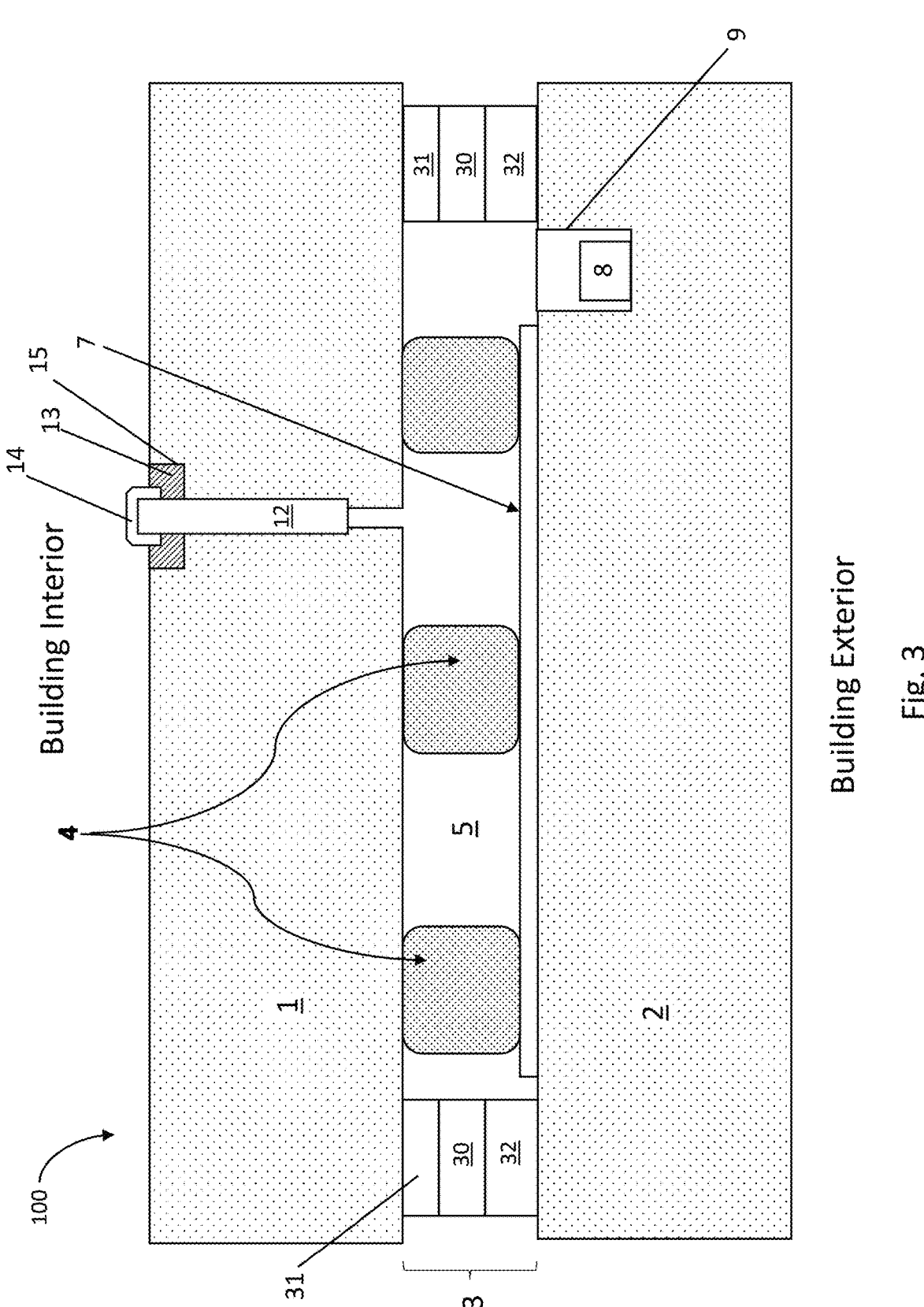
FIG. 3 is a side cross sectional view of a vacuum insulating unit/panel according to an example embodiment.

Referring to FIGS. 1-7, each vacuum insulating panel 100 may include at least a first substrate 1 (e.g., glass substrate), a second substrate 2 (e.g., glass substrate), a hermetic edge seal 3 at least partially provided proximate the edge of the panel 100, and a plurality (e.g., an array) of spacers 4 provided between at least the substrates 1 and 2 for spacing the substrates from each other and so as to help provide low-pressure space/gap 5 between at least the substrates. Each glass substrate 1, 2 may be flat, or substantially flat, possibly with non-uniform surface features from thermal heat treatment of the glass, in certain example embodiments. Support spacers 4, sometimes referred to as pillars, may be of any suitable shape (e.g., round, oval, disc-shaped, square, rectangular, rod-shaped, etc.) and may be of or include any suitable material such as stainless steel, aluminum, ceramic, solder glass, metal, and/or glass. Certain example support spacers 4 shown in the figures are substantially circular as viewed from above and substantially rectangular as viewed in cross section, and may have rounded edges. The hermetic edge seal 3 may include one or more of main seal layer 30, upper primer layer 31, and lower primer layer 32. Each "layer" herein may comprise one or more layers. At least one thermal control and/or solar control coating 7, such as a multi-layer low-emittance (low-E) coating, may be provided on at least one of the substrates 1 and 2 in order to further improve insulating properties of the panel. The solar control coating 7 may be provided on substrate 1 or substrate 2, or such a solar control coating may be provided on both substrates 1 and 2. For example, FIGS. 1-3 and 6 illustrate such a coating 7 (e.g., low-E coating) provided on substrate 2, whereas FIGS. 4-5 illustrate the coating 7 provided on substrate 1. Each substrate 1 and 2 is preferably of or including glass, but may instead be of other material such as plastic or quartz. For example, one or both glass substrates 1 and 2 may be soda-lime-silica based glass substrates, borosilicate glass substrates, lithia aluminosilicate glass substrates, or the like, and may be clear, low iron, or otherwise tinted/colored such as green, grey, bronze, or blue tinted. Substrates 1 and 2, in certain example embodiments, may each have a visible transmission of at least about 40%, more preferably of at least about 50%, and most preferably of from about 60-90%. The vacuum insulating panel 100, in certain example embodiments, may have a visible transmission of at least 40%, more preferably of at least 50%, and most preferably of at least 60%. The substrates 1 and 2 may be substantially parallel (parallel plus/minus ten degrees, more preferably plus/minus five degrees) to each other in certain example embodiments. Substrates 1 and 2 may or may not have the same thickness, and may or may not be of the same size and/or same material, in various example embodiments. When glass is used for substrates 1 and 2, each of the glass substrates may be from about 1-12 mm thick, more preferably from about 2-12 mm thick, more preferably from about 3-8 mm thick, and most preferably from about 4-6 mm thick. When glass is used for substrates 1 and 2, the glass may or may not be tempered (e.g., thermally tempered). Although thermally tempered glass substrates are desirable in certain environments, the glass substrate(s) may be annealed or heat strengthened. As known in the art, thermal tempering of soda-lime-silicate based glass typically involves heating the glass to a temperature of at least 585 degrees C., more preferably to at least 600 degrees C., more preferably to at least 620 degrees C. (e.g., to a temperature of from about 620-650 degrees C.), and then rapidly cooling the heated glass so as to compress surface regions of the glass to make it stronger. The glass substrates may be thermally tempered to increase compressive surface stress and/or central tension stress, and to impart safety glass properties including small fragmentation upon breakage. When tempered glass substrates 1 and/or 2 are used, the substrate(s) may be tempered (e.g., thermally or chemically tempered) prior to firing/sintering of main edge seal material 30 (e.g., via laser) to form the edge seal 3.

When heat strengthened glass substrates 1 and/or 2 are used, the substrate(s) may be heat strengthened prior to firing/sintering of the main edge seal material 30 (e.g., via laser) to form the edge seal 3. When a vacuum insulated glass panel/unit has one tempered glass substrate and one heat strengthened substrate, the substrate(s) may be tempered (e.g., thermally or chemically tempered) and heat strengthened prior to firing/sintering of the main edge seal material 30 (e.g., via laser) to form the edge seal 3.

In various example embodiments, each vacuum insulating panel 100, still referring to FIGS. 1-7, optionally may also include at least one sorption getter 8 (e.g., at least one thin film getter) for helping to maintain the vacuum in low pressure space 5 by using reactive material for soaking up and/or bonding to gas molecules that remain in space 5, thus providing for sorption of gas molecules in low pressure space 5. The getter 8 may be provided directly on either glass substrate 1 or 2, or may be provided on a low-E coating 7 in certain example embodiments. In certain example embodiments, the getter 8 may be laser-activated and/or activated using inductive heating techniques, and/or may be positioned in a trough/recess 9 that may be formed in the supporting substrate (e.g., substrate 2) via laser etching, laser ablating, and/or mechanical drilling.

A vacuum insulating panel 100 may also include an evacuation (e.g., pump-out) tube 12 used for evacuating the space 5 to a pressure(s) less than atmospheric pressure, where the elongated evacuation tube 12 may be closed/sealed after evacuation of the space 5. Pump-out seal 13 may be provided around tube 12, and a cap 14 may be provided over the top of the tube 12 after it is sealed. Evacuation tube 12 may be located at any suitable location of the panel. For example, elongated evacuation tube 12 may extend part way through the substrate 1, for example part way through a double countersink hole drilled or otherwise formed in the substrate 1 (or 2) as shown in FIGS. 9-10 for example. However, tube 12 may extend all the way through the substrate in alternative example embodiments. Pump-out tube 12 may be of any suitable material, such as glass, metal, ceramic, or the like. In certain example embodiments, the evacuation tube 12 may be located on the side of the vacuum insulating panel 100 configured to face the interior of the building when the panel is used in a commercial and/or residential window. In certain example embodiments, the evacuation (e.g., pump-out tube) 12 may instead be located on the side of the vacuum insulating panel 100 configured to face the exterior of the building. The evacuation tube 12 may be provided in an aperture (e.g., in a double-stepped aperture as shown in FIGS. 9-10) defined in either substrate 1 or 2 in various example embodiments. Pump-out seal 13 may be of any suitable material. In certain example embodiments, the pump-out seal 13 may be provided in the form of a substantially donut-shaped pre-form which may be positioned in a recess 15 formed in a surface of the substrate 1 or 2, so as to surround an upper portion of the tube 12, so that the pre-form can be laser treated/fired/sintered (e.g., after formation of the edge seal 3) to provide a seal around the pump-out tube 12. Alternatively, the pump-out seal 13 may be of any suitable material and/or may be dispensed in paste and/or liquid form to surround at least part of the tube 12 and may be sealed before and/or after evacuation of space 5. The pump-out seal material 13 may be directly applied to the glass substrate and/or the tube 12 (e.g., see FIGS. 8-10), or to a primer layer (not shown) applied to the glass substrate surface prior to the pump-out seal material being applied to the substrate, in certain example embodiments. After evacuation of space 5, the tip of the tube 12 may be melted via laser to seal same (e.g., to form a laser fused glass dome at the top of the tube, above most or all of the seal material 13), and hermetic sealing of the space 5 in the panel 100 can be provided both by the edge seal 3 and by the sealed upper portion of the pump-out tube 12 together with seal 13 and/or cap 14. In certain example embodiments, as shown in FIGS. 1-10 for example, the elongated pump-out tube 12 may be substantially perpendicular (perpendicular plus/minus ten degrees, more preferably plus/minus five degrees) to major surface(s) of the substrates 1 and 2. Any of the elements/ components shown in FIGS. 1-10 may be omitted in various example embodiments.

The evacuated gap/space 5 between the substrates 1 and 2, in the vacuum insulating panel 100, is at a pressure less than atmospheric pressure. For example, after the edge seal 3 has been formed, the cavity 5 evacuated to a pressure less than atmospheric pressure, and the pump-out tube 12 closed/ sealed, the gap 5 between at least the substrates 1 and 2 may be at a pressure no greater than about $1.0\times10^{-2}$ Torr, more preferably no greater than about $1.0\times10^{-3}$ Torr, more preferably no greater than about $1.0\times10^{-4}$ Torr, more preferably no greater than about $1.0\times10^{-5}$ Torr, and for example may be evacuated to a pressure no greater than about $1.0\times10^{-6}$ Torr. The gap 5 may be at least partially filled with an inert gas in various example embodiments. In certain example embodiments, the evacuated vacuum gap/space 5 may have a thickness (in a direction perpendicular to planes of the substrates 1 and 2) of from about 100-1,000 μm, more preferably from about 200-500 μm, and most preferably from about 230-350 μm. Providing a vacuum in the gap/ space 5 is advantageous as it reduces conduction and convection heat transport, so as to reduce temperature fluctuations inside buildings and the like, thereby reducing energy costs and needs to heat and/or cool buildings. Thus, panels 100 can provide high levels of thermal insulation.

Example low-emittance (low-E) coatings 7 which may be used in the vacuum insulating panel 100 are described in U.S. Pat. Nos. 5,935,702, 6,042,934, 6,322,881, 7,314,668, 7,342,716, 7,632,571, 7,858,193, 7,910,229, 8,951,617, 9,215,760, and 10,759,693, the disclosures of which are all hereby incorporated herein by reference in their entireties. Other low-E coatings may also, or instead, be used. A low-E coating 7 typically includes at least one IR reflecting layer (e.g., of or including silver, gold, or the like) sandwiched between at least first and second dielectric layer(s) of or including materials such as silicon nitride, zinc oxide, zinc stannate, and/or the like. The low-E coating 7, for example, may include one, two, or three of such IR reflecting layers in various example embodiments. A low-E coating 7 may have one or more of: (i) a hemispherical emissivity/emittance of no greater than about 0.20, more preferably no greater than about 0.04, more preferably no greater than about 0.028, and most preferably no greater than about 0.015, and/or (ii) a sheet resistance ($R_s$) of no greater than about 15 ohms/square, more preferably no greater than about 2 ohms/square, and most preferably no greater than about 0.7 ohms/square, so as to provide for solar control. In certain example embodiments, the low-E coating 7 may be provided on the interior surface of the glass substrate to be closest to the building exterior, which is considered surface two (e.g., see FIGS. 2-3), whereas in other example embodiments the low-E coating 7 may be provided on the interior surface of the glass substrate to be closest to the building interior, which is considered surface three (e.g., see FIGS. 4-5).

Figure 1:
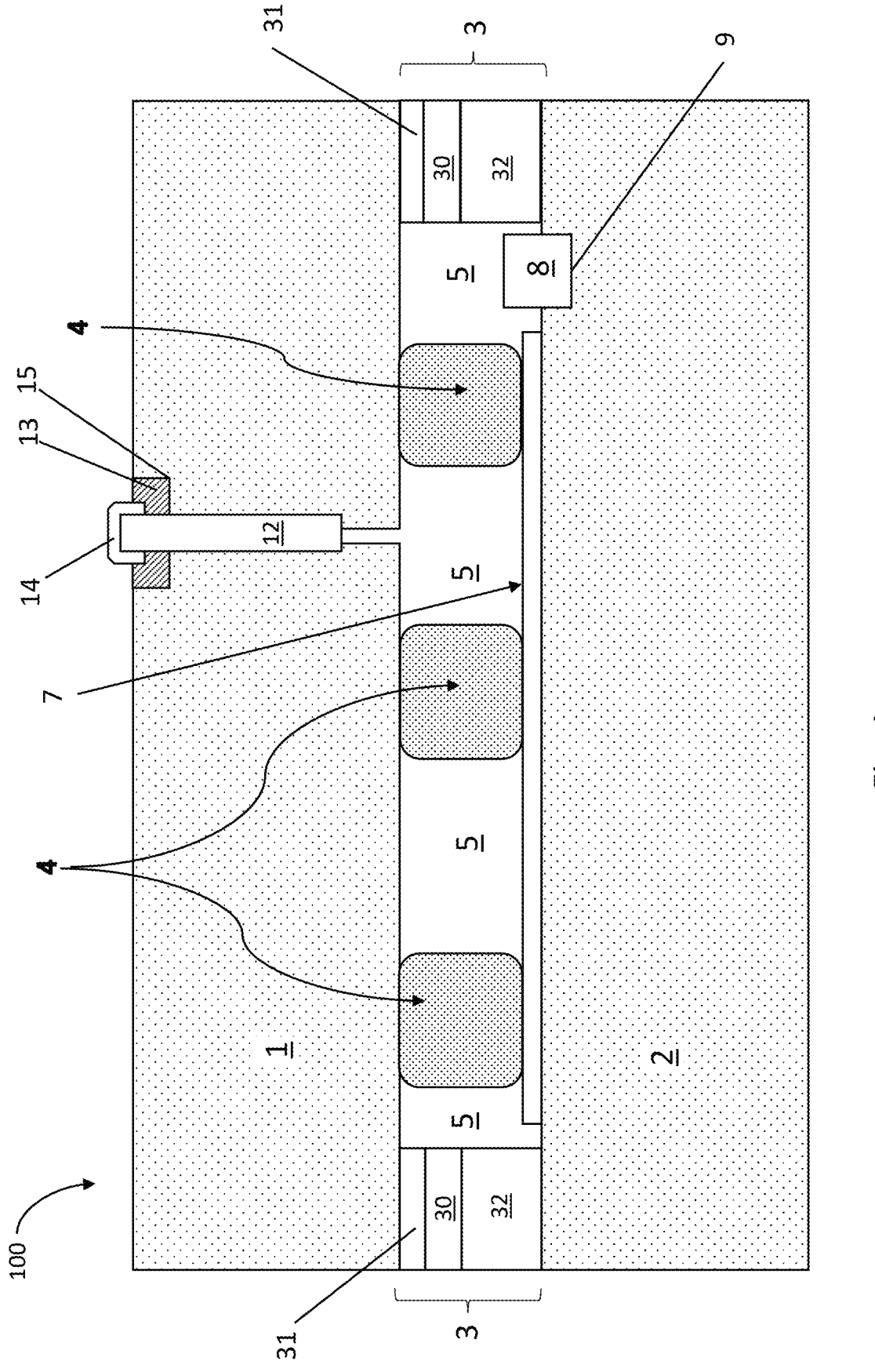
FIG. 1 is a side cross sectional view of a vacuum insulating unit/panel according to an example embodiment.

FIG. 1 illustrates an embodiment where the edge seal 3 is provided in the vacuum insulated glass panel 100 at the absolute edge, the seal layers 30, 31 and 32 all have substantially the same width (e.g., between about 6 mm and 12 mm), and a thickness of the main seal layer 30 is less than a thickness of primer layer 31 but greater than a thickness of the other primer layer 32. FIG. 2 illustrates an embodiment where the edge seal 3 is spaced inwardly from the absolute edge of the panel 100, the width of the main seal layer 30 is less than a width(s) of the primer layers 31 and 32, and a thickness of the main seal layer 30 is greater than a thickness of primer layer 31 but less than a thickness of the other primer layer 32. FIG. 3 illustrates an embodiment where the edge seal 3 is spaced inwardly from the absolute edge of the panel 100, the seal layers 30, 31 and 32 all have substantially the same width (e.g., between about 6 mm and 12 mm), and the seal layers 30, 31 and 32 all have substantially the same thickness. FIG. 4 illustrates an embodiment where the edge seal 3 is spaced inwardly from the absolute edge of the panel 100, the width of the main seal layer 30 is less than a width(s) of the primer layers 31 and 32, a thickness of the main seal layer 30 is greater than a thickness of primer layer 31 but less than a thickness of primer layer 32, and the low-E coating 7 is provided on substrate 1 (as opposed to the low-E coating being on substrate 2 in FIGS. 1-3). FIG. 5 illustrates an embodiment similar to FIG. 4, except that primer layer 31 is omitted in the FIG. 5 embodiment. FIG. 6 provides an example where a laser beam 40 from laser 41 is being used to heat the edge seal structure for sintering/firing the main seal layer 30 to form the hermetic edge seal 3, and FIG. 7 is a top view illustrating the laser beam 40 proceeding around the entire periphery of the panel along path 42 over the edge seal layers 30-32 to fire/sinter the main edge seal layer 30 in forming the hermetic edge seal 3. The laser beam 40 performs localized heating of the edge seal area, so as to not unduly heat certain other areas of the panel thereby reducing chances of significant de-tempering of the glass substrates. Each of these embodiments may be used in combination with any other embodiment described herein, in whole or in part.

Edge seal 3, which may include one or more of ceramic layers 30-32, may be located proximate the periphery or edge of the vacuum insulated panel 100 as shown in FIGS. 1-7. Edge seal 3 may be a ceramic edge seal in certain example embodiments. Referring to FIGS. 1-6, in certain example embodiments, layer 30 of the edge seal may be considered a main or primary seal layer, and layers 31 and 32 may be considered primer layers. One or more of seal layers 30-32, of the edge seal 3, may be of or include ceramic frit in certain example embodiments, and/or may be lead-free or substantially lead-free (e.g., no more than about 15 ppm Pb, more preferably no more than about 5 ppm Pb, even more preferably no more than about 2 ppm Pb) in certain example embodiments. In certain example embodiments, each primer layer 31 and 32 may be of a material having a coefficient of thermal expansion (CTE) that is between that of the main seal layer 30 and the closest glass substrate 1, 2. A primer(s) 31 and/or 32 may be omitted in certain example embodiments. In certain example embodiments, primer layers 31 and 32 may be of or include different material(s) compared to the main seal layer 30. In certain example embodiments, primer layer 31 may also be provided in the evacuation tube sealing structure, so as to be located between glass substrate 1 and evacuation tube seal material 13.

The edge seal 3, in certain example embodiments, may be located at an edge-deleted area (where the solar control coating 7 has been removed) of the substrate as shown in FIGS. 1-6, so as to reduce chances of corrosion. Thus, the edge seal 3 may be positioned so that it does not overlap the low-E coating 7 in certain example embodiments. The edge seal 3 may be located at the absolute edge of the panel 100 (e.g., FIG. 1), or may be spaced inwardly from the absolute edge of the panel 100 as shown in FIGS. 2-7 and 9, in different example embodiments. An outer edge of the hermetic edge seal 3 may be located within about 50 mm, more preferably within about 25 mm, and more preferably within about 15 mm, of an outer edge of at least one of the substrates 1 and/or 2. Thus, an "edge" seal does not necessarily mean that the edge seal 3 is located at the absolute edge or absolute periphery of a substrate(s) or overall panel 100.

The low-E coating 7 may be edge deleted around the periphery of the entire unit so as to remove the low-e coating material from the coated glass substrate. The low-E coating 7 edge deletion width (edge of glass to edge of low-E coating 7), in certain example embodiments, in at least one area may be from about 0-100 mm, with examples being no greater than about 6 mm, no greater than about 10 mm, no greater than about 13 mm, no greater than about 25 mm, with an example being about 16 mm. In certain example embodiments, there may be a gap between the primer seal layers 31 and 32 and/or main layer 30, and the low-E coating 7, of at least about 1.0 mm, and/or of at least about 0.5 mm, so that the low-E coating 7 is not contiguous with the main seal layer 30 and/or the primer seal layers 31 and 32.

Referring to FIGS. 1-7 for example, in the manufactured vacuum insulating panel 100, the main seal layer 30 of the edge seal 3 may have an average thickness of from about 30-180 μm, more preferably from about 30-120 μm, more preferably from about 40-100 μm, and most preferably from about 50-85 μm, with an example main seal layer 30 average thickness being from about 60-80 μm. In certain example embodiments, in the manufactured vacuum insulating panel 100, the primer layer 31 of the edge seal 3 may have an average thickness of from about 10-100 μm, more preferably from about 10-80 μm, more preferably from about 20-70 μm, and most preferably from about 20-55 μm, with an example primer layer 31 average thickness being about 45 μm. In certain example embodiments, in the manufactured vacuum insulating panel 100, the primer layer 32 (opposite the side from which the laser beam 40 is directed) of the edge seal 3 may have an average thickness of from about 80-240 μm, more preferably from about 100-220 μm, more preferably from about 120-200 μm, and most preferably from about 120-170 μm, with an example primer layer 32 average thickness being about 145 μm. In certain example embodiments, the respective thicknesses of each layer 30, 31, and 32 are substantially the same (the same plus/minus 10%, more preferably plus/minus 5%) along the length of the edge seal 3 around the periphery of the entire panel 100.

In certain example embodiments, a vacuum insulating panel 100 having an improved multi-layer perimeter seal structure 3 provides for improved manufacturing of tempered units using localized laser firing and/or methods of making the same. Further details of the edge seal structure, dimensions of the edge seal and other components, characteristics of the edge seal and other components, materials, and the manufacture of the overall panel may be provided in one or more of U.S. patent application Ser. Nos. 18/376,914, 18/376,473, 18/376,479, 18/376,483, 18/379,275, and 18/510,777, the disclosures of which are all hereby incorporated herein by reference in their entireties. In various example embodiments, laser 41 and/or laser 51 may be selected to emit a laser beam 40 having a wavelength (λ) of from about 380 nm to 1064 nm, more preferably from about 550 nm to 1064 nm, more preferably from about 780-1064 nm. Laser 41 and/or laser 51 may be a near IR laser in certain example embodiments. Laser 41 and/or 51 may be a continuous wave laser, a pulsed laser, and/or other suitable laser in various example embodiments. In various example embodiments, the laser 41 and/or laser 51 may be a scanning laser system comprising diode laser, solid state laser (e.g., ND:YAG), gas laser (e.g., $CO_2$ of 9.3-10.6 μm), and/or other laser devices/sources. In certain example embodiments, laser 41 and/or laser 51 may emit a laser beam 40 at or having a wavelength of about 800 nm, 808 nm, 810 nm, 940 nm, or 1090 nm (e.g., YVO4 laser). For example, 808 nm or 810 nm diode lasers; or 914 nm, 940 nm, 1064 nm, or 1342 nm solid state lasers (e.g., YVO4 lasers). In certain example embodiments, more than one laser may be utilized to increase the sealing speed for seal material 30, lower effective laser power levels and/or reduce laser spot size. Two lasers operating in a serial, overlapping manner can increase the effective irradiation spot time to achieve for example 0.5 seconds while achieving for example a 20 mm per second linear laser rate, as an example. Two 9-mm laser diameter beams 40, for example, can operate in a serial fashion for a 0.5 second to 1.0 second irradiation time.

FIGS. 11-12 and 14 illustrate an example material(s) that may be used for the main seal layer 30 in various example embodiments, including for example in any of the embodiments of FIGS. 1-7. However, other suitable materials (vanadium oxide based ceramic materials with little or no Te oxide, solder glass, or the like) may instead be used for layer 30 in various example embodiments. FIG. 11 is a table/graph showing weight % and mol % of various compounds/ elements in an example main seal 30 material, prior to sintering of layer 30, according to an example embodiment (measured via non-carbon detecting XRF); FIG. 12 is a table/graph showing weight % and mol % of various compounds/elements in an example main seal 30 material according to an example embodiment (measured via carbon detecting XRF), before and after laser treatment/sintering of the main seal layer 30 for edge seal formation; and the left side of FIG. 14 sets forth a table/graph showing an elemental analysis (non-oxide analysis) of weight % and mol % of various elements in an example main seal 30 material, before and after laser treatment for edge seal formation. Regarding FIG. 14, X-ray Fluorescence (XRF) is a nondestructive technique that can identify and quantify the elemental constituents of a sample using the secondary fluorescence signal produced by irradiation with high energy x-rays, and wavelength dispersive spectrometer (WDXRF) is capable of detecting elements from atomic number (Z) 4 (beryllium) through atomic number 92 (uranium) at concentrations from the low parts per million (ppm) range up to 100% by weight.

This ceramic tellurium (Te) oxide based main seal material, shown in FIGS. 11-12 and 14, was used for main seal layer 30 in examples tested for obtaining data herein for various figures/tables unless otherwise specified. This ceramic tellurium (Te) oxide based main seal material, shown in FIGS. 11-12 and 14, for example may be considered to have a melting point (Tm) of 390 or 395 degrees C., a softening point (Ts) of 320 degrees C., and a glass transition point (Tg) of 290 degrees C. This material shown in FIGS. 11-12 and 14 and described below, used for the main seal layer 30, may also be used for evacuation tube seal material 13, with or without an underlying primer.

Table 1A sets forth example ranges for various elements and/or compounds for this example tellurium (Te) oxide based main seal 30 material according to various example embodiments, for both mol % and weight %, prior to firing/sintering thereof and thus prior to hermetic edge seal 3 formation. In certain example embodiments, the main seal layer 30 may comprise mol % and/or wt. % of the following compounds in one or more of the following orders of magnitude: tellurium oxide>vanadium oxide>aluminum oxide, tellurium oxide>vanadium oxide>silicon oxide, tellurium oxide>vanadium oxide>aluminum oxide>magnesium oxide, and/or tellurium oxide>vanadium oxide>silicon oxide>magnesium oxide, before and/or after firing/sintering of the layer 30. It will be appreciated that other materials may be used together, or in place of, those shown below, and that the example percentages may be different in alternate embodiments.

TABLE 1A (example material for main seal layer 30 and/or seal layer 13 prior to firing/sintering)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Tellurium oxide (e.g., TeO$_4$ and/or other stoichiometry) | 20-60% or 40-90% | 25-50% or 40-70% | 30-44% | 20-70% | 30-65% | 40-57% |
| Vanadium oxide (e.g., VO$_2$ and/or other stoichiometry) | 5-45% or 5-58% | 10-30% or 5-37% | 10-21% | 5-50% | 8-38% | 16-28% |
| Aluminum oxide (e.g., Al$_2$O$_3$ and/or other stoichiometry) | 0-45% or 1-25% | 5-30% or 6-25% | 10-20% | 0-45% | 5-30% | 10-20% |
| Silicon oxide (e.g., SiO$_2$ and/or other stoichiometry) | 0-50% or 0-5% | 10-30% | 15-25% | 0-50% | 3-30% | 5-20% |
| Magnesium oxide (e.g., MgO and/or other stoichiometry) | 0-50% or 0-10% | 3-30% | 5-15% | 0-50% | 1-12% | 2-7% |
| Barium oxide (e.g., BaO and/or other stoichiometry) | 0-20% | 0-10% | 0.10-5% | 0-20% | 0-10% | 0.10-5% |
| Manganese oxide (e.g., MnO and/or other stoichiometry) | 0-20% | 0-10% | 0.50-5% | 0-20% | 0-10% | 0.50-5% |

Tellurium Vanadate based and/or inclusive glasses (including tellurium oxide and vanadium oxide), such as those in Table 1A, in certain example embodiments are ideally suited for seal functionality when utilizing laser irradiation for the firing/sintering of the main seal layer 30 and/or seal layer 13. The base main seal material may comprise tellurium oxide (e.g., a combination of TeO$_3$, TeO$_{3+1}$, and TeO$_4$) and vanadium oxide (e.g., a combination of V$_2$O$_5$, VO$_2$, and V$_2$O$_3$) per the weight % and/or mol % described in Table 1A. In certain example embodiments, it may be desirable to have a higher amount of tellurium oxide compared to vanadium oxide, in order to increase the material density in the sintered state and thus improve hermiticity of the seal. With respect to main seal material(s) in Table 1A for the main seal layer 30, the Te oxide (e.g., one or more of TeO$_4$, TeO$_3$, TeO$_{3+1}$, and/or other stoichiometry(ies) involving Te and O) and V oxide (e.g., one or more of VO$_2$, V$_2$O$_5$, V$_2$O$_3$, and/or other stoichiometry(ies) involving V and O) in the material may be made up of about the following stoichiometries before/after sintering as shown below in Table 1B (tellurium oxide stoichiometries prior to firing/sintering), Table 1C (tellurium oxide stoichiometries after firing/sintering), Table 1D (vanadium oxide stoichiometries prior to firing/sintering), Table 1E (vanadium oxide stoichiometries after firing/sintering), respectively, measured via XPS.

TABLE 1B (example stoichiometries of Te oxide in material for main seal layer 30 prior to laser firing/sintering)

| | General | More Preferred | Most Preferred | Example |
|---|---|---|---|---|
| TeO$_4$ | 35-85% | 45-70% | 55-60% | 57% |
| TeO$_3$ | 20-65% | 30-55% | 35-45% | 42% |
| TeO$_{3+1}$ | 0-15% | 0.2-7% | 0.5-3% | 1% |

TABLE 1C (example stoichiometries of Te oxide in material for main seal layer 30 and/or seal 13 after laser firing/sintering)

| | General | More Preferred | Most Preferred | Example |
|---|---|---|---|---|
| TeO$_4$ | 3-35% | 5-25% | 10-20% | 14% |
| TeO$_3$ | 60-95% or 50-95% | 70-90% | 78-85% | 81% |
| TeO$_{3+1}$ | 0-15% | 1-9% | 3-7% | 5% |

TABLE 1D (example stoichiometries of V oxide in material for main seal layer 30 prior to laser firing/sintering)

| | General | More Preferred | Most Preferred | Example |
|---|---|---|---|---|
| V$_2$O$_5$ | 50-97% | 70-95% | 80-90% | 84% |
| VO$_2$ | 5-35% | 10-20% | 12-18% | 15% |
| V$_2$O$_3$ | 0-15% | 0.2-7% | 0.5-3% | 1% |

TABLE 1E (example stoichiometries of V oxide in material for main seal
layer 30 and/or seal layer 13 after laser firing/sintering)

| | General | More Preferred | Most Preferred | Example |
|---|---|---|---|---|
| $V_2O_5$ | 5-45% | 10-35% | 20-30% | 25% |
| $VO_2$ | 35-85% | 50-75% | 58-67% | 63% |
| $V_2O_3$ | 2-30% | 6-20% | 9-15% | 12% |

For example, the "Example" column in Table 1B indicates that 57% of the Te present in the material prior to sintering/firing was in an oxidation state of $TeO_4$, 42% of the Te present in the material prior to sintering/firing was in an oxidation state of $TeO_3$, and 1% of the Te present in the material prior to sintering/firing was in an oxidation state of compounds may also be provided in this main seal 30 material and/or seal material 13, including but not limited to, on a weight and/or mol basis, for example one or more of: 0-15% (more preferably 1-10%) tungsten oxide; 0-15% (more preferably 1-10%) molybdenum oxide; 0-60% (or 38-52%) zinc oxide; 0-15% (more preferably 0-10%) copper oxide, and/or other elements shown in the figures.

Table 2 sets forth example ranges for various elements and/or compounds for this example tellurium oxide-based material for main seal layer 30 and/or seal layer 13 according to various example embodiments, for both mol % and weight %, after firing/sintering thereof and thus after hermetic edge seal 3 formation. It will be appreciated that other materials may be used together, or in place of, those shown below, and that the example percentages may be different in alternate embodiments.

TABLE 2

(example material for main seal layer 30 and/or
seal layer 13 after laser firing/sintering)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Tellurium oxide (e.g., $TeO_3$ and/or other stoichiometry) | 20-60% or 40-90% | 35-70% | 38-60% | 20-80% | 40-70% | 50-65% |
| Vanadium oxide (e.g., $VO_2$ and/or other stoichiometry) | 5-45% or 5-58% | 8-30% or 5-37% | 8-15% | 10-50% | 10-30% | 13-25% |
| Aluminum oxide (e.g., $Al_2O_3$ and/or other stoichiometry) | 0-45% or 1-25% | 5-30% or 6-25% | 8-20% | 0-45% | 3-30% | 5-15% |
| Silicon oxide (e.g., $SiO_2$ and/or other stoichiometry) | 0-50% or 0-5% | 10-33% | 15-28% | 0-50% | 1-25% | 1-15% |
| Magnesium oxide (e.g., MgO and/or other stoichiometry) | 0-50% or 0-10% | 0.1-20% | 0.5-5% | 0-50% | 0.1-12% | 0.2-5% |
| Barium oxide (e.g., BaO and/or other stoichiometry) | 0-20% | 0-10% | 0-5% | 0-20% | 0-10% | 0-5% |
| Manganese oxide (e.g., MnO and/or other stoichiometry) | 0-20% | 0-10% | 0.50-5% | 0-20% | 0-10% | 0.50-5% |

$TeO_{3+1}$. And the "Example" column in Table 1C indicates that after the laser firing/sintering of the main seal layer 30 just 14% of the Te present in the main seal layer 30 material was in an oxidation state of $TeO_4$, but 81% of the Te present in the material was in an oxidation state of $TeO_3$, and 5% of the Te present in the material prior to sintering/firing was in an oxidation state of $TeO_{3+1}$. Accordingly, in certain example embodiments, it will be appreciated that the laser firing/sintering of the main seal layer 30 may cause much of the $TeO_4$ to transform/convert into $TeO_3$ and $TeO_{3+1}$, which is advantageous because it increases the material's absorption in the near infrared (e.g., 808 or 810 nm for example, which may be used for the laser during sintering/firing) which provides for increased heating efficiency and reducing the chances of significantly de-tempering the glass substrate(s) due to improved heating efficiency during the firing/sintering.

This main seal material(s) from Table 1 and FIGS. 11-12, 14, or substantially the same material or a similar material, may also be used for the evacuation tube seal 13, with or without a primer, in certain example embodiments, although other types of seals may also be used such as vanadium oxide based ceramic sealing glass or solder glass. Other Other compounds may also be provided in or for this material, including but not limited to, on a weight or mol basis, for example one or more of: 0-15% (more preferably 1-10%) tungsten oxide; 0-15% (more preferably 1-10%) molybdenum oxide; 0-60% (or 38-52%) zinc oxide; 0-15% (more preferably 0-10%) copper oxide, and/or other elements shown in the figures. Certain elements may change during firing/sintering, and certain elements may at least partially burn off during processing prior to formation of the final edges seal 3.

In certain example embodiments, the material for the main seal layer 30 and/or seal 13 may include filler. The amount of filler may, for example, be from 1-25 wt. % and may have an average grain size (d50) of 5-30 μm, for example an average d50 grain size from about 5-20 μm, more preferably from about 5-15 μm, and most preferably less than about 10 μm. Mixtures of two or more grain size distributions (e.g., coarse: d50=15-25 μm and fine: d50=1-10 μm) may be used. The filler may, for example, comprise one or more of zirconyl phosphates, dizirconium diortho-phosphates, zirconium tungstates, zirconium vanadates, aluminum phosphate, cordierite, eucryptite, ekanite, alkaline earth zirconium phosphates such as (Mg,Ca,Ba,Sr)

$Zr_4P_5O_{24}$, either alone or in combination. Filler in a range of 20-25 wt. % may be used in layer 30 in certain example embodiments. Main seal layer 30, and/or the primer layer(s) 31 and/or 32, is/are lead-free and/or substantially lead-free in certain example embodiments.

Table 3 sets forth example ranges for various elements for this example tellurium oxide based main seal 30 material and/or seal material 13 according to various example embodiments, using elemental analysis (non-oxide analysis) for both mol % and weight %, prior to firing/sintering thereof and thus prior to hermetic edge seal 3 formation. FIG. 14 also provides an elemental analysis for various example seal materials, including for Te oxide based main seal and/or pump-out tube seal layers 30 and 13. In certain example embodiments, the main seal layer 30 and/or the pump-out seal layer 13 may comprise mol % and/or wt. % of the following elements in one or more of the following orders of magnitude: Te>V>Al, Te>V>Si, Te>V>Al>Mg, Te>O>V, Te>O>V>Al, and/or Te>V>Si>Mg, before and/or after firing/sintering of the layer (e.g., see also FIG. 14). It will be appreciated that other materials may be used together, or in place of, those shown below, and that the example percentages may be different in alternate embodiments. The elemental Te/V ratio in the main seal layer 30

TABLE 3-continued

| (elemental analysis - example main seal 30 material and/or seal material 13 prior to laser firing/sintering) | | | | | |
|---|---|---|---|---|---|
| | General (Mol %) | More Pre-ferred (Mol %) | Most Pre-ferred (Mol %) | General (Wt. %) | More Pre-ferred (Wt. %) | Most Pre-ferred (Wt. %) |
| Al | 5-40% | 8-25% | 10-15% | 2-30% | 3-20% | 5-11% |
| Si | 2-30% | 3-15% | 5-10% | 1-20% | 2-10% | 3-7% |
| Mg | 0-15% | 1-7% | 1-5% | 0-10% | 1-6% | 1-5% |
| Mn | 0-20% | 0.1-5% | 0.5-2% | 0-20% | 0.1-5% | 0.5-2% |

Other compounds may also be provided in this material (e.g., see FIGS. 14 and 15).

Table 4 sets forth example ranges for various elements for this example tellurium oxide based main seal 30 material and/or seal 13 according to various example embodiments, using elemental analysis (non-oxide analysis) for both mol % and weight %, after firing/sintering thereof and thus after formation of the seal (e.g., see also FIG. 14). It will be appreciated that other materials may be used together, or in place of, those shown below, and that the example percentages may be different in alternate embodiments.

TABLE 4

| (elemental analysis - example main seal 30 material and/or seal 13 after laser firing/sintering) | | | | | |
|---|---|---|---|---|---|
| | General (Mol %) | More Preferred (Mol %) | Most Preferred (Mol %) | General (Wt. %) | More Preferred (Wt. %) | Most Preferred (Wt. %) |
| Te | 8-60% | 10-40% | 14-30% | 20-90% | 40-80% | 48-70% |
| O | 20-70% | 25-60% | 30-50% | 3-22% | 5-16% | 7-20% |
| V | 3-30% | 5-15% | 6-13% | 5-40% | 7-25% | 8-17% |
| Al | 3-40% | 5-25% | 6-15% | 1-20% | 2-12% | 4-8% |
| Si | 0.5-20% | 1-18% | 2-15% | 0.5-10% | 1-10% | 1-9% |
| Mg | 0-10% | 0.1-5% | 0.5-3% | 0-10% | 0.01-5% | 0.1-3% |
| Mn | 0-20% | 0.5-6% | 1-3% | 0-20% | 0.5-6% | 1-3% | and/or seal layer 13, after sintering/firing and in terms of weight %, may be from about 1.5:1 to 5:1, more preferably from about 2:1 to 4:1, and most preferably from about 2.5:1 to 3.5:1. The elemental Te/Al ratio in the main seal layer 30 and/or seal layer 13, after firing/sintering thereof and in terms of weight %, may be from about 5:1 to 35:1, more preferably from about 8:1 to 20:1, and most preferably from about 9:1 to 15:1. The elemental Si/Mg ratio in the main seal layer 30 and/or seal layer 13, after firing/sintering thereof and in terms of weight %, may be from about 1:1 to 35:1, more preferably from about 2:1 to 10:1, and most preferably from about 3:1 to 7:1. It has been found that one or more of these ratios is technically advantageous for achieving desirable melting points, softening points, and/or thermal diffusivity.

TABLE 3

| (elemental analysis - example main seal 30 material and/or seal material 13 prior to laser firing/sintering) | | | | | |
|---|---|---|---|---|---|
| | General (Mol %) | More Pre-ferred (Mol %) | Most Pre-ferred (Mol %) | General (Wt. %) | More Pre-ferred (Wt. %) | Most Pre-ferred (Wt. %) |
| Te | 5-40% | 8-25% | 10-20% | 20-70% | 30-60% | 40-55% |
| O | 30-75% | 40-70% | 45-60% | 10-40% | 15-35% | 15-30% |
| V | 3-30% | 5-15% | 7-13% | 5-40% | 10-25% | 10-17% |

This material may also be used for the pump-out seal 13, with or without a primer, in certain example embodiments, although other types of seals may also be used such as vanadium oxide based ceramic sealing glass or solder glass. Other compounds may also be provided in this material (e.g., see FIG. 14).

FIGS. 13-14 illustrate an example material(s) that may be used for the primer layer(s) 31 and/or 32, or for a primer layer(s) located between the tube seal material 13 and the glass substrate 1 proximate the evacuation tube, in various example embodiments, including for example in any of the embodiments herein. However, other suitable materials, such as solder glass, other materials comprising bismuth oxide, and so forth, may be used for primer layers in various example embodiments. FIG. 13a is a table/graph showing weight % and mol % of various compounds/elements in a primer seal 31 and/or 32 material according to an example embodiment (measured via carbon detecting XRF), before and after laser treatment for edge seal formation, which primer material may be used in combination with any embodiment herein (e.g., for one or both primer layers); FIG. 13b is a table/graph illustrating example primer material according to an example embodiment (measured via fused bead XRF); and the right side of FIG. 14 sets forth a table/graph showing an elemental analysis (non-oxide analysis) of weight % and mol % of various elements in an example primer material, before and after laser treatment for edge seal formation. This primer material, shown in FIGS. 13-14, for example may be considered to have a melting point (Tm) of 620 degrees C., a softening point (Ts) of 551 degrees C., and a glass transition point (Tg) of 486 degrees C.

Table 5 sets forth example ranges for various elements and/or compounds for example primer material according to various example embodiments, for both mol % and weight %, prior to firing/sintering. In certain example embodiments, one or both of the primer layers 31 and/or 32 may comprise mol % and/or wt. % of the following compounds in one or more of the following orders of magnitude: boron oxide>bismuth oxide>silicon oxide, bismuth oxide>silicon oxide>boron, boron oxide>bismuth oxide>silicon oxide>titanium oxide, bismuth oxide>silicon oxide>boron oxide>titanium oxide, boron oxide>silicon oxide>titanium oxide>bismuth oxide, and/or silicon oxide>boron oxide>bismuth oxide, before and/or after formation of the hermetic edge seal 3. It will be appreciated that other materials may be used together, or in place of, those shown below, and that the example percentages may be different in alternate embodiments.

TABLE 5

| (example primer material prior to firing/sintering) | | | | | | |
|---|---|---|---|---|---|---|
| | General (Mol %) | More Preferred (Mol %) | Most Preferred (Mol %) | General (Wt. %) | More Preferred (Wt. %) | Most Preferred (Wt. %) |
| bismuth oxide (e.g., $Bi_2O_3$ and/or other stoichiometry) | 0.5-50% | 1-10% | 2-7% | 5-50% or 55-95% | 10-40% or 70-80% | 15-35% or 70-80% |
| boron oxide (e.g., $B_2O3$ and/or other stoichiometry) | 10-50% or 10-70% | 20-40% or 20-70% | 25-35%, 30-60%, or 40-60% | 10-60% | 20-50% | 30-45% |
| Silicon oxide (e.g., $SiO_2$ and/or other stoichiometry) | 0-50% or 0-15% | 5-40% or 5-15% | 15-25% or 15-30% | 0-50% | 5-30% | 15-25% |
| Titanium oxide (e.g., $TiO_2$ and/or other stoichiometry) | 0-20% | 1-10% | 3-9% | 0-20% | 1-10% | 3-9% |

It is noted that "stoichiometry" as used herein covers, for example, oxygen coordination and oxygen state. Other compounds may also be provided in the primer material (e.g., see FIGS. 13-14). For example, on a weight basis, the primer material for one or both layers 31 and/or 32 may further comprise one or more of: 0-20% (or 1-7%) zinc oxide; 0-15% (or 2-7%) aluminum oxide; 0-10% (or 0-5%) magnesium oxide; 0-10% (or 0-5%) chromium oxide; 0-10% (or 0-5%) iron oxide; 0-20% (or 1-8%) sodium oxide; carbon dioxide; and/or other elements shown in the figures (e.g., see FIGS. 13a-13b).

Table 6 sets forth example ranges for various elements and/or compounds for this example primer layer 31 and/or 32 material according to various example embodiments, for both mol % and weight %, after firing/sintering thereof and after hermetic edge seal 3 formation. It will be appreciated that other materials may be used together, or in place of, those shown below, and that the example percentages may be different in alternate embodiments.

TABLE 6

| (example primer material after edge seal formation) | | | | | | |
|---|---|---|---|---|---|---|
| | General (Mol %) | More Preferred (Mol %) | Most Preferred (Mol %) | General (Wt. %) | More Preferred (Wt. %) | Most Preferred (Wt. %) |
| bismuth oxide (e.g., $Bi_2O_3$ and/or other stoichiometry) | 0.5-50% | 1-12% or 1-20% | 4-9% | 5-50% or 55-95% | 20-40% or 70-80% | 20-35% or 70-80% |
| boron oxide (e.g., $B_2O3$ and/or other stoichiometry) | 20-65% | 30-60% | 40-55% | 15-70% | 25-45% | 30-40% |
| Silicon oxide (e.g., $SiO_2$ and/or other stoichiometry) | 0-50% or 0-15% | 15-35% or 5-15% | 22-30% | 0-50% | 5-35% | 15-30% |
| Titanium oxide (e.g., $TiO_2$ and/or other stoichiometry) | 0-20% | 3-12% | 4-11% | 0-20% | 3-12% | 4-11% |

Other compounds may also be provided in this primer material, as discussed above and/or shown in the figures. And such primer material may also be used under seal layer 13 in certain example embodiments. Certain elements may change during firing/sintering, and certain elements may at least partially burn off during processing prior to formation of the final edges seal 3. It will be appreciated that, as with other layers discussed herein, other materials may be used together, or in place of, those shown above and/or below, and that the example weight/mol percentages may be different in alternate embodiments. The ceramic sealing glass primer materials for layer(s) 31 and/or 32 are lead-free and/or substantially lead-free in certain example embodiments.

Table 7 sets forth example ranges for various elements for the example primer material according to various example embodiments, using elemental analysis (non-oxide analysis) for both mol % and weight %, after firing/sintering thereof and thus after hermetic edge seal 3 formation. FIG. 14 also provides an elemental analysis for various example seal materials, including the primer material at the right side thereof. In certain example embodiments, one or both of primer layers 31 and/or 32 may comprise mol % of the following elements in one or more of the following orders of magnitude: B>Bi, O>B>Bi, O>B>C, O>B>Si>Bi, and/or B>Si>Bi>Ti, before and/or after firing/sintering of the layer and formation of the edge seal 3 (e.g., see also FIG. 14). It will be appreciated that other materials may be used together, or in place of, those shown below, and that the example percentages may be different in alternate embodiments.

material(s) of FIGS. 13-14 and Table 7 may be used for one or both primer layer 31 and/or 32 in certain example embodiments, for instance when laser heating is used that impinges upon a primer layer. In certain example embodiments, one or both primer layer(s) 31 and/or 32 may comprise, in terms of mol %, the material of Table 7. In certain example embodiments, on an elemental basis (not including oxides) and in terms of mol %, primer layer(s) 31 and/or 32 may have a ratio B/Bi, of boron (B) to bismuth (Bi), of from about 1.1 to 10.0, more preferably from about 2.0 to 6.0, and most preferably from about 2.5 to 4.5 (with an example being about 3.7), after firing/sintering of the main seal layer 30 and/or primer(s). In certain example embodiments, in terms of mol % after sintering/firing of layer 30, primer layer(s) 31 and/or 32 may comprise at least two times as much B as Bi, more preferably at least about three times as much B as Bi, and/or may comprise at least about two time as much B oxide as Bi oxide, more preferably at least about three, four, or five times as much B oxide as Bi oxide. Such a primer (e.g., 31) is thus able to allow sufficient near-IR energy from the laser (e.g., at 808 or 810 nm) to pass so that the main seal layer 30 can be efficiently and quickly fired/sintered, without significantly de-tempering glass and/or inducing significant transient thermal stress.

FIG. 8*a* is a top view of a ceramic substantially donut-shaped (or substantially ring-shaped) preform 13 to be used for a seal around evacuation/pump-out tube 12 according to an example embodiment, which may be used in combination with any embodiment herein including those of FIGS. 1-16. FIGS. 8*b*-8*c* are a cross-sectional views of example ceramic preforms 13 of FIG. 8*a* according to example embodiments,

TABLE 7

(elemental analysis - example primer material after firing/sintering and after edge seal formation)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Bi | 1-40% | 2-15% | 3-7% | 10-70% | 20-50% | 30-40% |
| Si | 3-40% | 4-20% | 6-13% | 3-40% | 4-20% | 6-13% |
| B | 3-40% | 5-30% | 10-20% | 1-30% | 2-20% | 4-10% |
| Ti | 0-20% | 1-10% | 2-5% | 1-30% | 3-20% | 4-9% |
| O | 30-80% | 40-70% | 50-60% | 10-55% | 20-45% | 30-40% |

The primer materials in FIGS. 13-14 and Table 7 may be considered to be boron-based, given that excluding oxygen, silicon, and carbon, boron has the largest magnitude in terms of mol % before and/or after firing/sintering. While other materials (e.g., bismuth based primers, solder glass, etc.) may be used for layer(s) 31 and/or 32 in certain example embodiments, boron-based material such as in FIGS. 13-14 and Table 7 may be desirable for use as primer layer(s) 31 and/or 32 in certain example embodiments, for example when laser heating is used for sintering/firing the main seal layer 30, as follows. Bismuth based primers, with little to no boron in terms of mol %, have been found to block large amounts of energy from the laser 41 so that it does not reach main seal layer 30 during firing/sintering of that layer. It has been found that by reducing Bi, and increasing B, in terms of mol %, the primer layer(s) 31 and/or 32 can be more transmissive of certain laser energy (e.g., from a near-IR laser, such as 808 or 810 nm) thereby allowing the main seal layer 30 to be more efficiently and quickly heated and sintered/fired without significantly de-tempering the glass substrate(s) 1 and/or 2. Thus, the boron-based (mol %)

and FIG. 8*d* is a schematic cross-sectional diagram of preform seal of FIGS. 8*a*-8*c* being laser fired/sintered around the pump-out tube according to an example embodiment. As shown in FIG. 8*a*, the preform 13 may be formed substantially in a shape of a donut or ring-shaped, as viewed from above and/or below, prior to being inserted into the countersunk recess 15 (e.g., double countersunk drilled hole shown in FIGS. 9-10) surrounding the pump-out tube 12, as shown in FIGS. 1-7 and 9-10 for example. The donut shape is advantageous in that it increases irradiation surface area at a given geometric configuration, allowing for the preform to be quickly sintered/fired without exposing the adjacent glass to significant de-tempering. As shown in FIGS. 8*b* and 8*d*, a sidewall 13*a* of the preform 13 may be angled to expose more surface area of the preform to impingement by a substantially donut-shaped (or substantially ring-shaped) laser beam 13*b* from above, generated by laser 51 (e.g., see FIGS. 6, 8*b*, 8*d*). Sidewall(s) 13*a* of the preform may or may not be angled relative to the vertical, in different example embodiments. FIG. 8*b* shows an example embodiment where the sidewall 13*a* of the preform is so angled, whereas FIG. 8c shows another example embodiment where the sidewall 13a of the preform is substantially vertically oriented (vertical+/−10 degrees, more preferably +/−5 degrees). In certain example embodiments, the acute angle which the sidewall 13a may form with the bottom surface 13c of the preform may be from about 10-85 degrees, more preferably from about 50-85 degrees, more preferably from about 50-70 degrees, with an example being 52.5 degrees as shown in FIG. 8b for example, to expose more seal material surface area to the laser beam 13b thereby allowing for the preform to be more quickly sintered/fired without exposing the surrounding glass to significant de-tempering. This allows heat from the laser to be more efficiently transferred to the interfaces between the tube and the preform, and between the preform and the substrate. Preform 13 and evacuation tube 12 are concentric, or substantially concentric, in certain example embodiments. Thus, in certain example embodiments, the size (e.g., outer diameter) of the top wall 13d of preform 13 may be smaller than the size (e.g., outer diameter) of the bottom wall 13c of the preform (e.g., see FIG. 8b). Top wall 13d and bottom wall 13c of the preform, prior to laser sintering/firing, are substantially parallel to each other in certain example embodiments (e.g., see FIGS. 8b-8d). In certain example embodiments, the size (e.g., outer diameter) of the upper surface 13d or top wall may be from about 3-9 mm, more preferably from about 5-7 mm; an outer diameter (OD) of the tube 12 may be from about 2-7 mm, more preferably from about 2-6 mm, more preferably from about 2-4 mm; an inner diameter (ID) of the hollow tube 12 may be from about 1.5-5 mm, more preferably from about 2-4 mm, more preferably from about 2.2-3.2 mm; and/or the height/thickness of the preform 13 may be from about 0.5 to 12.0 mm, more preferably from about 0.5 to 3.0 mm, and most preferably from about 1.0 to 1.4 mm. Example IDs for the hollow tube 12 are about 2.2 mm and 3.2 mm, and example ODs for the tube 12 are about 3 mm, about 4 mm, and about 5 mm (e.g., a hollow evacuation tube 12 with about an OD of about 3 mm and an ID of about 2.2 mm; or a hollow tube 12 with an OD of about 4 mm and an ID of about 3.2 mm). Example thickness ($D_W$) of the wall of glass/ceramic hollow tube 12 may be from about 0.2 to 0.8 mm, more preferably from about 0.3 to 0.6, more preferably from about 0.3 to 0.5, with an example being about 0.4 mm, in various example embodiments. While glass/ceramic tubes 12 are preferred in certain example embodiments, using hollow evacuation tubes 12 of other materials (e.g., metal(s), metal oxide(s), etc.) is also possible in certain example embodiments.

Evacuation tube 12 may be inserted through the central aperture defined in preform 13, either before or after the preform 13 is positioned in recess 15. FIGS. 8b-8c, for example, show the tube inserted through the aperture in the preform 13 prior to the tube 12 and preform 13 being positioned in recess 15. Alternatively, the preform 13 and tube 12 may be inserted into recess 15 in separate steps, in either order, in which case the tube 12 is not inserted through the aperture in the preform 13 until after at least one of the preform and tube has been positioned at least partially in recess 15 in glass substrate 1. FIGS. 9-10 are consistent with these example embodiments.

Evacuation tube seal preform 13 may be of or including the same material discussed herein used for main seal layer 30 in certain example embodiments, although it may be made of different materials (e.g., see example materials for preform seal 13 in FIGS. 11, 12 and 14, and in Tables 1A-1E and Table 2 above). Alternatively, the pump-out tube seal preform 13 may be of or include the material shown in FIG.

15 in other example embodiments, which is also based on tellurium oxide and vanadium oxide. For example, in certain example embodiments, the main seal layer 30 may utilize at least polypropylene (PP) carbonate as a binder, whereas the perform 13 may instead utilize material such as ethyl cellulose as a binder due to its cold pressing and preform nature. Perform 13 may be inserted into recess 15, with or without a previously inserted primer layer similar to 31 and/or 32, although in certain example embodiments no primer is used so that the preform 13 may directly contact the glass at the bottom of the recess 15. The preform and resulting seal 13 may be made of other suitable materials in various example embodiments.

The material for the pump-out tube seal may be cold pressed to form the substantially disc-shaped preform 13, with the cold pressed preform 13 then being inserted into the recess 15 together with, before, or after, the evacuation/pump-out tube 12 (e.g., see FIGS. 7-10). Preform 13 may be partially melted to the adjacent glass substrate 1 in the countersunk recess/hole 15 during a main binder burnout and/or pre-glaze step. Thereafter, the main seal layer 13 may be fired/sintered. Before or after sintering/firing of main seal layer 30, preform 13 may be sintered/fired via laser sintering or other type(s) of heating. In certain example embodiments, the laser sintering/firing of the preform 13 may be done in multiple steps, such as a first step (e.g., 3.47 A/power 26W) from about 20-40 seconds, and a second step (e.g., 3.65 A/power 28W) for about 3-10 seconds. In an example embodiment, the preform 13 may be laser fired/sintered using an example lasing time (e.g., 53W at 5.98 A) via a dwell time of from about 20-80 seconds, for an example preform thickness(es) of from about 1 to 2.5 mm, and/or shear strength test results were well above a threshold of 1.0 MPa for samples with no stressor and/or water immersion stressor. In an example embodiment, preform seal 13 may be sintered/fired using a different laser than used for sintering seal layer 30, such as a laser used with optics to allow a substantially collimated donut-shaped and/or ring-shaped laser beam 13b (e.g., having a cross-section substantially in the form and/or shape of the preform shown in FIG. 8d as viewed from above) to heat the preform 13 without significantly heating the tube 12. In certain example embodiments, as shown in FIG. 8d, the donut-shaped laser beam 13b may be spaced apart from and not directly impinge upon the tube 12 during sintering/firing of the preform to form the final seal 13. After the main seal layer 30 and perform seal 13 have been sintered/fired, the mated unit may be evacuated to low pressure via pump-out tube 12, the getter 8 activated such as via laser, and the tip of pump out tube 12 may be closed off/sealed via heating such as via laser. The mated unit may then be cooled and a protective cap 14 may be applied over the sealed tube 12.

FIG. 9 is a side cross-sectional view, e.g., taken along section line A-A in FIG. 7, of an evacuation tube structure according to an example embodiment, prior to laser sintering/sealing of the tube seal preform 13, which may be used in combination with any embodiment herein including those of FIGS. 1-16. FIG. 9 illustrates the evacuation tube 12 and ceramic seal preform 13 at least partially mounted in the recess 15 of the glass substrate, with the tube 12 extending through the central aperture in preform 13. Recess 15, in substrate 1, includes an upper bore (e.g., first bore) B1 having a height $H_{B1}$ and a diameter or width $D_{B1}$, a central bore (e.g., second bore) B2 having a height $H_{B2}$ and a diameter or width $D_{B2}$, and a lower bore (e.g., third bore) B3 having a height $H_{TS}$ and a diameter or width $D_{B3}$. In certain example embodiments, such as shown in FIG. 10, $H_{B2}>H_{B1}$ and $H_{B2}>H_{TS}$, where $H_{B1}$, $H_{B2}$, and $H_{TS}$ are heights of the first B1, second B2, and third B3 bores, respectively. Two or all three of upper bore B1, central bore B2, and/or lower bore B3 may be concentric, or substantially concentric, in certain example embodiments, as shown in the figures, with the central apertures of the respective bores B1, B2, and B3 aligning or substantially aligning with each other. The sidewalls of bores B1, B2, and B3 may be substantially vertical (vertical plus/minus ten degrees, more preferably plus/minus five degrees) in certain example embodiments, or alternatively may be substantially angled in certain instances. The sidewalls of bores B1, B2, and/or B3 may be substantially parallel (parallel plus/minus ten degrees, more preferably plus/minus five degrees) to each other in certain example embodiments, and/or may be substantially perpendicular to the major surfaces of substrate 1 (e.g., glass substrate) in certain example embodiments. The central and lower bores, B2 and B3, are configured so that the bottom surface of the evacuation tube 12 rests on and is supported by (e.g., directly on, or indirectly on) tube shelf/ledge 52. Tube shelf (TS) 52, which is a tube support surface/shelf and/or a support step, is formed the bottom of central bore B2, and is at the top of bottom bore B3 and is oriented so as to be substantially parallel to the major surfaces of substrate 1, as best shown in FIGS. 9-10. Tube supporting shelf 52 of bore B2, in certain example embodiments, has a width ($W_{TS}$) of at least about 0.5 mm, more preferably at least about 0.6 mm, more preferably at least about 0.7 mm, and most preferably at least about 0.75 mm (e.g., 0.85 mm), which is technically advantageous with respect to supporting tube 12, allowing a gap G1 to be provided between the tube 12 and the sidewall of central bore B2, and being sufficiently sized to reduce tilting of tube 12. While support surface 52 is configured to support at least the evacuation tube 12, the tube may or may not be in contact with the support surface/shelf 52 depending on how far into recess 15 the tube 12 has been inserted. In a similar manner, shelf 53 of bore B1, which is a support surface/shelf for preform 13, is formed the bottom of upper bore B1, and is at the top of central bore B2 and is oriented so as to support preform 13 and be substantially parallel to the major surfaces of substrate 1 and to shelf 52, as best shown in FIGS. 9-10. The upper, central, and lower bores B1, B2 and B3 may be formed in substrate 1 in any suitable manner, such as via one or more of mechanical drilling (e.g., using diamond-tipped drill bits), water jet, laser drilling, laser processing, punching, or the like. As viewed from above, the upper, central, and lower bores B1, B2 and B3, respectively, may be of any suitable shape, such as circular, oval, rectangular, or the like, in various example embodiments.

Referring to FIGS. 1-10, and perhaps as best shown in FIGS. 9-10, in certain example embodiments, as viewed cross-sectionally one location, multiple locations, or all locations, the diameter or width $D_{B1}$ of upper bore B1 is greater than the diameter or width $D_{B2}$ of central bore B2, and the diameter or width $D_{B2}$ of central bore B2 is greater than the diameter or width $D_{B3}$ of lower bore B3 ($D_{B1}>D_{B2}>D_{B3}$). In certain example embodiments, an average diameter or width $D_{B1}$ of upper bore B1 is at least about 1 mm greater (more preferably at least about 2 mm greater, and most preferably at least about 3 mm greater) than the diameter or width $D_{B2}$ of central bore B2. In certain example embodiments, an average diameter or width $D_{B2}$ of central bore B2 is at least about 0.5 mm greater (more preferably at least about 0.70 mm greater, and most preferably at least about 0.80 mm greater) than the diameter or width $D_{B3}$ of lower bore B3. $D_{B1}$ may be substantially the same size throughout upper bore B1, or may vary in size at different locations in the bore B1, depending upon the shape and formation of bore B1. Likewise, $D_{B2}$ may be substantially the same size throughout bore B2, or may vary in size at different locations in the bore B2, depending upon the shape and formation of bore B2; and $D_{B3}$ may be substantially the same size throughout bore B3, or may vary in size at different locations in the bore B3, depending upon the shape and formation of bore B3. In certain example embodiments, a ratio $D_{B1}/D_{B2}$ of the diameter or width $D_{B1}$ of upper bore B1/the diameter or width $D_{B2}$ of central bore B2, may be from about 1.2 to 5.0, more preferably from about 1.5 to 4.0, more preferably from about 1.7 to 2.6, more preferably from about 1.9 to 2.3, with an example being about 2.2 (e.g., if $D_{B1}$ is about 6.7 mm, and $D_{B2}$ is about 3.1 mm). In certain example embodiments, ratio $D_{B1}/D_{B2}$ of the diameter or width $D_{B1}$ of upper bore B1/the diameter or width $D_{B2}$ of central bore B2, may be at least about 1.8, more preferably at least about 2.0, and more preferably at least about 2.1. Such ratios, and a large size ($D_{B1}$) of the upper bore B1, are technically advantageous at least because, in certain example embodiments, this allows the preform 13 to be supported in the bore in a manner where the preform 13, before and after laser sintering/firing, does not contact the sidewall 61 (e.g., vertical or angled sidewall) of the bore B1 which has surprisingly and unexpectedly been found to improve durability and reduce tube 12 breakage and seal failures. In certain example embodiments, a ratio $D_{B2}/D_{B3}$ of the diameter or width $D_{B2}$ of central bore B2/the diameter or width $D_{B3}$ of lower bore B3, may be from about 1.1 to 3.0, more preferably from about 1.2 to 2.3, more preferably from about 1.3 to 2.0, more preferably from about 1.3 to 1.6, with an example being about 1.4 (e.g., if $D_{B2}$ is about 3.1 mm, and $D_{B3}$ is about 2.2 mm). In certain example embodiments, a ratio $W_{TS}/D_{B3}$ of the width $W_{TS}$ of tube shelf 52 to the diameter or width $D_{B3}$ of lower bore B3, may be at least 0.10, more preferably at least about 0.15, and more preferably at least about 0.18, with an example being about 0.20, and/or Gap G1 has a width of from about 0.02 to 0.20 mm, more preferably from about 0.03 to 0.10 mm, and most preferably from about 0.03 to 0.07 mm, with an example being about 0.05 mm, to provide for adequate tube support and to reduce tilting of tube 12. In certain example embodiments, gap G1 provided between at least the tube seal 13 and the second support surface 52 of the first glass substrate 1 may partially or entirely surround the tube 12 as viewed from above, and for example may substantially surround the tube as viewed from above which may cover situations where a sidewall of the tube 12 may contact the glass substrate 1 at only a small location to avoid further tilt.

Structure is provided for reducing tilting of tube 12 in recess 15. In certain example embodiments, it is desirable to reduce tube tilting so that the top of the tube can be aligned with and sealed, following evacuation, with a donut-shaped laser beam 13b, or any other suitable shaped/type of laser beam, from a laser 51. Unintended tilting of the tube can result in misalignment with such a laser beam 13b from laser 51, which may cause damage to the surrounding areas and/or failure to seal the top of the tube 12 following evacuation of gap 5. Elongated hollow tube 12 may have a tube length $T_L$ of from about 4 to 10 mm, more preferably from about 5 to 8 mm, and most preferably from about 5-7 mm (e.g., about 6 mm), in certain example embodiments. In certain example embodiments, it may be desirable to have tube 12 substantially vertical (e.g., vertical+/−10 degrees, more preferably +/−5 degrees), and so that the tube's central aperture is substantially concentric with at least one of bores B1, B2 and/or B3. In certain example embodiments, it has been found that when bores B1, B2, B3, shelves 52, 53, and tube 12 are designed so that $(D_{B2}–OD_T)/H_{B2}$ is no greater than 0.09, more preferably no greater than 0.07, more preferably no greater than 0.06, and most preferably no greater than 0.05, tube tilting can be sufficiently reduced. It is noted that $D_{B2}$ is the diameter or width of central bore B2 in which the tube 12 is partially located, $OD_T$ is the outer diameter of the tube 12, and $H_{B2}$ is the height of central bore B2 (e.g., see FIGS. 9-10). For example, $(D_{B2}–OD_T)/H_{B2}$ is 0.44 when $D_{B2}$ is 3.1 mm, $OD_T$ is 3.0 mm, and $H_{B2}$ is 2.25 mm. It has also been found that tube tilting can be reduced by configuring the bores and tube so that a ratio $H_{B2}/T_L$ is at least 0.30, more preferably at least 0.35, more preferably at least 0.37, where $H_{B2}$ is the height of central bore B2 and $T_L$ is the length of tube 12 (e.g., see FIGS. 9-10). The higher this ratio $H_{B2}/T_L$, the less tube tilting. For example, $H_{B2}/T_L$ would be 0.375 when $H_{B2}$ is 2.25 mm and $T_L$ is 6.0 mm.

FIG. 9 illustrates, according to an example embodiment, the evacuation tube 12 and seal preform 13 in the recess 15, prior to laser sintering/sealing of the tube seal preform 13. Tube 12 is supported by both tube shelf/step 52 at the bottom of the tube, and by perform 13 around the periphery of the tube 12. Preform 13 is resting on and supported by (e.g., directly on, or indirectly on) shelf/step 53 which is the base of the upper bore B1. Shelves 52 and 53 are substantially parallel to each other in certain example embodiments, and may be concentric as viewed from above. Upper bore B1 is sufficiently sized so that the preform 13 does not contact the sidewall 61 of the upper bore B1. Gap G2 between the peripheral edge 13a of the preform 13 and the sidewall 61 of the upper bore B1 may be at least about 0.10 mm, more preferably at least about 0.15 mm, more preferably at least about 0.20 mm, in order to reduce chances of seal and/or tube failures/breakage. Preform 13 may be partially melted to the adjacent glass substrate 1 on shelf 53 in bore B1 and/or to the tube 12 during a main binder burnout and/or pre-glaze heating step, prior to laser firing/sintering. In certain example embodiments, additional bore(s) may be provided.

FIGS. 10a and 10b are side cross-sectional views of various example embodiments, e.g., taken along section line A-A in FIG. 7, of an evacuation tube structure after laser sintering/sealing of the tube seal preform 13, which may be used in combination with any embodiment herein including those of FIGS. 1-16. Thus, while FIG. 9 illustrates an example panel prior to laser sintering/sealing of the tube seal preform 13, FIGS. 10a-10b illustrate various example embodiments of the panel after the preform 13 has been laser fired/sintered to form the seal 13 around the evacuation tube 12. The cross-sectional shape of the final seal 13 around the evacuation tube 12 is slightly different in FIG. 10b, compared to FIG. 10a, but they are similar in many respects. It can be seen in FIGS. 10a-10b, that the preform and laser processing are designed so that the laser beam 13b from laser 51 impinging upon the preform 13 (e.g., see the laser 51 and donut-shaped/ring-shaped laser beam 13b in FIGS. 6 and 8d) causes the seal material of the preform when laser heated to wick upwardly along the outer periphery of tube 12 and form a desirable shape and hermetic seal 13, such as via a capillary effect. Alternatively, instead of using a donut-shaped laser beam, a spot laser may be manipulated/moved to circle the tube 12 to sinter the tube seal material and form the tube seal 13.

Such laser sintering, and materials used and processing techniques, are why the shape of post-laser fired/sintered seal 13 in FIGS. 10a-10b is very different than its shape in FIG. 9 prior to laser firing/sintering of the seal material. In FIG. 9, it can be seen that prior to being laser fired/sintered, the top surface 13d of the preform 13 had an original preform height (OPH). As shown in FIGS. 10a-10b, the laser sintering/firing of the preform caused the seal material 13 to wick upwardly along the tube 12 by an amount corresponding to height HI, so that the upper surface of the seal material 13 in FIGS. 10a-10b after laser firing/sintering thereof is at a height along the tube 12 that is greater than the original preform height (OPH) by vertical distance HI which may be referred to as a hike amount.

Tube seal 13 may be tellurium oxide based, vanadium oxide based, or may be of any other suitable material. Example materials for tube seal 13 are provided herein, both in tables above and in FIGS. 11-12 and 14-15.

The current NFRC model for fenestration products, ANSI/NFRC 100, is based on a standard non-vacuum insulating glass (IG) units for determining edge-of-glass (EOG) u-factor values for a window panel. U-factor can be used to determine energy losses through products. While vacuum insulating panels have improved thermal performance compared to non-vacuum IG units, the current NRFC model does not fully reflect such improvements because it is designed for and based on non-vacuum IG units for determining u-factor values such as EOG u-factors.

Thus, to complement NFRC100, the instant inventors have designed and used a different test, similar to and derived from a DOE testing technique previously used at Lawrence Berkeley National Labs (LBNL) Infrared Thermography Facility (e.g., see pages 152-158 of thesis document *Heat Transfer Processes and Stresses in Vacuum Glazing*, by Thomas M. Simko, July 1996), as follows to demonstrate improvements in inventive vacuum insulating panels compared to both conventional vacuum insulating panels and non-vacuum IG units. FIG. 10c illustrates data using this test procedure, for both a conventional non-vacuum window unit with an argon gas filled cavity (dotted line in FIG. 10c) and for a vacuum insulating panel corresponding to an example embodiment herein (e.g., solid line in FIG. 10c; see panel in FIGS. 2, 7 and materials in FIGS. 11-15). In this test, the window product/panel is placed in a wall between warm (about 21 degrees C., about 8-10% RH) and cold (about minus 18 degrees C.) rooms/areas, and a wind speed (about 6 mph) applied in the cold area, until steady-state conditions have been met for temperature on both sides. The edge was not encapsulated, so there is no frame and the periphery of the edge seal is not directly exposed to the minus 18 degrees C. An IR camera is then used to determine the glass temperature of the panel at different locations on the warm side, moving from the edge of the panel inwardly. In this test procedure, facing the panel, moving laterally inwardly from the edge of the glass, the higher the glass temperature on the warm side the better and the shorter the distance needed to approximately reach a COG temperature the better, as these are indicative of good thermal insulating properties of the panel. Both panels measured in FIG. 10c were double-pane 14×20 inch panels, and both included a low-E coating on the interior surface of the glass sheet on the cold side. FIG. 10c illustrates that the vacuum insulating panel according to example embodiment (solid line in FIG. 10c) realized much higher glass temperatures on the warm side than did the non-vacuum IG unit (dotted line in FIG. 10c), such as at locations from 20-160 mm in from the edge of the panel, thereby indicating better thermal and insulating properties for the vacuum insulating panel. FIG. 10c illustrates that, for example, the warm side glass temperature of the vacuum insulating panel according to an example embodiment (solid line in FIG. 10c), moving inwardly from the edge of the panel, sloped upwardly from the edge (0 mm) unit it approximately reached its COG temperature range over 20 degrees C. around 60 mm in from the edge. The FIG. 10c graph illustrates data from one edge of the panel moving toward the center of the panel—the other side would be similar.

Thus, FIG. 10c illustrates that the vacuum insulating panel 100 according to an example embodiment (solid line in FIG. 10c; see panel in FIGS. 2, 7 and materials in FIGS. 11-15) realized better thermal insulating characteristics than did the non-vacuum IG unit (dotted line in FIG. 10c), at least because as shown in FIG. 10c: (i) the vacuum insulating panel 100 had a higher maximum warm side glass temperature than did the non-vacuum IG unit, such as in the area from 60 mm moving inwardly away from the edge, e.g., a maximum warm side glass temperature of over 20 degrees C. for the vacuum insulating panel 100, compared to just under 18 degrees C. for the non-vacuum IG unit; (ii) the temperature curve in FIG. 10c for the vacuum insulating panel 100 had a higher slope from the edge of the panel to reaching its maximum warm side glass temperature compared to the non-vacuum IG unit; (iii) the vacuum insulating panel 100 had a higher warm side glass temperature about 30 mm in from the edge (e.g., about 19 degrees C.), compared to the non-vacuum IG unit (about 17.5 degrees C.) indicating better thermal characteristics in intermediate areas near the edge as well for the vacuum insulating panel 100; and/or (iv) the vacuum insulating panel 100 had a higher warm side glass temperature measured about 62.5 mm in from the edge (e.g., over 20 degrees C.), compared to the non-vacuum IG unit (under 18 degrees C.) indicating better thermal characteristics approaching the COG for the vacuum insulating panel 100.

The surface temperature curve for the warm side of the vacuum insulating panel 100 in FIG. 10c may be characterized by the following equation:

$$T(x) = T_{min} + \left[ (T_{max} - T_{min}) \times \left( x^n / (k^n + x^n) \right) \right]$$

where $T_{min}$ (e.g., 9.07 degrees C. for the vacuum panel curve in FIG. 10c) is the minimum measured temperature on the plot namely at the edge around 0 mm in from the edge, $T_{max}$ (e.g., 20.4 degrees C. for the vacuum panel curve in FIG. 10c) is the maximum measured temperature on the plot, x represents the x-axis which in mm is the distance of the location moving inwardly from the edge of the panel, n is a fitting factor/parameter, and k is a fitting factor/parameter regarding an inflection point. The equation would be the same for the IG unit curve in FIG. 10c, except that k would be different (e.g., 14.4 vs. 14.7) and n would be different (e.g., 2.72 vs. 3.5). Thus, for example, applying measured data from FIG. 10c, the equation may be as follows for the vacuum insulating panel (this can be applied to any point on the x-axis, and thus to determine any point on the curve):

$$T(x) = 9.07 + \left[ (20.4 - 9.07) * \left( x^{2.72} / (14.4^{2.72} + x^{2.72}) \right) \right]$$

Thus, in certain example embodiments, vacuum insulating panels with two glass substrates have been improved with respect to thermal and insulating properties so as to realize improved thermal performance and thus lower u-factor values. Components such as edge seal material(s) and/or dimension(s) thereof are configured in a vacuum insulating panel to improve thermal performance to provide for, moving laterally inwardly from the edge of the glass in the above-described reference test procedure, higher glass temperatures on the warm side of the panel and a shorter the distance needed to approximately reach a COG temperature, and thus improved thermal performance in asymmetric thermal conditions. Improved EOG and/or COG u-factor(s) can also be achieved.

Moreover, in general, a Temperature Rise Rate (TRR) slope of the surface temperature curve for the warm side of the vacuum insulating panel 100 in FIG. 10c, from a location 12.5 mm in from the edge of the panel to a location 62.5 mm in from the edge of the panel, may be characterized by the following equation (in units of degrees C. per mm):

$$TRR = (T_{62.5} - T_{12.5})/(62.5 - 12.5) = (T_{62.5} - T_{12.5})/50$$

where $T_{62.5}$ is the glass temperature in degrees C. on the warm side measured at a location 62.5 mm in from the edge of the panel, $T_{12.5}$ is the glass temperature in degrees C. on the warm side measured at a location 12.5 mm in from the edge of the panel, 62.5 represents a location 62.5 mm in from the edge of the panel, and 12.5 represents a location 12.5 mm in from the edge of the panel. The edge of the panel, the location 12.5 mm laterally inward from the panel edge, and the location 62.5 mm laterally inward form the panel edge, form an imaginary straight line and thus are linearly arranged. The 12.5 mm location is chosen due to typical frame positioning and because this is just inside the inner periphery of the edge seal 3 in certain example embodiments and is a good indication of how well the edge seal is insulating, whereas the 62.5 mm location is chosen because this may indicate a temperature at or proximate the max COG temperature of the panel following most or all of an upward slope. The better the thermal performance of the edge seal 3, the higher the TRR value. In other words, the better the thermal performance of the edge seal 3, the quicker the warm side temperature will reach a value at or proximate its max COG temperature. Thus, for example, applying measured data from FIG. 10c, the TRR slope equation may be as follows for the vacuum insulating panel:

$$TRR = (20.3 - 12.8)/50 = 0.15 \ \text{degrees C ./mm}$$

Thus, in FIG. 10c, the vacuum insulating panel has a TRR slope of about 0.15 degrees C./mm from a location 12.5 mm in from the edge of the panel to a location 62.5 mm in from the edge of the panel. In certain example embodiments, the materials and/or dimensions of the edge seal 3 (one or more of layers 30, 31 and/or 32) is/are designed so that the vacuum insulating panel 100 can realize a warm side glass temperature TRR rate and/or slope of at least about 0.14 degrees C./mm, more preferably of at least about 0.15 degrees C./mm, under the test conditions described herein in connection with FIG. 10c, from a location 12.5 mm in from the edge of the panel to a location 62.5 mm in from the edge of the panel. This is an improvement over conventional non-vacuum IG units (e.g., the conventional non-vacuum IG unit tested via the dotted line in FIG. 10c had such a TRR of 0.10 degrees C./mm under the test conditions described herein in connection with FIG. 10c, from a location 12.5 mm in in from the edge of the panel to a location 62.5 mm in from the edge of the panel), as well as compared to conventional vacuum insulating panels.

While FIG. 10c illustrates the improved thermal performance during asymmetric thermal conditions of a vacuum insulating panel 100 according to an example embodiment (solid line in FIG. 10c; e.g., see panel in FIGS. 2, 7 and materials in FIGS. 11-15) compared to a conventional non-vacuum IG unit (dotted line in FIG. 10c), a conventional vacuum insulating panel having a single layer edge seal (vanadium based) about 12 mm wide was also tested and the performance of the vacuum insulating panel 100 according to an example embodiment (solid line in FIG. 10c) was found to be better than the conventional vacuum insulating panel in numerous respects as well. The conventional vacuum insulating glass panel was tested under the conditions described herein with respect to FIG. 10c, and as shown by the "+" data marks therefor in FIG. 10c a temperature of 11.7 degrees C. was measured at a location 12.5 mm in from the edge of the panel and a temperature of 19.3 degrees was measured at a location 62.5 mm in from the edge of the panel. This is reflected in Table 8 below, with "Example 1" being measured data from the vacuum insulating panel 100 plotted in FIG. 10c and as shown and described in connection with FIGS. 2, 7 and materials in FIGS. 11-15 herein, and Comparative Example 1 (CE 1) being measured data from a comparative vacuum insulating panel with different seal materials and dimensions:

TABLE 8

FIG. 10c data for Example and Comparative
Example vacuum panels

|  | Example 1 | Comparative Example 1 |
|---|---|---|
| Temp 12.5 mm in from edge: | 12.8 degrees C. | 11.7 degrees C. |
| Temp 62.5 mm in from edge: | 20.3 degrees C. | 19.3 degrees C. |

Thus, it can be seen in Table 8 and from the "+" marks in FIG. 10c that the conventional vacuum insulating panel (Comparative Example 1), with different seal materials and dimensions, had undesirably lower warm side temperatures under the FIG. 10c test conditions at locations 12.5 and 62.5 mm in from the edge of the panel, compared to Example 1 according to an example embodiment. Accordingly, it can be seen that the conventional vacuum insulating panel of Comparative Example 1 cannot realize sufficiently high warm side temperature, for example at a location 62.5 mm in from the edge of the panel, and thus cannot realize a sufficiently high warm side temperature at COG and/or corresponding u-factors, compared to Example 1. Thus, at corresponding locations, the warm side glass of the Comparative Example panel was colder than that of Example 1, indicating inferior thermal performance for the Comparative Example panel. This demonstrates that the vacuum insulating panel of Example 1 realized superior thermal insulating properties during the asymmetric thermal conditions of FIG. 10c compared to the conventional vacuum insulating panel of Comparative Example 1.

In certain example embodiments, the materials and/or dimensions of the edge seal 3 (one or more of layers 30, 31 and/or 32) is/are designed so that the vacuum insulating panel 100 can realize a warm side glass temperature of at least 19.7 degrees C., more preferably of at least 19.8 degrees C., more preferably of at least 20.0 degrees C., more preferably of at least 20.1 degrees C., and most preferably of at least 20.2 degrees C., at a location 62.5 mm laterally inward from the edge of the panel under the test conditions described herein in connection with FIG. 10c. In certain example embodiments, the materials and/or dimensions of the edge seal 3 (one or more of layers 30, 31 and/or 32) is/are designed so that the vacuum insulating panel 100 can realize a warm side glass temperature of at least 12.4 degrees C., more preferably of at least 12.5 degrees C., more preferably of at least 12.7 degrees C., more preferably of at least 12.8 degrees C., and most preferably of at least 13.0 degrees C., at a location 12.5 mm laterally inward from the edge of the panel under the test conditions described herein in connection with FIG. 10c. At such a location 12.5 mm laterally inward from the edge, testing of samples according to various example embodiments herein have measured warm side temperatures of up to 13.6 degrees C. (e.g., 13.1 degrees C., 12.8 degrees C., and 13.6 degrees C., for instance).

Condensation Resistance Factor for the glass (CRF$_G$) can be improved in a similar manner. Condensation Resistance Factor for the glass (CRF$_G$) and for the frame (CRF$_F$) is defined in AAMA 1503-09 and AAMA 1503.1-88, the disclosures of which are hereby incorporated herein by reference. For example, AAMA 1503-09 describes CRF$_G$ and the testing procedure and formulas used for measuring and determining CRF$_G$. The window product is placed in a wall between warm (21 degrees C., <25% RH, for purposes of reference and calculation only) and cold (minus 18 degrees C., for purposes of reference and calculation only) rooms, and a wind speed (15 mph, for purposes of reference and calculation only) applied, until steady-state conditions have been met for temperature on both sides. Heat flow through the product and surface temperatures are then measured, to determine data such as U-Factor and CRF values for the product. One of the CRF values calculated is the CRF for the glass (CRF$_G$). The higher the CRF$_G$ value, the better the condensation resistance for the glass.

For example, Equation (9) in AAMA 1503-09 is as follows:

$$CRF_G = [(GT - t_c)/(t_h - t_c)] \times 100$$

where 100 is a whole number to make CRF$_G$ a whole number, GT is an average temperature at prespecified locations and roving locations on the glazing, $t_c$ is temperature of cold side air (degrees F.), and $t_h$ is temperature of warm side air (degrees F.). CRF$_F$ is calculated based on temperature readings on the frame. No measurements from the frame are used to calculate CRF$_G$.

Excess moisture on a window is undesirable and can lead to decay and/or damage. Conventional double-paned IG units and vacuum insulating panels have realized CRF$_G$ values in the 60s. Such values under 70 are indicative of condensation problems and poor thermal characteristics. In certain example embodiments, vacuum insulating panels with two glass substrates (e.g., see FIGS. 2-7) have been improved with respect to thermal and insulating properties so as to realize improved and thus higher CRF$_G$ values above 70. Components such as edge seal material(s) (e.g., one or more of 30, 31, and/or 32) and/or dimension(s) thereof are configured to improve thermal performance and to increase the Condensation Resistance Factor for glass (CRF$_G$) for the panel, so as to provide for a panel with a reduced likelihood to accumulate condensation in the field during various weather conditions.

The materials and dimensions used for the edge seal 3 in various example embodiments herein, for example, in addition to improve u-factor and thermal performance and explained above, have also been found to result in a vacuum insulating panel that can realize surprisingly higher $CRF_G$ values. In certain example embodiments, components such as edge seal material(s) (e.g., one or more of 30, 31, and/or 32) and/or dimension(s) therefor are configured to improve thermal performance and to increase the Condensation Resistance Factor for glass ($CRF_G$) for the panel so that the panel can realize a $CRF_G$ value of at least 73, more preferably at least 74, more preferably at least 75, more preferably at least 76, with an example being 77, per AAMA 1503-09. An example vacuum insulating panel, e.g., window size of about 17"×23", made in accordance with the materials and dimensions herein (e.g., see FIGS. 2 and 11-15) has been tested and found to have a $CRF_G$ ($CRF_g$) value of 77, as shown by the test data in FIG. 10*d*. In certain embodiments, components such as edge seal material(s) (e.g., one or more of 30, 31, and/or 32) and/or dimension(s) therefor are configured to improve thermal performance and to increase the Condensation Resistance Factor for glass ($CRF_G$) for the panel. In certain example embodiments, the vacuum insulating panel with such improved material(s) and/or dimension(s) can raise the winter interior glass surface temperature to about 20 C, and the COG u-factor can range from about 0.24 W/m$^2$K to about 0.32 W/m$^2$K. The reduced thermal conductivity perimeter edge seal 3, coupled with the low COG u-factor, raises the winter interior glass surface temperature sufficiently to reduce condensation and significantly increase the CRFg. In certain example embodiments, the panel may have a center of glass (COG) u-factor of from about 0.24 to 0.38 W/m$^2$K, more preferably from about 0.28 to 0.36 W/m$^2$K, and most preferably from about 0.30 W/m$^2$K to 0.34 W/m$^2$K. In certain example embodiments, the panel may have an EOG u-factor of from about 0.21 to 0.34, more preferably from about 0.24 to 0.31, more preferably from about 0.26 to 0.30 (e.g., from about 0.27 to 0.30) Btu/hr*ft$^{2\circ}$ F. (or from about 1.19 to 1.93 W/m$^2$K, more preferably from about 1.36 to 1.76 W/m$^2$K). In certain example embodiments, the panel may have an EOG u-factor of no greater than 0.33, more preferably no greater than 0.31 Btu/hr*ft$^{2\circ}$ F. (or no greater than 1.87 W/m$^2$K, more preferably no greater than 1.76 W/m$^2$K).

FIG. 16 is a flowchart illustrating example steps in making a vacuum insulating panel according to various example embodiments, which may be used in combination with any embodiment herein. Steps 201-204 apply to one of the two substrates, while steps 205-209 apply to the other one of the substrates, and steps 210-213 apply when the substrates are mated to each other via clamping, sealing, and/or the like. For example details regarding various steps 201-213, see one or more of U.S. patent application Ser. Nos. 18/376,914, 18/376,473, 18/376,479, 18/376,483, 18/379,275, and 18/510,777, the disclosures of which are all hereby incorporated herein by reference in their entireties.

In an example embodiment, there is provided a vacuum insulating panel comprising: a first glass substrate (e.g., 1); a second glass substrate (e.g., 2); a plurality of spacers (e.g., 4) provided in a gap (e.g., 5) between at least the first and second glass substrates, wherein the gap (e.g., 5) is at pressure less than atmospheric pressure; a seal (e.g., 3) provided at least partially between at least the first and second glass substrates; wherein no more than two glass substrates (e.g., 1, 2) are provided in the vacuum insulating panel; and wherein material(s) and/or dimension(s) of the seal (e.g., 3) are configured so that, under reference testing conditions when the panel is positioned between warm (about 21 degrees C., about 8-10% relative humidity) and cold (about minus 18 degrees C.) areas and a wind speed (about 6 mph) applied in the cold area, until steady-state conditions have been met for temperature on both sides, and an infrared camera is used to measure glass temperature on the warm side at different locations moving laterally inward from the edge of the panel, the panel has at least two of: (i) a warm side glass temperature rise rate (TRR) of at least about 0.14 degrees C./mm from a location 12.5 mm laterally inward from the edge of the panel to a location 62.5 mm laterally inward from the edge of the panel, where TRR= $(T_{62.5}-T_{12.5})/(62.5-12.5)$, where $T_{62.5}$ is glass temperature in degrees C. on the warm side measured at a location 62.5 mm laterally inward from the edge of the panel and $T_{12.5}$ is glass temperature in degrees C. on the warm side measured at a location 12.5 mm laterally inward from the edge of the panel; (ii) a warm side glass temperature of at least 19.7 degrees C. at a location 62.5 mm laterally inward from the edge of the panel; and (iii) a warm side glass temperature of at least 12.4 degrees C. at a location 12.5 mm laterally inward from the edge of the panel.

The vacuum insulating panel of the preceding paragraph, the panel, under said reference testing conditions, may have each of (i), (ii), and (iii).

The vacuum insulating panel of any of the preceding two paragraph, under said reference testing conditions, may have a warm side glass temperature rise rate (TRR) of at least about 0.15 degrees C./mm from a location 12.5 mm laterally inward from the edge of the panel to a location 62.5 mm laterally inward from the edge of the panel.

The vacuum insulating panel of any of the preceding three paragraph, under said reference testing conditions, may have a warm side glass temperature of at least 19.8 (more preferably at least 20.0, more preferably at least 20.1, most preferably at least 20.2) degrees C. at the location 62.5 mm laterally inward from the edge of the panel.

The vacuum insulating panel of any of the preceding four paragraph, under said reference testing conditions, may have a warm side glass temperature of at least 12.7 (more preferably at least 12.8, more preferably at least 13.0) degrees C. at the location 12.5 mm laterally inward from the edge of the panel.

For the vacuum insulating panel of any of the preceding five paragraphs, under said reference testing conditions, a surface temperature curve for the warm side of the vacuum insulating panel may be approximately characterized by the following equation: $T(x)=T_{min}+[(T_{max}-T_{min})\times(x''/(k''+x''))]$, where $T_{min}$ is a minimum measured temperature, $T_{max}$ is a maximum measured temperature, x represents x-axis which in mm represents distance moving laterally inward from the edge of the panel, n is a fitting factor/parameter, and k is a fitting factor/parameter regarding inflection point.

The vacuum insulating panel of any of the preceding six paragraphs may have an EOG u-factor of from about 0.21 to 0.34, more preferably from about 0.24 to 0.31, Btu/hr*ft$^{2\circ}$ F. (or from about 1.19 to 1.93 W/m$^2$K, more preferably from about 1.36 to 1.76 W/m$^2$K).

In the vacuum insulating panel of any of the preceding seven paragraphs, material(s) and/or dimension(s) of the seal may be configured so that the vacuum insulating panel has a Condensation Resistance Factor for glass ($CRF_G$) of at least 73, more preferably of at least 74, more preferably of at least 75, more preferably of at least 76, and most preferably of at least 77.

In the vacuum insulating panel of any of the preceding eight paragraphs, the seal may comprise a first seal layer and a second seal layer. The second seal layer may comprise boron oxide and/or bismuth oxide, and for example from about 1-20 mol % bismuth oxide and from about 20-65 mol % boron oxide, and may comprise at least two times more boron oxide than bismuth oxide in terms of mol %. The second seal layer may comprise from about 30-60 mol % boron oxide. The second seal layer may comprise from about 1-12 mol % bismuth oxide and/or from about 0-50 mol % silicon oxide. The second seal layer may comprise from about 40-55 mol % boron oxide, and/or from about 0-20 mol % titanium oxide. The second seal layer may comprise at least three times more boron oxide than bismuth oxide in terms of mol %. The second seal layer may comprise more boron oxide than bismuth oxide in terms of wt. %. The second seal layer may comprise, in terms of mol %, from about 4-9% bismuth oxide, from about 40-55% boron oxide, from about 15-35% silicon oxide, and/or from about 3-12% titanium oxide.

In the vacuum insulating panel of any of the preceding nine paragraphs, the seal may comprise a first seal layer and a second seal layer. A thermal conductivity of the second seal layer may be greater than a thermal conductivity of the first seal layer. The second seal layer may have a thermal conductivity of from 0.80 to 1.90, more preferably from 1.0 to 1.90 W/mK, and/or the first seal layer may have a thermal conductivity of from 0.70 to 1.00, more preferably from 0.80 to 1.00 W/mK. The second seal layer may have a thermal conductivity of from about 1.00 to 1.50, more preferably from 1.10 to 1.50 W/mK, and/or the first seal layer may have a thermal conductivity of from about 0.80 to 1.0, more preferably from about 0.80 to 0.95 W/mK.

In the vacuum insulating panel of any of the preceding ten paragraphs, the seal, which may be an edge seal, may comprise a first seal layer and a second seal layer. The first seal layer may have a density of from about 2.8-4.0 $g/cm^3$, the second seal layer may have a density of from about 3.0-4.2 $g/cm^3$, and/or the density of the second seal layer may be at least about 0.20 $g/cm^3$ greater than the density of the first seal layer.

In the vacuum insulating panel of any of the preceding eleven paragraphs, the seal, which may be an edge seal, may comprise a first seal layer and a second seal layer. The second seal layer may have a bridging oxygen (BO) content of at least about 80%, more preferably a bridging oxygen (BO) content of at least about 85%.

In the vacuum insulating panel of any of the preceding twelve paragraphs, the seal, which may be an edge seal, may comprise a first seal layer and a second seal layer. The first seal layer may comprise tellurium oxide and vanadium oxide, and by wt. % may comprise more tellurium oxide than vanadium oxide.

In the vacuum insulating panel of any of the preceding thirteen paragraphs, the seal, which may be an edge seal, may comprise a first seal layer and a second seal layer. The first seal layer may comprise from about 40-70 wt. % tellurium oxide. From about 60-95% of Te in the first seal layer may be in a form of $TeO_3$, and/or from about 3-35% of Te in the first seal layer may be in a form of $TeO_4$. A ratio $TeO_4:TeO_3$ in the first seal layer may be from about 0.05 to 0.40. The tellurium oxide may further comprise $TeO_{3+1}$, and may comprise more $TeO_3$ than $TeO_{3+1}$ by wt. %. From about 1-9% of Te in the first seal layer may be in a form of $TeO_{3+1}$.

In the vacuum insulating panel of any of the preceding fourteen paragraphs, the seal, which may be an edge seal, may comprise a first seal layer and a second seal layer. The first seal layer may comprise vanadium oxide and/or tellurium oxide. The vanadium oxide in the first seal layer may comprise $VO_2$ and $V_2O_5$, wherein more V in the first seal layer may be in a form of $VO_2$ than $V_2O_5$.

In the vacuum insulating panel of any of the preceding fifteen paragraphs, the seal, which may be an edge seal, may comprise a first seal layer and a second seal layer. The first seal layer may comprise vanadium oxide and/or tellurium oxide. From about 35-85% of the V in the first seal layer may be in a form of $VO_2$, more preferably from about 50-75% of the V in the first seal layer may be in a form of $VO_2$. From about 5-45% of the V in the first seal layer may be in a form of $V_2O_5$.

In the vacuum insulating panel of any of the preceding sixteen paragraphs, the seal, which may be an edge seal, may comprise a first seal layer and a second seal layer. The first seal layer may comprise vanadium oxide and/or tellurium oxide. The vanadium oxide may comprise $V_2O_3$, and wherein more V in the first seal layer may be in a form of $VO_2$ than $V_2O_3$.

In the vacuum insulating panel of any of the preceding seventeen paragraphs, the seal, which may be an edge seal, may comprise a first seal layer and a second seal layer. The first seal layer may be a main seal layer, and the second seal layer may be a primer layer. The seal may further comprise a third seal layer, the first seal layer being located between at least the second and third seal layers. The third seal layer may comprise boron oxide and/or bismuth oxide, wherein the third seal layer may comprise from about 1-20 mol % bismuth oxide and from about 20-65 mol % boron oxide, and may comprise at least two times more boron oxide than bismuth oxide in terms of mol %.

In the vacuum insulating panel of any of the preceding eighteen paragraphs, the seal, which may be an edge seal, may comprise a first seal layer and a second seal layer. For at least one location of the seal, the first seal layer may have a first thickness, the second seal layer may have a second thickness, and the third seal layer may have a third thickness; and wherein the first thickness may be greater than the second thickness and less than the third thickness.

In the vacuum insulating panel of any of the preceding nineteen paragraphs, the seal, which may be an edge seal, may comprise a first seal layer and a second seal layer. For at least one location of the seal, a width of the first seal layer may be less than a width of the second seal layer by at least about 1 mm.

In the vacuum insulating panel of any of the preceding twenty paragraphs, the seal may be substantially lead-free.

In the vacuum insulating panel of any of the preceding twenty-one paragraphs, the seal, which may be an edge seal, may comprise a first seal layer and a second seal layer. The first seal layer may have a physical thickness of from about 40-100 μm, and/or the second seal layer may have a physical thickness of from about 20-70 μm or from about 100-220 μm.

In the vacuum insulating panel of any of the preceding twenty-two paragraphs, the seal, which may be an edge seal, may comprise a first seal layer and a second seal layer. For the at least one location of the seal, a thickness of the first seal layer may be at least about 10 μm thicker than a thickness of the second seal layer.

In the vacuum insulating panel of any of the preceding twenty-three paragraphs, the seal, which may be an edge seal, may comprise a first seal layer and a second seal layer. The second seal layer may have a melting point (Tm) at least 100 degrees C. higher than a melting point of the first seal layer. The second seal layer may have a melting point (Tm) at least 150 degrees C. higher than a melting point of the first seal layer.

In the vacuum insulating panel of any of the preceding twenty-four paragraphs, the first and second glass substrates may comprise tempered glass substrates or heat strengthened glass substrates.

In the vacuum insulating panel of any of the preceding twenty-five paragraphs, the seal may be a hermetic edge seal of the vacuum insulating panel.

In the vacuum insulating panel of any of the preceding twenty-six paragraphs, the panel may be configured for use in a window.

In the vacuum insulating panel of any of the preceding twenty-seven paragraphs, the seal, which may be an edge seal, may comprise a first seal layer and a second seal layer. At at least one location a ratio Wp/W of second seal width (Wp) to first seal width (W) may be from about 1.2 to 2.2, more preferably from about 1.4 to 1.9, more preferably from about 1.5 to 1.8.

In the vacuum insulating panel of any of the preceding twenty-eight paragraphs, a low-E coating may be provided on at least one of the first and second glass substrates.

In the vacuum insulating panel of any of the preceding twenty-nine paragraphs, the panel may have a center of glass (COG) u-factor of from about 0.24 to 0.38 $W/m^2K$, more preferably from about 0.28 to 0.36 $W/m^2K$, and most preferably from about 0.30 $W/m^2K$ to 0.34 $W/m^2K$.

In the vacuum insulating panel of any of the preceding thirty paragraphs, the panel may have an EOG u-factor of no greater than 0.33, more preferably no greater than 0.31 $Btu/hr*ft^{2°}$ F. (or no greater than 1.87 $W/m^2K$, more preferably no greater than 1.76 $W/m^2K$).

It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). Terms, such as "first", "second", and the like, may be used herein to describe various components. Each of these terminologies is not used to define an essence, order or sequence of a corresponding component but used merely to distinguish the corresponding component from other component(s). For example, a "first" component may be referred to as a "second" component, and similarly, the "second" component may be referred to as the "first" component. "Or" as used herein may cover both "and" and "or."

It should be noted that if it is described that one component is "connected", "coupled", or "joined" to another component, at least a third component(s) may be "connected", "coupled", and "joined" between the first and second components, although the first component may be directly connected, coupled, or joined to the second component. Thus, terms such as "connected" and "coupled" cover both direct and indirectly connections and couplings.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

The word "about" as used herein means the identified value plus/minus 5%.

"On" as used herein covers both directly on, and indirectly on with intervening element(s) therebetween. Thus, for example, if element A is stated to be "on" element B, this covers element A being directly and/or indirectly on element B. Likewise, "supported by" as used herein covers both in physical contact with, and indirectly supported by with intervening element(s) therebetween.

Each embodiment herein may be used in combination with any other embodiment(s) described herein.

While the disclosure has been illustrated and described with reference to various example embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in combination with any other embodiment(s) described herein.

The invention claimed is:

1. A vacuum insulating panel comprising:
a first glass substrate;
a second glass substrate;
a plurality of spacers provided in a gap between at least the first and second glass substrates, wherein the gap is at pressure less than atmospheric pressure;
a seal, comprising a first layer and a second layer, provided at least partially between at least the first and second glass substrates;
wherein no more than two glass substrates are provided in the vacuum insulating panel;
wherein a thermal conductivity of the second seal layer is greater than a thermal conductivity of the first seal layer; and
wherein material(s) and/or dimension(s) of the seal are configured so that, under reference testing conditions where the panel is positioned between warm (about 21 degrees C., about 8-10% relative humidity) and cold (about minus 18 degrees C.) areas and a wind speed (about 6 mph) applied in the cold area, until steady-state conditions have been met for temperature on both sides, and an infrared camera is used to measure glass temperature on the warm side at different locations moving laterally inward from the edge of the panel, the panel has at least two of:
(i) a warm side glass temperature rise rate (TRR) of at least about 0.14 degrees C./mm from a location 12.5 mm laterally inward from the edge of the panel to a location 62.5 mm laterally inward from the edge of the panel, where $TRR=(T_{62.5}-T_{12.5})/(62.5-12.5)$, where $T_{62.5}$ is glass temperature in degrees C. on the warm side measured at a location 62.5 mm laterally inward from the edge of the panel and $T_{12.5}$ is glass temperature in degrees con the warm side measured at a location 12.5 mm laterally inward from the edge of the panel;
(ii) a warm side glass temperature of at least 19.7 degrees C. at a location 62.5 mm laterally inward from the edge of the panel; and (iii) a warm side glass temperature of at least 12.4 degrees C. at a location 12.5 mm laterally inward from the edge of the panel.

2. The vacuum insulating panel of claim 1, wherein the panel is configured so that the panel, under said reference testing conditions, has each of (i), (ii), and (iii).

3. The vacuum insulating panel of claim 1, wherein the panel is configured so that the panel, under said reference testing conditions, has a warm side glass temperature rise rate (TRR) of at least about 0.15 degrees C./mm from a location 12.5 mm laterally inward from the edge of the panel to a location 62.5 mm laterally inward from the edge of the panel.

4. The vacuum insulating panel of claim 1, wherein the panel is configured so that the panel, under said reference testing conditions, has a warm side glass temperature of at least 19.8 degrees C. at the location 62.5 mm laterally inward from the edge of the panel.

5. The vacuum insulating panel of claim 1, wherein the panel is configured so that the panel, under said reference testing conditions, has a warm side glass temperature of at least 20.0 degrees C. at the location 62.5 mm laterally inward from the edge of the panel.

6. The vacuum insulating panel of claim 1, wherein the panel is configured so that the panel, under said reference testing conditions, has a warm side glass temperature of at least 20.2 degrees C. at the location 62.5 mm laterally inward from the edge of the panel.

7. The vacuum insulating panel of claim 1, wherein the panel is configured so that the panel, under said reference testing conditions, has a warm side glass temperature of at least 12.7 degrees C. at the location 12.5 mm laterally inward from the edge of the panel.

8. The vacuum insulating panel of claim 1, wherein the panel is configured so that the panel, under said reference testing conditions, has a warm side glass temperature of at least 12.8 degrees C. at the location 12.5 mm laterally inward from the edge of the panel.

9. The vacuum insulating panel of claim 1, wherein the panel is configured so that the panel, under said reference testing conditions, has a warm side glass temperature of at least 13.0 degrees C. at the location 12.5 mm laterally inward from the edge of the panel.

10. The vacuum insulating panel of claim 1, wherein, under said reference testing conditions, a surface temperature curve for the warm side of the vacuum insulating panel is approximately characterized by the following equation: $T(x)=T_{min}+[(T_{max}-T_{min})\times(x^{n}/(k^{n}+x^{n}))]$, where $T_{min}$ is a minimum measured temperature, $T_{max}$ is a maximum measured temperature, x represents x-axis which in mm represents distance moving laterally inward from the edge of the panel, n is a fitting factor/parameter, and k is a fitting factor/parameter regarding inflection point.

11. The vacuum insulating panel of claim 1, wherein the panel has an EOG u-factor of from about 1.19 to 1.93 W/m²K.

12. The vacuum insulating panel of claim 1, wherein the panel has an EOG u-factor of from about 1.36 to 1.76 W/m²K.

13. The vacuum insulating panel of claim 1, wherein the panel has an EOG u-factor of no greater than 1.87 W/m²K.

14. The vacuum insulating panel of claim 1, wherein material(s) and/or dimension(s) of the seal are configured so that the vacuum insulating panel has a Condensation Resistance Factor for glass ($CRF_G$) of at least 73.

15. The vacuum insulating panel of claim 1, wherein material(s) and/or dimension(s) of the seal are configured so that the vacuum insulating panel has a Condensation Resistance Factor for glass ($CRF_G$) of at least 74.

16. The vacuum insulating panel of claim 1, wherein material(s) and/or dimension(s) of the seal are configured so that the vacuum insulating panel has a Condensation Resistance Factor for glass ($CRF_G$) of at least 76.

17. The vacuum insulating panel of claim 1, wherein the second seal layer comprises boron oxide and bismuth oxide.

18. The vacuum insulating panel of claim 1, wherein the second seal layer comprises from about 1-20 mol % bismuth oxide and from about 20-65 mol % boron oxide, and comprises at least two times more boron oxide than bismuth oxide in terms of mol %.

19. The vacuum insulating panel of claim 1, wherein the second seal layer comprises from about 30-60 mol % boron oxide.

20. The vacuum insulating panel of claim 1, wherein the second seal layer comprises from about 1-12 mol % bismuth oxide and from about 0-50 mol % silicon oxide.

21. The vacuum insulating panel of claim 1, wherein the second seal layer comprises from about 40-55 mol % boron oxide.

22. The vacuum insulating panel of claim 1, wherein the second seal layer comprises from about 0-20 mol % titanium oxide.

23. The vacuum insulating panel of claim 17, wherein the second seal layer comprises at least three times more boron oxide than bismuth oxide in terms of mol %.

24. The vacuum insulating panel of claim 17, wherein the second seal layer comprises more boron oxide than bismuth oxide in terms of wt. %.

25. The vacuum insulating panel of claim 1, wherein the second seal layer comprises, in terms of mol %, from about 4-9% bismuth oxide, from about 40-55% boron oxide, from about 15-35% silicon oxide, and from about 3-12% titanium oxide.

26. The vacuum insulating panel of claim 1, wherein the second seal layer has a thermal conductivity of from 0.80 to 1.90 W/mK, and the first seal layer has a thermal conductivity of from 0.70 to 1.00 W/mK.

27. The vacuum insulating panel of claim 1, wherein the second seal layer has a thermal conductivity of from about 1.0 to 1.50 W/mK, and the first seal layer has a thermal conductivity of from about 0.80 to 1.0 W/mK.

28. The vacuum insulating panel of claim 1, wherein the first seal layer has a density of from about 2.8-4.0 g/cm³, the second seal layer has a density of from about 3.0-4.2 g/cm³, and wherein the density of the second seal layer is at least about 0.20 g/cm³ greater than the density of the first seal layer.

29. The vacuum insulating panel of claim 1, wherein the second seal layer has a bridging oxygen (BO) content of at least about 80%.

30. The vacuum insulating panel of claim 1, wherein the second seal layer has a bridging oxygen (BO) content of at least about 85%.

31. The vacuum insulating panel of claim 1, wherein the first seal layer comprises tellurium oxide and vanadium oxide, and by wt. % comprises more tellurium oxide than vanadium oxide, and wherein tellurium oxide has the highest metal oxide content of any metal oxide in the first seal layer in terms of wt. %.

32. The vacuum insulating panel of claim 1, wherein the first seal layer comprises from about 40-70 wt. % tellurium oxide.

33. The vacuum insulating panel of claim 31, wherein from about 60-95% of Te in the first seal layer is in a form of $TeO_3$, and from about 3-35% of Te in the first seal layer is in a form of $TeO_4$.

34. The vacuum insulating panel of claim 33, wherein a ratio $TeO_4$:$TeO_3$ in the first seal layer is from about 0.05 to 0.40.

35. The vacuum insulating panel of claim 33, wherein the tellurium oxide further comprises $TeO_{3+1}$, and wherein the first seal layer comprises more $TeO_3$ than $TeO_{3+1}$ by wt. %.

36. The vacuum insulating panel of claim 31, wherein from about 1-9% of Te in the first seal layer is in a form of $TeO_{3+1}$.

37. The vacuum insulating panel of claim 31, wherein the vanadium oxide comprises $VO_2$ and $V_2O_5$, and wherein more V in the first seal layer is in a form of $VO_2$ than $V_2O_5$.

38. The vacuum insulating panel of claim 31, wherein from about 35-85% of the V in the first seal layer is in a form of $VO_2$.

39. The vacuum insulating panel of claim 31, wherein from about 50-75% of the V in the first seal layer is in a form of $VO_2$.

40. The vacuum insulating panel of claim 39, wherein from about 5-45% of the V in the first seal layer is in a form of $V_2O_5$.

41. The vacuum insulating panel of claim 40, wherein the vanadium oxide further comprises $V_2O_3$, and wherein more V in the first seal layer is in a form of $VO_2$ than $V_2O_3$.

42. The vacuum insulating panel of claim 1, wherein the first seal layer is a main seal layer, and the second seal layer is a primer layer.

43. The vacuum insulating panel of claim 1, wherein the seal further comprises a third seal layer, the first seal layer being located between at least the second and third seal layers, and wherein the third seal layer comprises boron oxide and bismuth oxide, wherein the third seal layer comprises from about 1-20 mol % bismuth oxide and from about 20-65 mol % boron oxide, and comprises at least two times more boron oxide than bismuth oxide in terms of mol %.

44. The vacuum insulating panel of claim 43, wherein for at least one location of the seal, the first seal layer has a first thickness, the second seal layer has a second thickness, and the third seal layer has a third thickness; and wherein the first thickness is greater than the second thickness and less than the third thickness.

45. The vacuum insulating panel of claim 1, wherein, for at least one location of the seal, a width of the first seal layer is less than a width of the second seal layer by at least about 1 mm.

46. The vacuum insulating panel of claim 1, wherein the seal is substantially lead-free.

47. The vacuum insulating panel of claim 1, wherein the first seal layer has a physical thickness of from about 40-100 μm.

48. The vacuum insulating panel of claim 47, wherein the second seal layer has a physical thickness of from about 20-70 um or from about 100-220 μm.

49. The vacuum insulating panel of claim 47, wherein, for the at least one location of the seal, a thickness of the first seal layer is at least about 10 μm thicker than a thickness of the second seal layer.

50. The vacuum insulating panel of claim 1, the second seal layer has a melting point (Tm) at least 100 degrees C. higher than a melting point of the first seal layer.

51. The vacuum insulating panel of claim 50, the second seal layer has a melting point (Tm) at least 150 degrees C. higher than a melting point of the first seal layer.

52. The vacuum insulating panel of claim 1, wherein the first and second glass substrates comprise tempered glass substrates or heat strengthened glass substrates.

53. The vacuum insulating panel of claim 1, wherein the seal is a hermetic edge seal of the vacuum insulating panel.

54. The vacuum insulating panel of claim 1, wherein the panel is configured for use in a window.

55. The vacuum insulating panel of claim 1, wherein at at least one location a ratio Wp/W of second seal width (Wp) to first seal width (W) is from about 1.2 to 2.2.

56. The vacuum insulating panel of claim 55, wherein the ratio Wp/W is from about 1.4 to 1.9.

57. The vacuum insulating panel of claim 55, wherein the ratio Wp/W is from about 1.5 to 1.8.

58. The vacuum insulating panel of claim 1, further comprising a low-E coating on at least one of the first and second glass substrates.

59. The vacuum insulating panel of claim 1, wherein the panel has a center of glass (COG) u-factor of from about 0.24 to 0.38 W/m²K.

60. The vacuum insulating panel of claim 1, wherein the panel has a center of glass (COG) u-factor of from about 0.28 to 0.36 W/m²K.

61. A vacuum insulating panel comprising:
   a first glass substrate;
   a second glass substrate;
   a plurality of spacers provided in a gap between at least the first and second glass substrates, wherein the gap is at pressure less than atmospheric pressure;
   a substantially lead-free seal provided at least partially between at least the first and second glass substrates, wherein the seal comprises a first seal layer and a second seal layer comprising of different respective materials, the first and second seal layers having different respective thicknesses and widths at a given location, wherein the first seal layer has a lower thermal conductivity than the second seal layer; and
   wherein material(s) and/or dimension(s) of the seal are configured so that, under reference testing conditions where the panel is positioned between warm (about 21 degrees C., about 8-10% relative humidity) and cold (about minus 18 degrees C.) areas and a wind speed (about 6 mph) applied in the cold area, until steady-state conditions have been met for temperature on both sides, and an infrared camera is used to measure glass temperature on the warm side at different locations moving laterally inward from the edge of the panel, the panel has at least two of:
      (i) a warm side glass temperature rise rate (TRR) of at least about 0.14 degrees C./mm from a location 12.5 mm laterally inward from the edge of the panel to a location 62.5 mm laterally inward from the edge of the panel, where $TRR=(T_{62.5}-T_{12.5})/(62.5-12.5)$, where $T_{62.5}$ is glass temperature in degrees C. on the warm side measured at a location 62.5 mm laterally inward from the edge of the panel and $T_{12.5}$ is glass temperature in degrees C. on the warm side measured at a location 12.5 mm laterally inward from the edge of the panel;
      (ii) a warm side glass temperature of at least 19.7 degrees C. at a location 62.5 mm laterally inward from the edge of the panel; and (iii) a warm side glass temperature of at least 12.4 degrees C. at a location 12.5 mm laterally inward from the edge of the panel.

62. A vacuum insulating panel comprising:

a first glass substrate;

a second glass substrate;

a plurality of spacers provided in a gap between at least the first and second glass substrates, wherein the gap is at pressure less than atmospheric pressure;

a seal provided at least partially between at least the first and second glass substrates, wherein the seal comprises a first seal layer and a second seal layer of different respective materials, the first and second seal layers having different respective thicknesses at a given location;

wherein a thermal conductivity of the second seal layer is greater than a thermal conductivity of the first seal layer; and wherein material(s) and/or dimension(s) of the seal are configured so that, under reference testing conditions where the panel is positioned between warm (about 21 degrees C., about 8-10% relative humidity) and cold (about minus 18 degrees C.) areas and a wind speed (about 6 mph) applied in the cold area, until steady-state conditions have been met for temperature on both sides, and an infrared camera is used to measure glass temperature on the warm side at different locations moving laterally inward from the edge of the panel, a surface temperature curve for the warm side of the vacuum insulating panel is approximately characterized by the following equation:

$$T(x) = T_{min} + \left[ (T_{max} - T_{min}) \times \left( x^n / (k^n + x^n) \right) \right]$$

where $T_{min}$ is a minimum measured temperature, $T_{max}$ is a maximum measured temperature, x represents x-axis which in mm represents distance moving laterally inward from the edge of the panel, n is a fitting factor/parameter, and k is a fitting factor/parameter regarding inflection point.

63. A vacuum insulating panel comprising:

a first glass substrate;

a second glass substrate;

a plurality of spacers provided in a gap between at least the first and second glass substrates, wherein the gap is at pressure less than atmospheric pressure;

a seal, comprising first and second seal layer, provided at least partially between at least the first and second glass substrates;

wherein no more than two glass substrates are provided in the vacuum insulating panel;

wherein the first seal layer has a density of from about 2.8-4.0 g/cm$^3$, the second seal layer has a density of from about 3.0-4.2 g/cm$^3$, and wherein the density of the second seal layer is at least about 0.20 g/cm$^3$ greater than the density of the first seal layer; and wherein material(s) and/or dimension(s) of the seal are configured so that, under reference testing conditions where the panel is positioned between warm (about 21 degrees C., about 8-10% relative humidity) and cold (about minus 18 degrees C.) areas and a wind speed (about 6 mph) applied in the cold area, until steady-state conditions have been met for temperature on both sides, and an infrared camera is used to measure glass temperature on the warm side at different locations moving laterally inward from the edge of the panel, the panel has at least two of:

(i) a warm side glass temperature rise rate (TRR) of at least about 0.14 degrees C./mm from a location 12.5 mm laterally inward from the edge of the panel to a location 62.5 mm laterally inward from the edge of the panel, where TRR=$(T_{62.5}-T_{12.5})/(62.5-12.5)$, where $T_{62.5}$ is glass temperature in degrees C. on the warm side measured at a location 62.5 mm laterally inward from the edge of the panel and $T_{12.5}$ is glass temperature in degrees C. on the warm side measured at a location 12.5 mm laterally inward from the edge of the panel;

(ii) a warm side glass temperature of at least 19.7 degrees C. at a location 62.5 mm laterally inward from the edge of the panel; and (iii) a warm side glass temperature of at least 12.4 degrees C. at a location 12.5 mm laterally inward from the edge of the panel.

64. A vacuum insulating panel comprising:

a first glass substrate;

a second glass substrate;

a plurality of spacers provided in a gap between at least the first and second glass substrates, wherein the gap is at pressure less than atmospheric pressure;

a seal, comprising first and second seal layer, provided at least partially between at least the first and second glass substrates;

wherein no more than two glass substrates are provided in the vacuum insulating panel;

wherein, for at least one location of the seal, a width of the first seal layer is less than a width of the second seal layer by at least about 1 mm; and wherein material(s) and/or dimension(s) of the seal are configured so that, under reference testing conditions where the panel is positioned between warm (about 21 degrees C., about 8-10% relative humidity) and cold (about minus 18 degrees C.) areas and a wind speed (about 6 mph) applied in the cold area, until steady-state conditions have been met for temperature on both sides, and an infrared camera is used to measure glass temperature on the warm side at different locations moving laterally inward from the edge of the panel, the panel has at least two of:

(i) a warm side glass temperature rise rate (TRR) of at least about 0.14 degrees C./mm from a location 12.5 mm laterally inward from the edge of the panel to a location 62.5 mm laterally inward from the edge of the panel, where TRR=$(T_{62.5}-T_{12.5})/(62.5-12.5)$, where $T_{62.5}$ is glass temperature in degrees C. on the warm side measured at a location 62.5 mm laterally inward from the edge of the panel and $T_{12.5}$ is glass temperature in degrees C. on the warm side measured at a location 12.5 mm laterally inward from the edge of the panel;

(ii) a warm side glass temperature of at least 19.7 degrees C. at a location 62.5 mm laterally inward from the edge of the panel; and (iii) a warm side glass temperature of at least 12.4 degrees C. at a location 12.5 mm laterally inward from the edge of the panel.

65. A vacuum insulating panel comprising:

a first glass substrate;

a second glass substrate;

a plurality of spacers provided in a gap between at least the first and second glass substrates, wherein the gap is at pressure less than atmospheric pressure;

a seal, comprising first and second seal layer, provided at least partially between at least the first and second glass substrates;

wherein no more than two glass substrates are provided in the vacuum insulating panel;

wherein for at least one location a ratio Wp/W of second seal width (Wp) to first seal width (W) is from about 1.2 to 2.2; and wherein material(s) and/or dimension(s) of the seal are configured so that, under reference testing conditions where the panel is positioned between warm (about 21 degrees C., about 8-10% relative humidity) and cold (about minus 18 degrees C.) areas and a wind speed (about 6 mph) applied in the cold area, until steady-state conditions have been met for temperature on both sides, and an infrared camera is used to measure glass temperature on the warm side at different locations moving laterally inward from the edge of the panel, the panel has at least two of:

(i) a warm side glass temperature rise rate (TRR) of at least about 0.14 degrees C./mm from a location 12.5 mm laterally inward from the edge of the panel to a location 62.5 mm laterally inward from the edge of the panel, where $TRR=(T_{62.5}-T_{12.5})/(62.5-12.5)$, where $T_{62.5}$ is glass temperature in degrees C. on the warm side measured at a location 62.5 mm laterally inward from the edge of the panel and $T_{12.5}$ is glass temperature in degrees C. on the warm side measured at a location 12.5 mm laterally inward from the edge of the panel;

(ii) a warm side glass temperature of at least 19.7 degrees C. at a location 62.5 mm laterally inward from the edge of the panel; and (iii) a warm side glass temperature of at least 12.4 degrees C. at a location 12.5 mm laterally inward from the edge of the panel.

* * * * *